(12) United States Patent
Barthel et al.

(10) Patent No.: US 9,477,744 B2
(45) Date of Patent: Oct. 25, 2016

(54) EVENT-RELATED MEDIA MANAGEMENT SYSTEM

(71) Applicant: UBERFAN, LLC, Minneapolis, MN (US)

(72) Inventors: Terrence J. Barthel, San Diego, CA (US); Jeffrey P. Ess, Minnetonka, MN (US)

(73) Assignee: Uberfan, LLC, Minneapolis, MN (US)

( * ) Notice: Subject to any disclaimer, the term of this patent is extended or adjusted under 35 U.S.C. 154(b) by 0 days.

(21) Appl. No.: 14/944,211

(22) Filed: Nov. 18, 2015

(65) Prior Publication Data

US 2016/0070781 A1    Mar. 10, 2016

Related U.S. Application Data

(63) Continuation of application No. 14/274,199, filed on May 9, 2014.

(60) Provisional application No. 61/914,955, filed on Dec. 11, 2013, provisional application No. 61/902,128, filed on Nov. 8, 2013, provisional application No. 61/882,635, filed on Sep. 26, 2013, provisional application No. 61/827,554, filed on May 24, 2013, provisional application No. 61/822,289, filed on May 10, 2013.

(51) Int. Cl.
*G06F 7/00* (2006.01)
*G06F 17/30* (2006.01)

(52) U.S. Cl.
CPC ... *G06F 17/30598* (2013.01); *G06F 17/30044* (2013.01); *G06F 17/30899* (2013.01)

(58) Field of Classification Search
CPC ............... G06F 17/30041; G06F 17/30598; G06F 17/30899; G06F 17/30044
USPC ........... 707/708, 738, 999.003, 999.006, 736
See application file for complete search history.

(56) References Cited

U.S. PATENT DOCUMENTS

| | | | |
|---|---|---|---|
| 7,289,793 B2 | 10/2007 | Norwood et al. | |
| 2004/0041831 A1 | 3/2004 | Zhang | |
| 2008/0282287 A1 | 11/2008 | Chen et al. | |
| 2009/0157680 A1* | 6/2009 | Crossley | G06F 17/30041 |
| 2011/0099195 A1 | 4/2011 | Patwardhan et al. | |
| 2012/0087637 A1 | 4/2012 | Logan et al. | |

FOREIGN PATENT DOCUMENTS

KR    10-2008-0071554    8/2008

OTHER PUBLICATIONS

PCT Searching Authority, International Search Report and Written Opinion for PCT/US2014/037497 mailed Sep. 1, 2014, 24 pages.

* cited by examiner

*Primary Examiner* — Md. I Uddin
(74) *Attorney, Agent, or Firm* — Merchant & Gould P.C.

(57) ABSTRACT

An event-related media management system contextualizes media content. The event-related media management system associates media content with contextual event-related data to associate the media content with the events and information about the events. The contextual event-related data can then be used to provide access to the media content, such as through relevant search results or by presenting the media content in organized displays for contextual browsing and navigation. In some embodiments the event-related media management system generates contextualized media content for contextual search, discovery, and advertising.

20 Claims, 51 Drawing Sheets

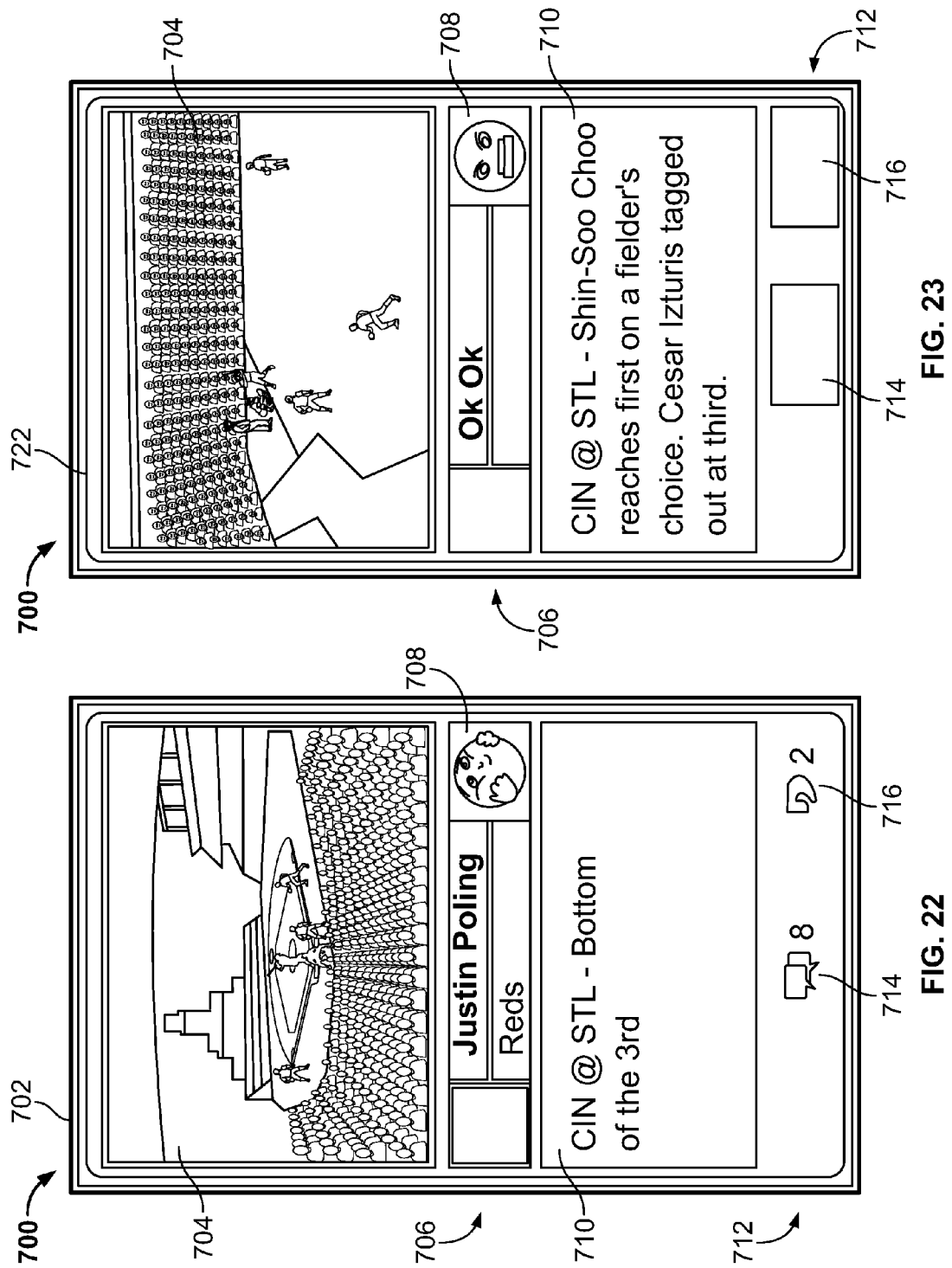

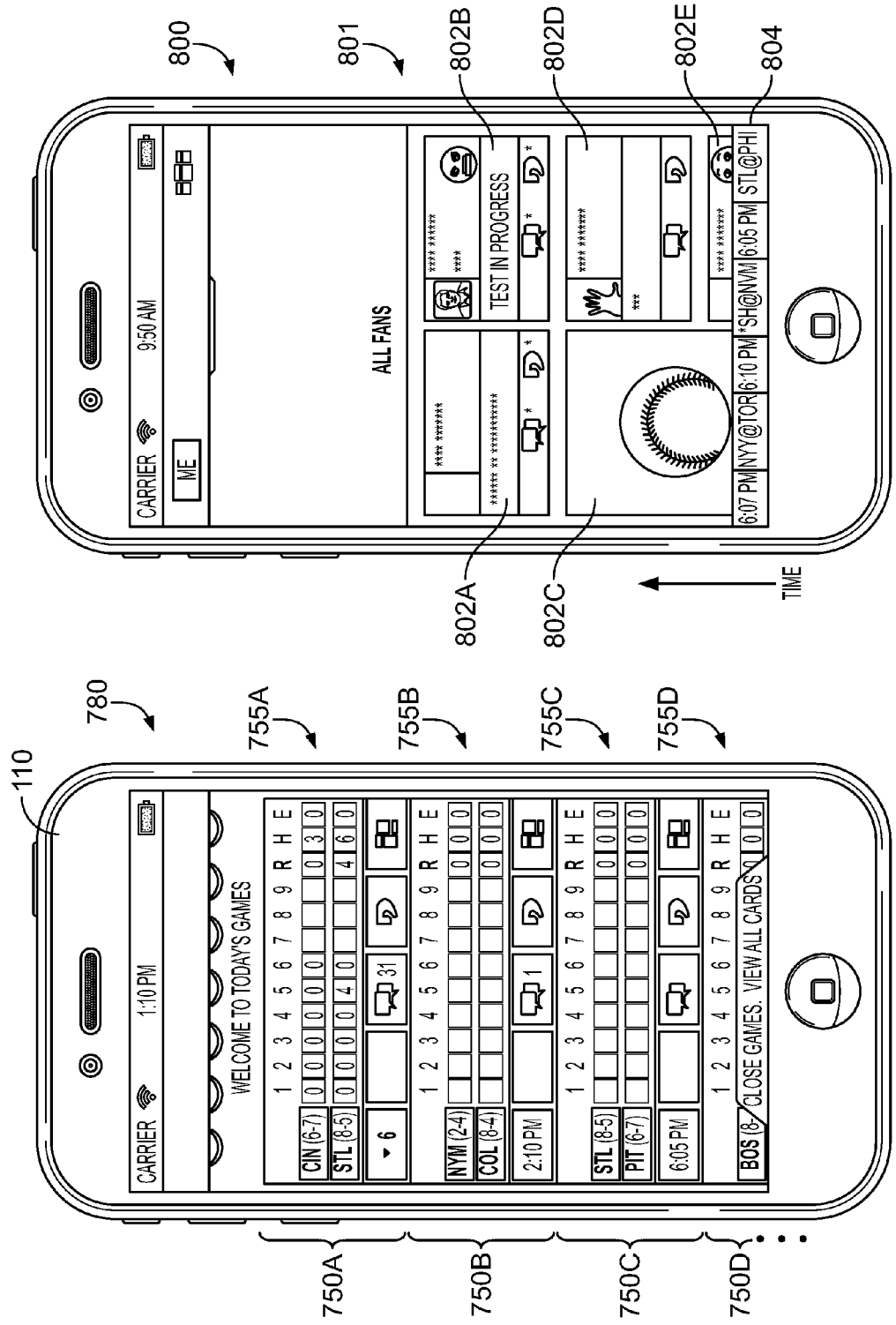

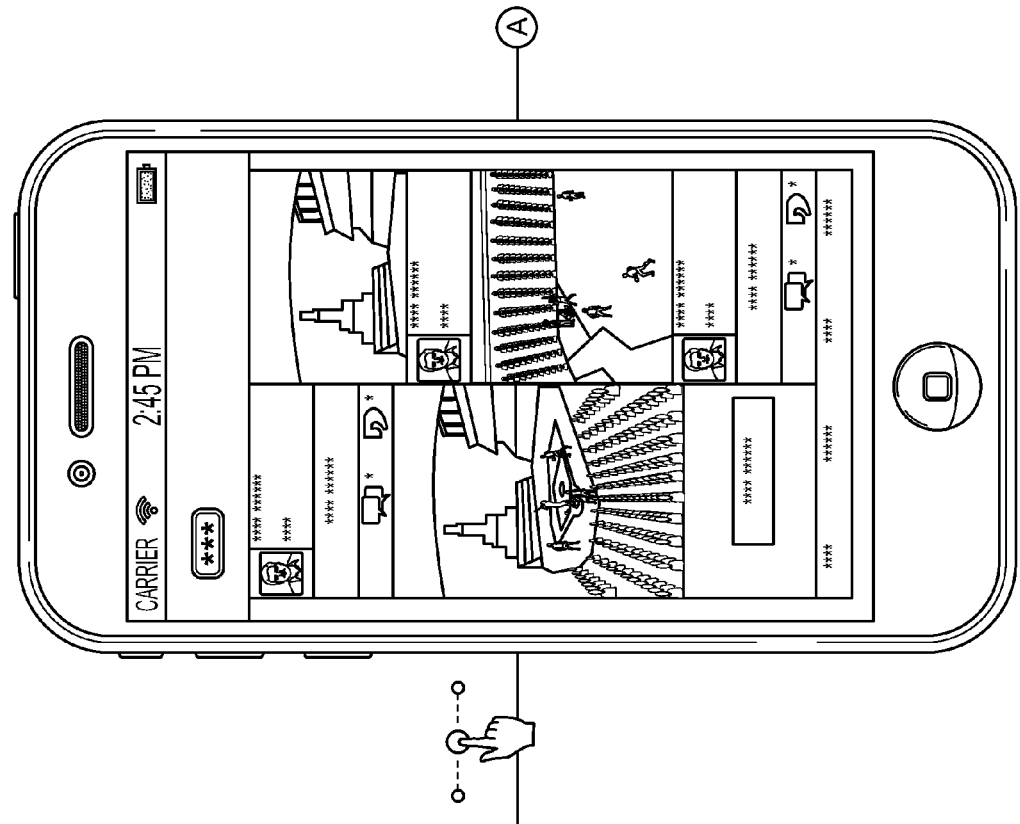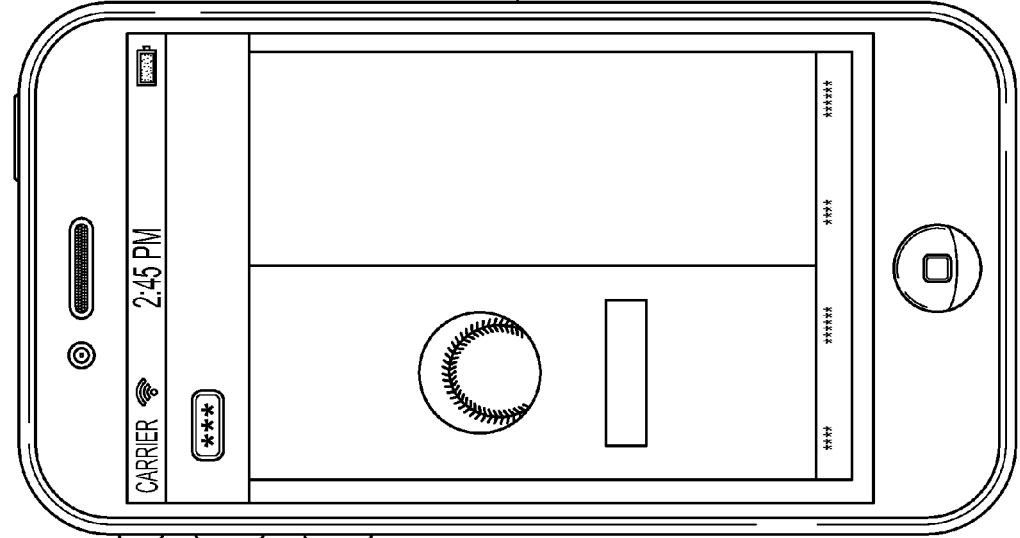

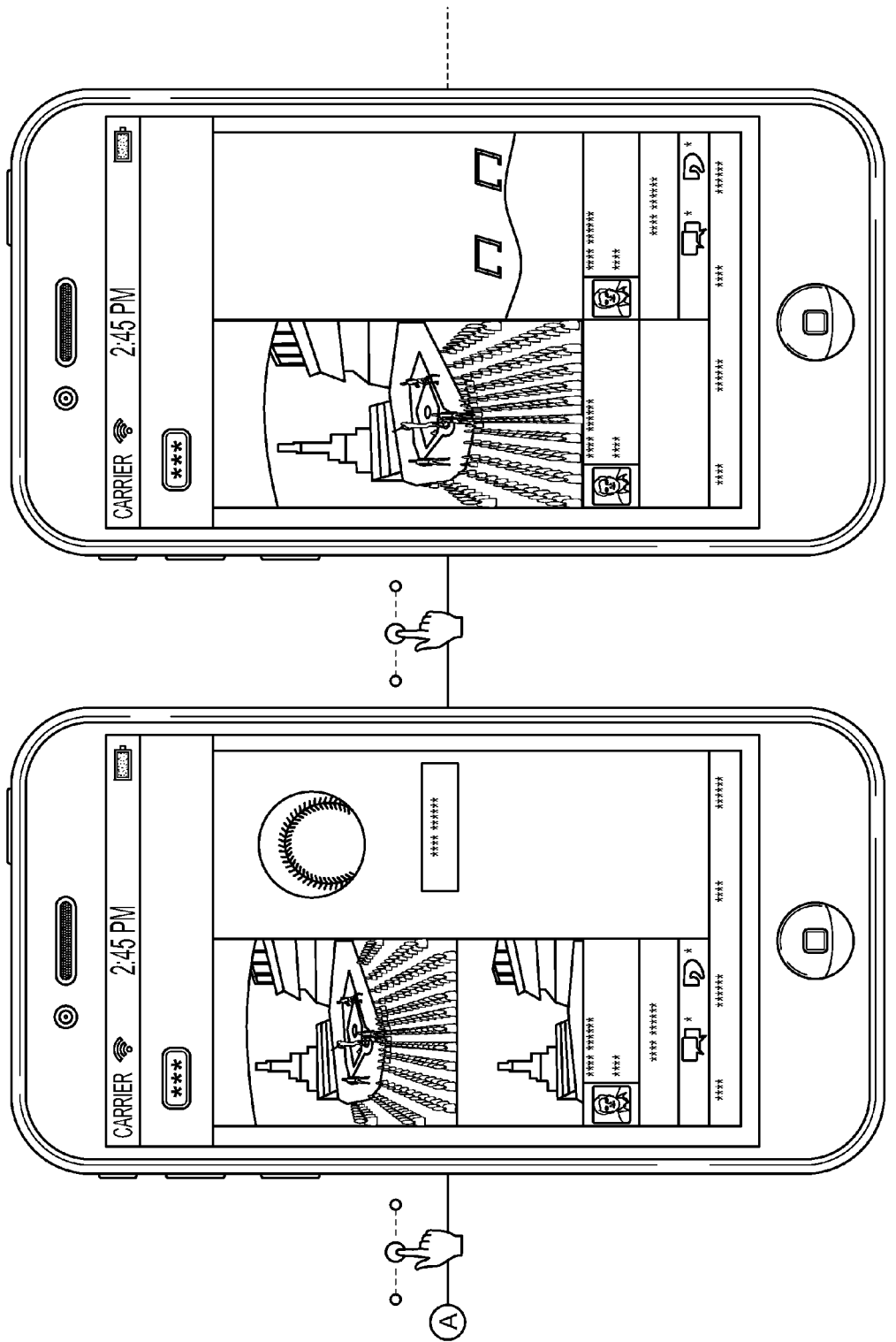

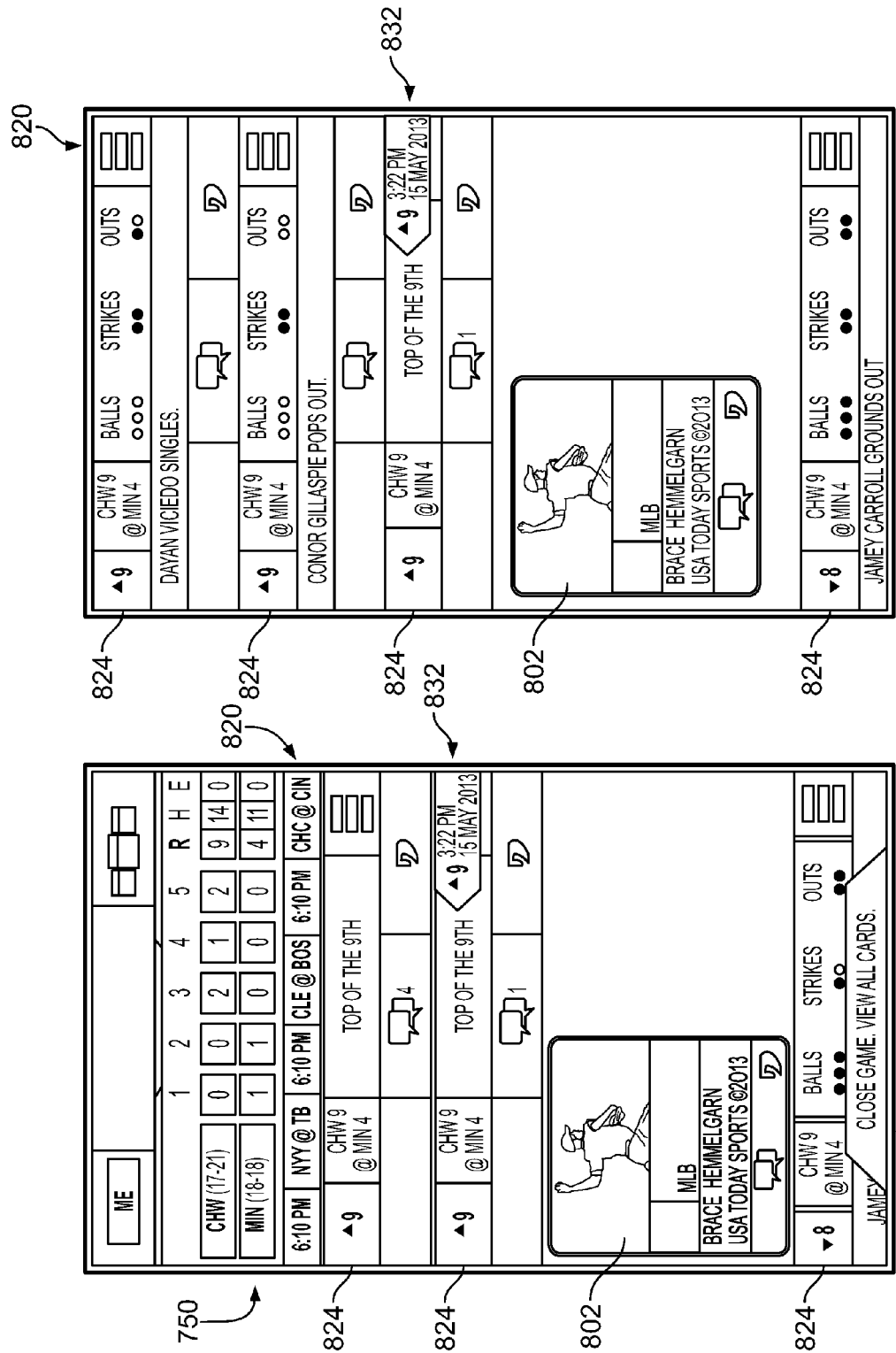

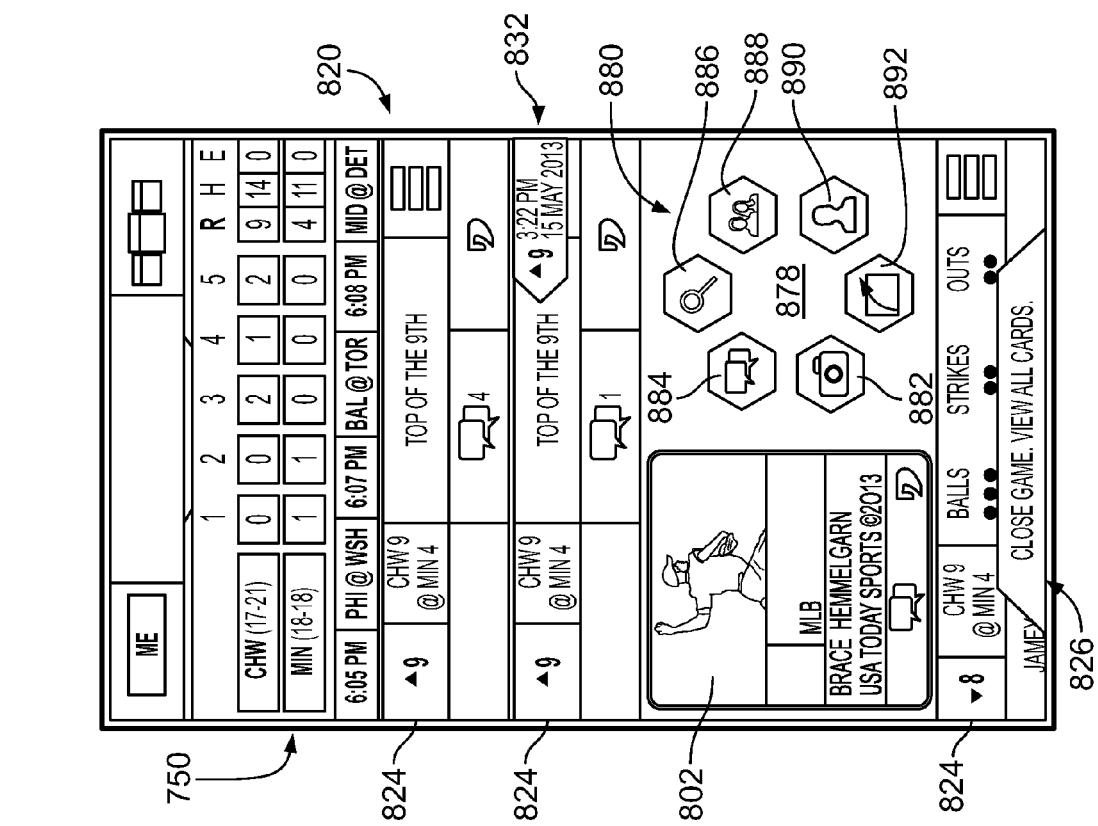
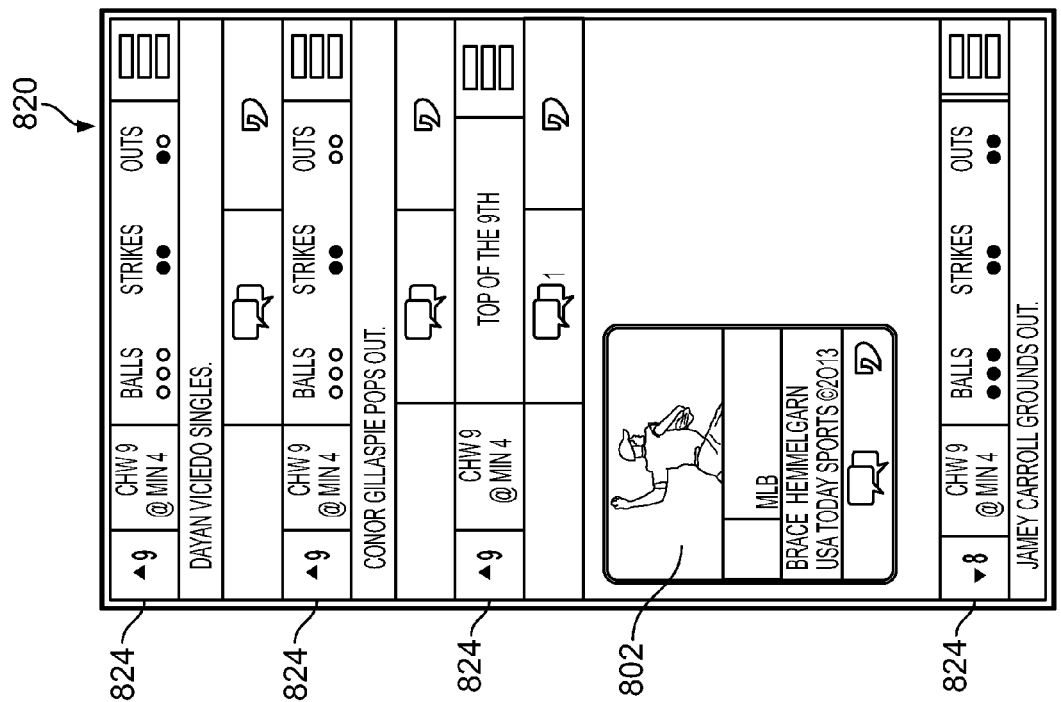
FIG. 36
FIG. 35

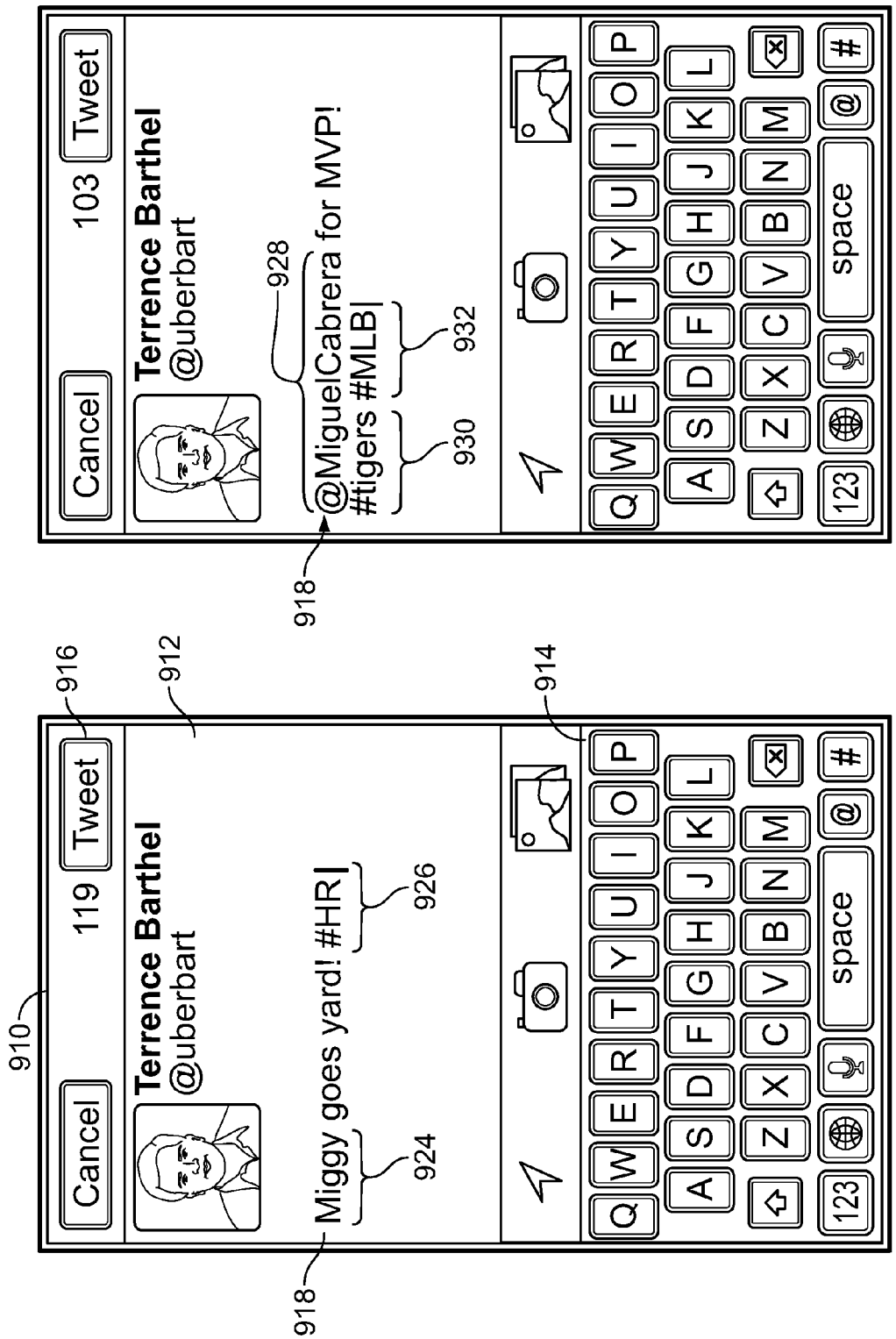

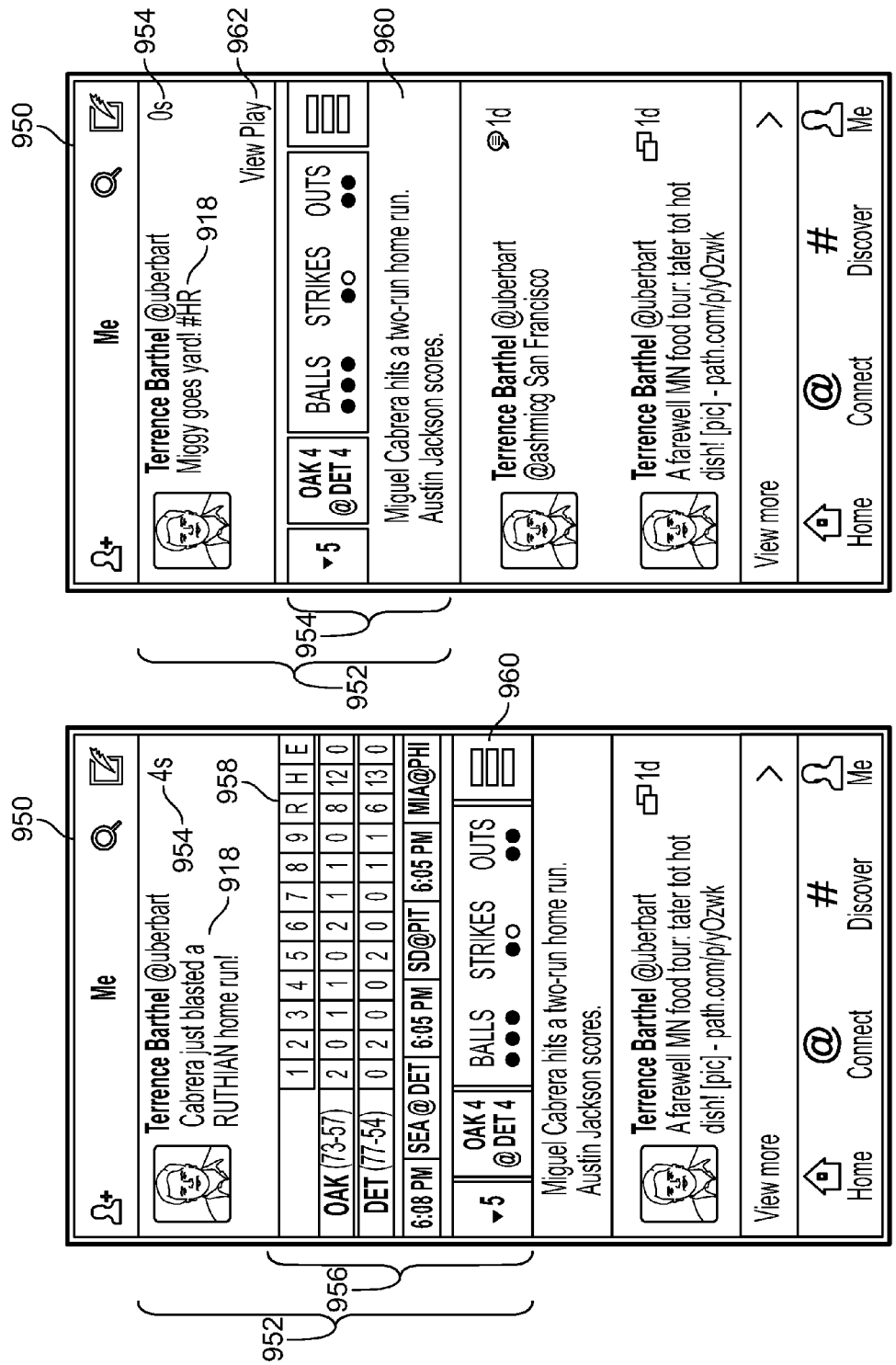

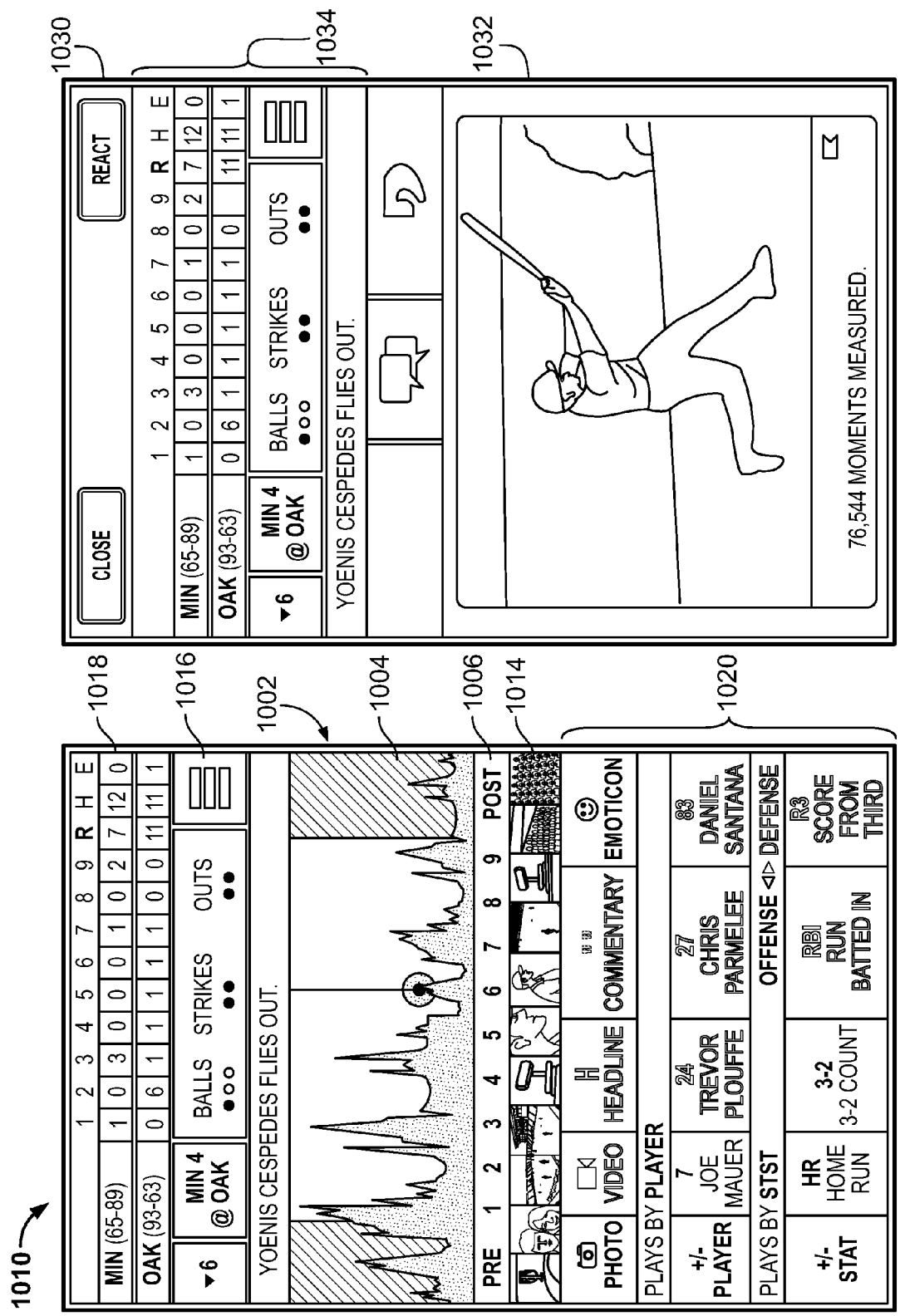

EVENT-RELATED MEDIA MANAGEMENT SYSTEM

CROSS-REFERENCE TO RELATED APPLICATIONS

This application is a continuation of U.S. patent application Ser. No. 14/274,199, filed on May 9, 2014, and titled EVENT-RELATED MEDIA MANAGEMENT SYSTEM, and claims priority to U.S. Provisional Application Ser. No. 61/914,955, filed on Dec. 11, 2013, and titled EVENT-RELATED MEDIA MANAGEMENT SYSTEM; and to U.S. Provisional Application Ser. No. 61/902,128, filed on Nov. 8, 2013, and titled EVENT-RELATED MEDIA MANAGEMENT SYSTEM; and to U.S. Provisional Application Ser. No. 61/882,635, filed on Sep. 26, 2013, and titled EVENT-RELATED MEDIA MANAGEMENT SYSTEM; and to U.S. Provisional Application Ser. No. 61/827,554, filed on May 24, 2013, and titled EVENT-RELATED MEDIA MANAGEMENT SYSTEM; and to U.S. Provisional Application Ser. No. 61/822,289, filed on May 10, 2013, and titled EVENT-RELATED MEDIA MANAGEMENT SYSTEM, the disclosures of which are hereby incorporated by reference in their entireties. To the extent appropriate, a claim of priority is made to each of the above-disclosed applications.

BACKGROUND

The proliferation of digital and mobile technology permits people to generate a large volume of digital content. At an event, for example, many people will use their smartphones to take pictures or videos of the event, and may post messages relating to the event through a social media system. Such digital content is largely disorganized and lacking in contextual information. As a result, it is difficult for people to find and use the digital content.

SUMMARY

In general terms, this disclosure is directed to a media management system. In one possible configuration and by non-limiting example, the media management system manages media that is related to specific events. Various aspects are described in this disclosure, which include, but are not limited to, the following aspects.

One aspect is a method of generating intelligent media content for contextual search, discovery, and advertising, the method comprising: storing event-related data associated with a plurality of events including a first event; receiving media content items, the media content items including a first media content item; identifying contextual information associated with the first media content item using a computing device; identifying one of the events to which the media content item relates using the contextual information; tagging the event to the first media content item; comparing the contextual information to the event-related data for the identified event; and tagging at least some of the event-related data to the first media content item based at least in part on the comparison of the contextual information to the event-related data.

Another aspect is a system for generating intelligent media content for contextual search, discover, and advertising, the system comprising: at least one processing device; and at least one computer readable storage device, the at least one computer readable storage device storing data instructions, which when executed by the processing device, cause the processing device to: store event-related data associated with a plurality of events including a first event; receive media content items, the media content items including a first media content item; identify contextual information associated with the first media content item; identify one of the events to which the media content item relates using the contextual information; tag the event to the first media content item; compare the contextual information to the event-related data for the identified event; and tag at least some of the event-related data to the first media content item based at least in part on the comparison of the contextual information to the event-related data.

A further aspect is a method of documenting an event, the method comprising: generating general event information including general information about the event; identifying discrete actions that occur during the event; generating, using a computing device, discrete action data items for the discrete actions that occur during the event; and storing time stamps for the discrete action data.

Another aspect is a system for documenting an event, the system comprising: at least one processing device; and at least one computer readable storage device, the at least one computer readable storage device storing data instructions, which when executed by the processing device, cause the processing device to: generate general event information including general information about the event; identify discrete actions that occur during the event; generate discrete action data items for the discrete actions that occur during the event; and store time stamps for the discrete action data.

A further aspect is a method of navigating through media content items associated with an event, the method comprising: storing a plurality of media content items associated with an event; generating a volume graph display using a computing device, the volume graph display graphically depicting a magnitude of one or more aspects of an event over time; receiving an input from a user, the input identifying at least one point in the volume graph display associated with at least one range of times; and generating a display including media content items associated with the at least one range of times.

Yet another aspect is a system for navigation through media content items associated with an event, the system comprising: at least one processing device; and at least one computer readable storage device, the at least one computer readable storage device storing data instructions, which when executed by the processing device, cause the processing device to: store a plurality of media content items associated with an event; generate a volume graph display the volume graph display graphically depicting a magnitude of one or more aspects of an event over time; receive an input from a user, the input identifying at least one point in the volume graph display associated with at least one range of times; and generate a display including media content items associated with the at least one range of times.

Another aspect is a method of displaying event information for an event having a plurality of scored segments, the method comprising: generating a graphical representation of a scoreboard with a computing device, the scoreboard including multiple scored segment displays associated with the scored segments of the event; receiving an input into the graphical representation of the scoreboard, the input selecting one of the scored segment displays; and displaying information associated with the scored segment of the event.

A further aspect is a method of filtering information associated with an event, the method comprising: prompting a user to enter one or more filter criteria associated with an event and receiving the filter criteria using a computing device; generating a timeline display of the information filtered according to the filter criteria; generating an alternate view of the timeline display, while continuing to filter the information according to the filter criteria.

Yet a further aspect is a method of segmenting an event, the method comprising: receiving an event feed identifying a plurality of discrete action data items using a computing device; identifying a set of the discrete action items; defining event segments including a first event segment, the first event segment being defined based on the set of discrete action items; and identifying a set of the event segments associated with a scored segment of the event.

Another aspect is a method of filtering information associated with a sports game, the method comprising: receiving one or more filter criteria associated with a sports game; displaying sports game information in a chronological order in a user interface using a computing device; displaying a time indicator in the user interface, the time indicator displaying the chronological time of the information presently displayed in the user interface; receiving an input into the time indicator; and filtering the sports game information according to the filter criteria.

Another aspect is a method of automatically tagging sport-related content, the method comprising: generating a media content card including media content using a computing device; time stamping the media content card with a time; identifying an event segment occurring at the time identified by the time stamp; and tagging the media content card with a plurality of tags associated with the event segment.

A further aspect is any one or more of the systems or methods illustrated or described herein.

Yet another aspect is an event-related media management system as described herein.

A further aspect is an event-related user interaction system operating on a computing device as described herein.

Yet a further aspect is an event-related media management system server computing device as described herein.

Another aspect is a method of certifying media content cards as illustrated in FIG. 21.

A further aspect is a method of contextualizing media content, the method comprising: receiving media content; processing the media content using a computing device to associate the media content with contextual event-related data; and providing access to the media content using the contextual event-related data.

Another aspect is a method of retroactively converting a media content database to contextualize the media content contained therein, the method comprising: obtaining data associated with the media content; processing the media content using a computing device to associate the media content with contextual event-related data using the data; and associating the media items with contextual event-related data.

Yet another aspect is an event data feed comprising: action data items identifying discrete actions occurring during the event; and time stamps contained in the event data and associated with the discrete actions.

Yet a further aspect is an event data feed comprising: action data items identifying discrete actions occurring during a video production; transcript data associated with the discrete actions; and time stamps contained in the event data and associated with the discrete actions.

Another aspect is a computing device comprising: a processing device; a data communication device configured to communicate across a data communication network; and a computer readable storage device, the computer readable storage device storing data instructions, which when executed by the processing device, cause the processing device to generate and send an event data feed across the data communication network using the communication device, the event data feed comprising: action data items identifying discrete actions occurring during the event; and time stamps contained in the event data and associated with the discrete actions.

A further aspect is a computing device comprising: a processing device; a data communication device configured to communicate across a data communication network; and a computer readable storage device, the computer readable storage device storing data instructions, which when executed by the processing device, cause the processing device to generate and send an event data feed across the data communication network using the communication device, the event data feed comprising: action data items identifying discrete actions occurring during a video production; transcript data associated with the discrete actions; and time stamps contained in the event data and associated with the discrete actions.

Yet another aspect is a method of contextualizing media content, the method comprising: storing event-related data associated with an event; receiving a media content item relating to the event; identifying contextual information associated with the media content; comparing, using a computing device, the contextual information to the event-related data to identify a relationship between the event-related data and the media content item; associating the media content item with the event according to the identified relationship; and associating the media content item with at least some of the event-related data according to the identified relationship.

Another aspect is a system comprising: at least one processing device; and at least one computer readable storage device, the at least one computer readable storage device storing data instructions, which when executed by the processing device, cause the processing device to: generate a graphical representation of a scoreboard, the scoreboard including multiple scored segment displays associated with the scored segments of the event; receive an input into the graphical representation of the scoreboard, the input selecting one of the scored segment displays; and display information associated with the scored segment of the event.

A further aspect is a system comprising: at least one processing device; and at least one computer readable storage device, the at least one computer readable storage device storing data instructions, which when executed by the processing device, cause the processing device to: prompt a user to enter one or more filter criteria associated with an event and receiving the filter criteria; generate a timeline display of the information filtered according to the filter criteria; generate an alternate view of the timeline display, while continuing to filter the information according to the filter criteria.

Yet another aspect is a system comprising: at least one processing device; and at least one computer readable storage device, the at least one computer readable storage device storing data instructions, which when executed by the processing device, cause the processing device to: receive an event feed identifying a plurality of discrete action data items; identify a set of the discrete action items; define event segments including a first event segment, the first event segment being defined based on the set of discrete action items; and identify a set of the event segments associated with a scored segment of the event.

Another aspect is a system comprising: at least one processing device; and at least one computer readable storage device, the at least one computer readable storage device storing data instructions, which when executed by the processing device, cause the processing device to: receive one or more filter criteria associated with a sports game; display sports game information in a chronological order in a user interface; display a time indicator in the user interface, the time indicator displaying the chronological time of the information presently displayed in the user interface; receive an input into the time indicator; and filter the sports game information according to the filter criteria.

A further aspect is a system comprising: at least one processing device; and at least one computer readable storage device, the at least one computer readable storage device storing data instructions, which when executed by the processing device, cause the processing device to: generate a media content card including media content; time stamp the media content card with a time; identify an event segment occurring at the time identified by the time stamp; and tag the media content card with a plurality of tags associated with the event segment.

Yet another aspect is a system comprising: at least one processing device; and at least one computer readable storage device, the at least one computer readable storage device storing data instructions, which when executed by the processing device, cause the processing device to: receiving media content; processing the media content to associate the media content with contextual event-related data; and providing access to the media content using the contextual event-related data.

A further aspect is a system comprising: at least one processing device; and at least one computer readable storage device, the at least one computer readable storage device storing data instructions, which when executed by the processing device, cause the processing device to: obtain data associated with media content of a media content database; process the media content to retroactively associate the media content with contextual event-related data using the data; and associate the media items with contextual event-related data.

Another aspect is a system for contextualizing media content, the system comprising: at least one processing device; and at least one computer readable storage device, the at least one computer readable storage device storing data instructions, which when executed by the processing device, cause the processing device to: store event-related data associated with an event; receive a media content item relating to the event; identify contextual information associated with the media content; compare the contextual information to the event-related data to identify a relationship between the event-related data and the media content item; associate the media content item with the event according to the identified relationship; and associate the media content item with at least some of the event-related data according to the identified relationship.

Yet another aspect is a system for contextualizing media content, the method comprising: means for receiving media content; means for processing the media content to associate the media content with contextual event-related data; and means for providing access to the media content using the contextual event-related data.

A further aspect is a system for media content navigation, the system comprising: means for storing media content associated with an event; means for displaying a volume graph display; means for receiving an input into the volume graph display; and means for navigating to and displaying relevant media content items of the media content using the input.

BRIEF DESCRIPTION OF THE DRAWINGS

FIG. 22 illustrates an example of a certified media content card.

FIG. 23 illustrates an example of an uncertified media content card.

FIG. 26 illustrates an example of a multi-event interactive scoreboard display.

FIG. 27 illustrates an example of a general timeline display.

FIG. 30 illustrates an example of multiple different timeline views that are available in some embodiments.

FIG. 33 is a screen shot of another example of an event timeline display including navigation controls.

FIG. 34 is a screen shot of the example event timeline display of FIG. 33 after the navigation controls have disappeared.

FIG. 35 is a screen shot of the example event timeline display of FIG. 33 after the time indicator has disappeared from view.

FIG. 36 is another screen shot of the example event timeline display, and further illustrating a navigation menu.

FIG. 39 is another screen shot of the example user interface shown in FIG. 38.

FIG. 40 is another screen shot of the example user interface shown in FIG. 38.

FIG. 42 is a screen shot of an example display for displaying message a message or other media content.

FIG. 43 is a screen shot of another example display for displaying a message or other media content.

FIG. 46 is a screen shot of another example of the team profile display shown in FIG. 45.

FIG. 47 is a screen shot of an example player profile display.

FIG. 56 is a screen shot illustrating another example of a user interface including a content volume display.

FIG. 57 is a screen shot illustrating an example of a media content display.

FIG. 58 is a screen shot illustrating an example of a video production timeline, and more specifically an example of a timeline for a news program.

FIG. 59 is a screen shot illustrating an example of an individual post associated with a video production timeline.

FIG. 60 is a screen shot illustrating another example of a video production timeline.

DETAILED DESCRIPTION

Figure 1:
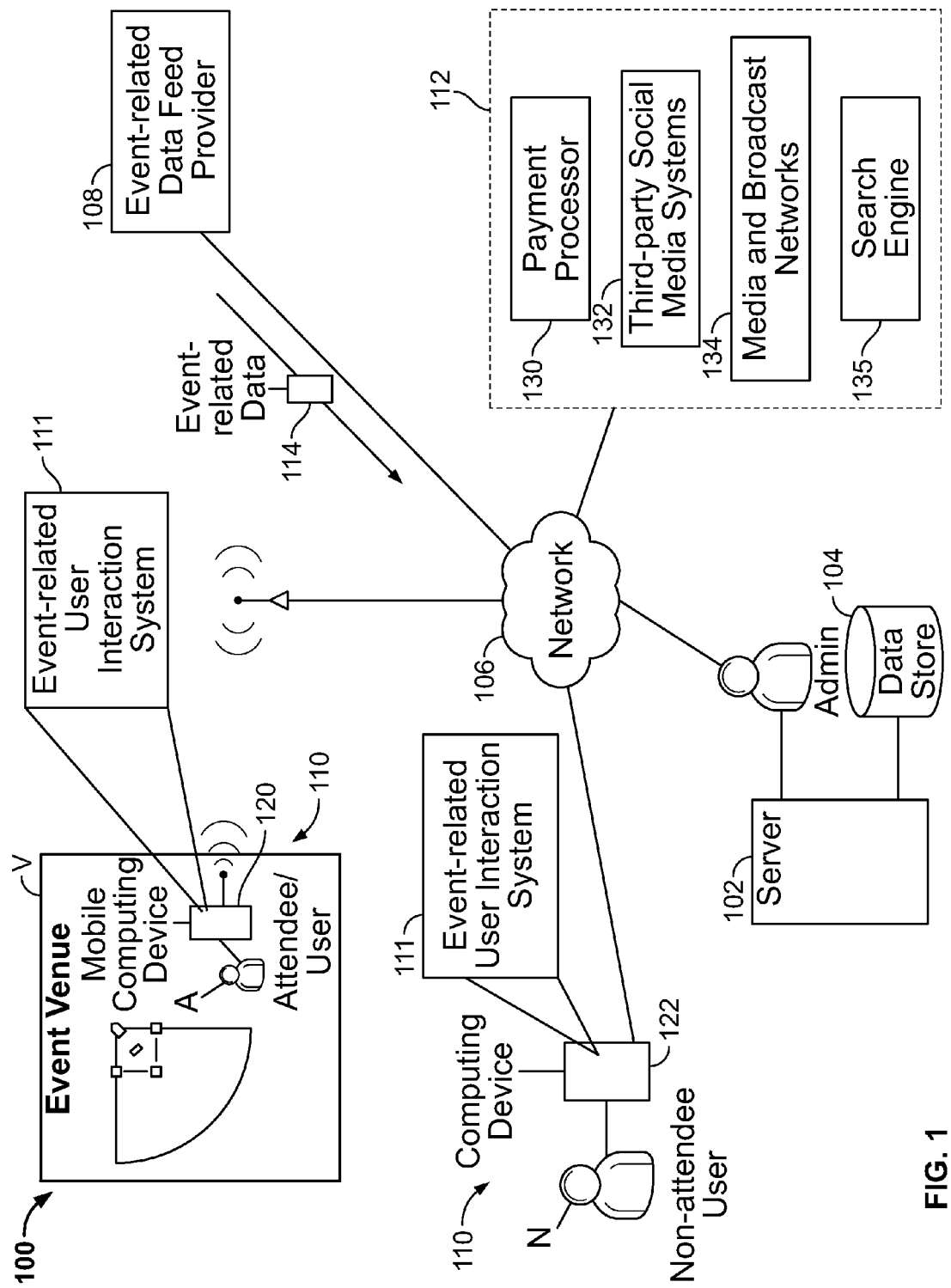
FIG. 1 is a schematic block diagram of an example event-related media management system.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In some embodiments, the present disclosure includes an event-related media management system 100, which operates to receive and store media associated with one or more events, and to subsequently provide access to that media. In some embodiments, the event-related media management system 100 operates to capture and permanently record moments of an event with multimedia content, such as pictures, video, audio, and text-based reactions to or of the event. In this way a permanent historical record of the event is created.

One example of an event is a sports game. The following disclosure discusses in detail a specific example embodiment involving baseball games. Other examples are also discussed, and the principles described herein are understood to be relevant to a wide range of possible events. In some embodiments, an event includes a series of actions that occur in a chronological order, which can be captured in some form of media, such as a photograph, video, audio, or text media. Several specific examples of suitable events include sports games, musical or other artistic performances, social events, historical events, or other events. Some examples of sports games include team sports and individual sports. Some examples of team sports include baseball, football, soccer, hockey, basketball, lacrosse, volleyball, rugby, water polo, cricket, and ultimate frisbee. Some examples of individual sports include golf, skiing, motor sports, track and field, tennis, boxing, wrestling, horse racing, figure skating, and bowling. Additional examples include Olympic sports. Sports can be any one of a variety of levels including amateur, junior, high school, collegiate, semi-professional, and professional levels. Several examples of social events include a wedding, a family reunion, and a birthday party. Several examples of historical events include a war or battle, a period in which a particular political leader is in office, and a civil rights movement. Therefore, at least some of the aspects and principles according to the present disclosure are widely applicable to a variety of different types of events.

FIG. 1 is a schematic block diagram of an example event-related media management system 100. In this example, the event-related media management system 100 includes a media management server 102 and data store 104, a data communication network 106, an event-related data feed provider 108, user computing devices 110, and other associated systems 112.

In some embodiments, the system 100 interacts with users U, including for example an attendee user A and a non-attendee user N. The attendee user A is present at an event venue V where an event will take place. The non-attendee user N is located somewhere else away from the event venue V. The users U interact with the system 100 through computing devices 110, which can be mobile computing devices or other less-portable computing devices. The computing devices 110 provide an event-related user interaction system 111, in some embodiments.

The example event shown in FIG. 1 is a baseball game, and accordingly the event venue V is a baseball stadium. The attendee user A is present in the event venue V as a spectator, for example. As discussed above, other embodiments involve other events, and other event venues.

The event-related media management system 100 operates to capture media relating to the event and store that media in the data store 104. For example, event-related data 114 is provided to the server 102 by the event-related data feed provider 108, in some embodiments. Examples of the event-related data 114 feeds are discussed in greater detail herein with reference to FIGS. 2-3. As one example, the event-related data feed provider 108 provides general information regarding the event to the server 102, such as the teams that are playing, the players on the teams, etc., and also includes a discrete action data feed that provides details of discrete actions that take place during the game, such as a pitch, a strikeout, and a home run, for example. In some embodiments, the discrete action data feed includes time stamps that identify the times at which the particular actions take place during the event.

Additionally, media content is provided to the server 102 by the users U through the event-related user interaction system 111 on the computing devices 110. For example, the attendee user A at the event venue V uses the mobile computing device 120 to capture media content during the game, such as a photograph of a player hitting a home run. Examples of media content include a picture, a video, an audio recording, or a text-based message. Additionally, media content can also be provided by the non-attendee user N.

The server 102 acts as the central management system for the event-related media management system 100 in some embodiments. For example, in some embodiments the server 102 receives the event-related data 114 feed from the event-related data feed provider 108, as well as the media content from the event-related user interaction system 111 and the computing devices 110. The data and media content are processed and stored in the data store 104. For example, in some embodiments the server 102 matches the media content with the event to which it relates, and to a particular segment of the event.

In some embodiments the server 102 also distributes the media content to the computing devices 110 to permit the users U to view the media content. In some embodiments, the media content is arranged in a chronological order and presented in a timeline by the event-related user interaction system 111 on the computing devices 110 where the users U can interact with the media content. Examples of the server 102 are illustrated and described in more detail with reference to FIGS. 4-5.

A data store 104 is provided in some embodiments to store data associated with the event. Examples of such data include event-related data 114 obtained from the event-related data feed provider 108 and media content received from the computing devices 110 (including computing devices 120 and 122). The data store is or includes one or more computer-readable data storage devices that can be part of the server 102, or separate from but in data communication with the server 102. In some embodiments the data store includes multiple data storage devices, which can be distributed across multiple locations. In some embodiments the data store 104 is a cloud storage system.

In some embodiments, the event-related media management system 100 communicates across a network 106. The network can include one or more of the Internet, a local area network, a cellular or other telephone network, or other suitable data communication networks. Data communication can occur across physical wires or cables, or wirelessly through radio or other electromagnetic communication techniques, or various combinations of these, for example. Some embodiments include a pCell™ network including one or more pWaves wireless devices, as part of the network 106. Some embodiments include a mesh network, such as using the iOS Multipeer Connectivity framework.

Some embodiments include or interact with one or more other associated systems 112. Examples include a payment processor 130, a third-party social media system 132, a media and broadcast network 134, and a search engine system 135. The associated systems can be third-party systems or may be part of, or commonly owned and operated by, the event-related media management system 100, including the server 102, for example. More specifically, the third-party social media system 132 can alternatively not be a social media system that is not operated by a third-party, and may be parts of the same or associated systems in some embodiments.

In some embodiments, the payment processor 130 handles payments made by users. The payments can be made for a subscription to the event-related media management system 100, for example, or to unlock additional features of the system, such as advanced searching, enhanced media filtering tools, or premium tags such as special multimedia icons.

One or more social media systems 132 can be used in the event-related media management system as an input source of media content, or can be used to receive media items and/or contextual event-related data associated with the media items. Examples of social media systems 132 include Facebook™, Twitter™, Instagram™, Pinterest™, Youtube™, Vine™, and other social media systems.

Some embodiments include or interact with one or more search engine systems 135. Examples of search engine systems 135 include Google™, Yahoo™, Bing™, YouTube™, Vine™, Siri™, Google™ Now™, OK Google™, and Microsoft™ Cortana™.

In some embodiments the event-related media management system includes or interacts with one or more analytics or data mining engines. Analytics can be used for advertising, for example, as discussed in further detail herein, or for other purposes, such as evaluating general trends or interests across a population of users.

Figure 2:
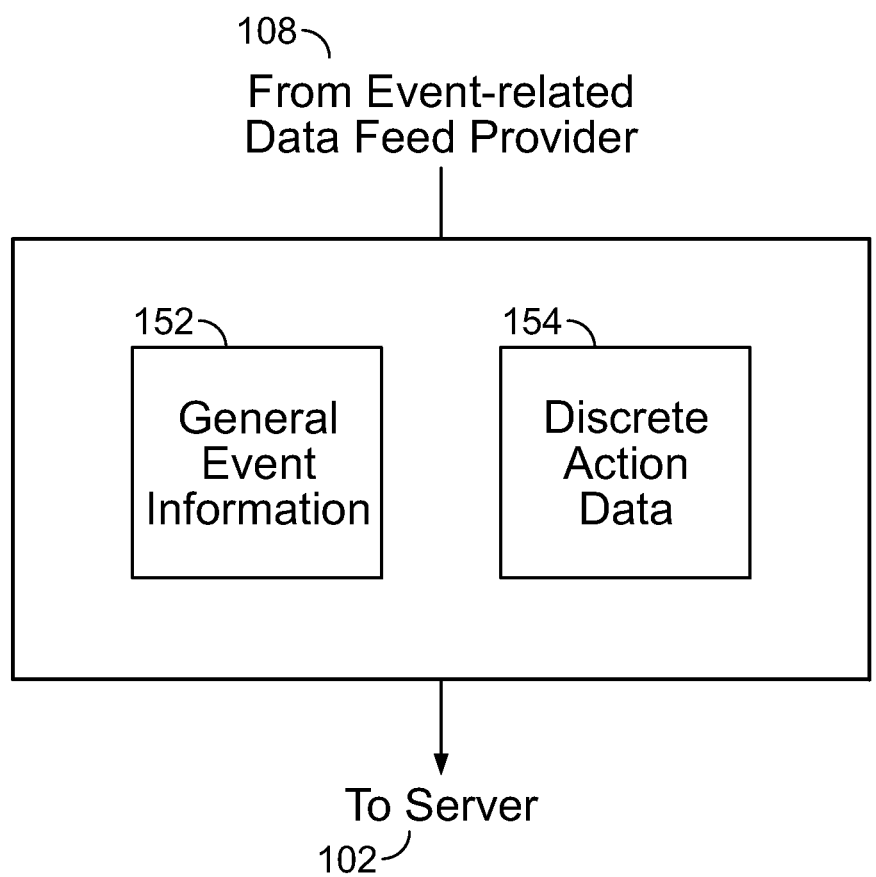
FIG. 2 is a schematic block diagram illustrating an example of event-related data.
Figure 3:
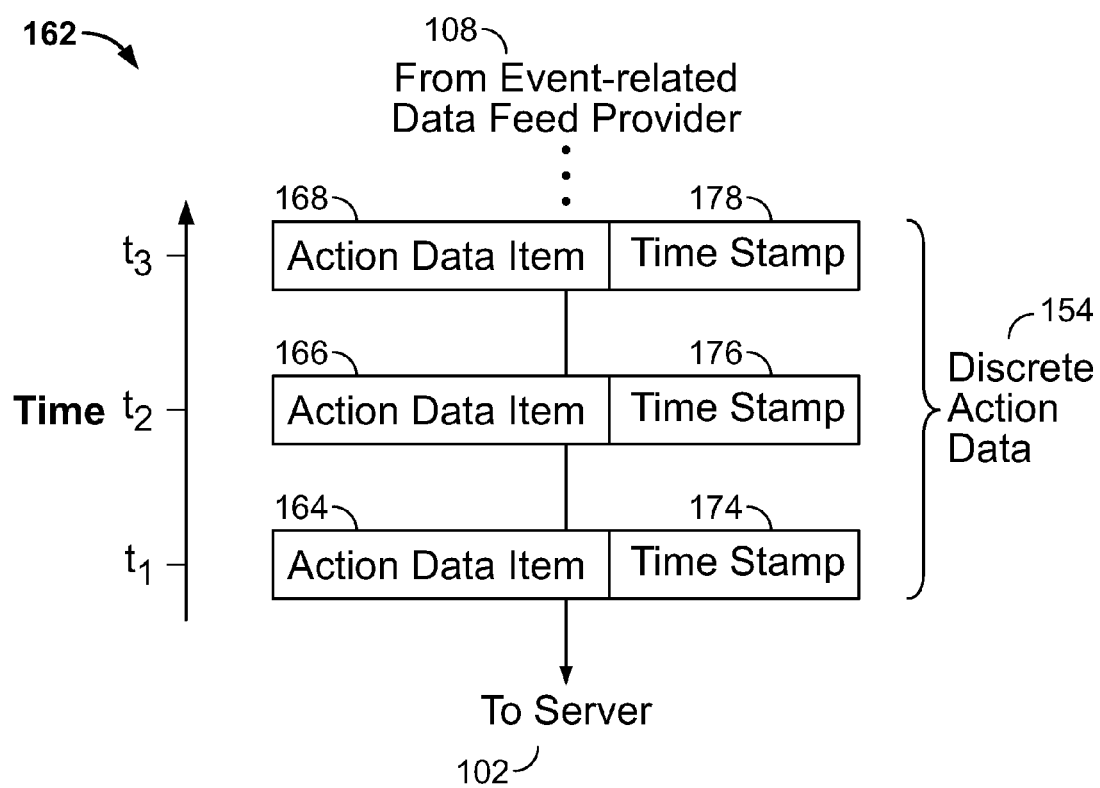
FIG. 3 is a schematic diagram illustrating an example of a discrete action data feed, such as transmitted from an event-related data feed provider to a server.

FIGS. 2-3 illustrate examples of the event-related data 114 feed.

FIG. 2 is a schematic block diagram illustrating an example of the event-related data 114, such as provided by the event-related data feed provider 108 to the server 102 in some embodiments. In this example, the event-related data 114 includes general event information 152 and discrete action data 154.

The general event information 152 includes general information about the event. In some embodiments, the general event information 152 includes information regarding the event such as the names of the teams or groups participating, the names of the players or participants, details regarding the event venue and location, a schedule for the event, event statistics, and the like. In some embodiments, the general event information 152 includes one or more of the data feeds listed in Table 1. Other possible embodiments include more, fewer, or other data feeds.

TABLE 1

| Data Feed | Description |
| --- | --- |
| Daily Box Score | top-level runs, hits and errors by team, as well as details on run-scoring events for each game occurring that day |
| Daily Event Info & Lineups | the date, time, location and team lineups for a specific game |
| Daily Schedule | the date, time and location for every game, for the day |
| Event Info & Lineups | the date, time, location and team lineups for a specific game |
| Game Box Score | top-level runs, hits and errors by team, as well as details on run-scoring events |
| Game Statistics | detailed game stats at the player and team level, including pitching and batting breakouts |
| Glossary | full text descriptions for pitch ids, player status ids, outcome ids, and game status ids |
| League Schedule | the date, time and location for each game |
| Player Profiles | high level player information not directly associated to a particular team |
| Player Seasonal Statistics | season-to-date stats at the player level, including pitching and batting breakouts |
| Rolling 3 Day Schedule | the date, time and location for each game for yesterday, today, and tomorrow |
| Standings | top-level standings information including team, league, division, wins, and losses |
| Team Hierarchy | the name, market, league, division and venue for each team |
| Team Rosters (Active) | player information for active players associated with each team |
| Team Rosters (Full) | player information for all players associated with each team |
| Team Seasonal Statistics | detailed season-to-date stats at the team level, including pitching and batting breakouts |
| Venue Info | the name and location of each venue, along with the dimensions of each field |

In some embodiments the event-related data 114 includes discrete action data 154. In some embodiments, the discrete action data 154 provides play-by-play (or action-by-action) details regarding the event. Further, in some embodiments the discrete action data is streamed live as a real-time data feed. The real-time data feed is provided shortly after an action has occurred during the event, such as within 30 seconds, within 15 seconds, within 10 seconds, or within 5 seconds, for example. In some embodiments, such as in the baseball game example, the play-by-play information can include information on each pitch and on every play that occurs during the game. In some embodiments the data feed is not real-time, but is near real-time. An example of near real-time is longer than real-time, such as more than 30 seconds after the event has occurred, but within several hours of the event, or within several days of the event. In other embodiments, the discrete action data is not real-time, such as being historical data describing events that happened more than several days in the past.

In some embodiments the discrete action data 154 includes one or more of the data items listed in Table 2. Other possible embodiments include more, fewer, or other data items.

TABLE 2

| Data Item | Format |
| --- | --- |
| At bat description | String |
| At bat player id | GUID |
| Base runner - ending base | Integer |
| Base runner - outcome id | String |
| Base runner - player id | GUID |
| Base runner - starting base | Integer |
| Count -- Balls | Integer |
| Count - Outs | Integer |
| Count - Pitch count for batter | Integer |
| Count -- Strikes | Integer |
| Inning | Integer |
| Game id | GUID |
| Game status | String |
| Inning half | String |
| Home team id | GUID |
| Insert Date/Time | Date/time |
| Lineup - Batting position | Integer |
| Lineup -- Position | Integer |
| Lineup - Lineup id | GUID |
| Lineup - Player id | GUID |
| Lineup - Team id | GUID |
| Losing pitcher | GUID |
| Pitch count for the game | Integer |
| Pitch flag - At bat | Boolean |
| Pitch flag - At bat over | Boolean |
| Pitch flag - Batter hit | Boolean |
| Pitch flag - Bunt shown | Boolean |
| Pitch flag - Double play | Boolean |
| Pitch flag - Passed ball | Boolean |
| Pitch flag - Runner on base | Boolean |
| Pitch flag - Wild pitch | Boolean |
| Pitch id | GUID |
| Pitch location - x coordinate | Decimal |
| Pitch location - y coordinate | Decimal |
| Pitch outcome id | String |
| Pitch type | String |
| Pitcher earning save | GUID |
| Pitcher id | GUID |
| Player id | GUID |
| Updated date/time | Date/time |
| Visiting team id | GUID |
| Winning pitcher | GUID |

One example of a suitable event-related data feed provider 108 is the data feed service provided by SportsData LLC of St. Paul, Minn.

FIG. 3 is a schematic block diagram illustrating an example of the discrete action data 154 feed, such as transmitted from the event-related data feed provider 108 to the server 102. In this example, the discrete action data 154 includes a stream of action data items 162 (including action data items 164, 166, and 168) and time stamps 172 (including time stamps 174, 176, and 178).

The action data items 162 define a discrete action that has occurred during the event. Examples of action data items 162 are provided in Table 2 above for an exemplary baseball event, such as describing the occurrence of a pitch, the result of the pitch, players involved in a play, the result of the play, etc. Other sports have their own discrete set of actions that can occur, which can be recorded and provided through the discrete action data 154 feed. As another example, in a music concert event, the action data items can include details regarding the songs that are performed, the musicians involved, special effects that occur, a drum solo, or any other discrete action that is documentable during the event.

In the example shown in FIG. 3, a first action data item 164 is provided at a certain time (e.g., time t1). The action data item 164 includes data that identifies the discrete action that has occurred during the event, and a time stamp 174 indicating the time that that action occurred. Multiple action data items 164 can be sent at a single time (time t1) to describe multiple actions that occurred at that time (e.g., a strike is pitched, and the batter is struck out).

Additional action data items 162 are sent as they occur, including an action data item 166 that is sent at time t2 and action data item 168 that is sent at time t3. Although three action data items are shown in FIG. 3, the discrete action data 154 feed can include many more action data items 162 as appropriate. In some embodiments, each of the action data items 166, 168 includes a time stamp 176, 178 identifying the time at which the corresponding discrete action occurred during the event. Discrete action items can include multiple time stamps, such as timestamps indicating start and end times for the discrete actions. The start and stop times can be used, for example, to identify a range of times during which the discrete action occurred. As discussed herein, the range of times can be compared with a time stamp associated with a media content item to match the media content item with a discrete action that occurred at that time, for example.

Figure 4:
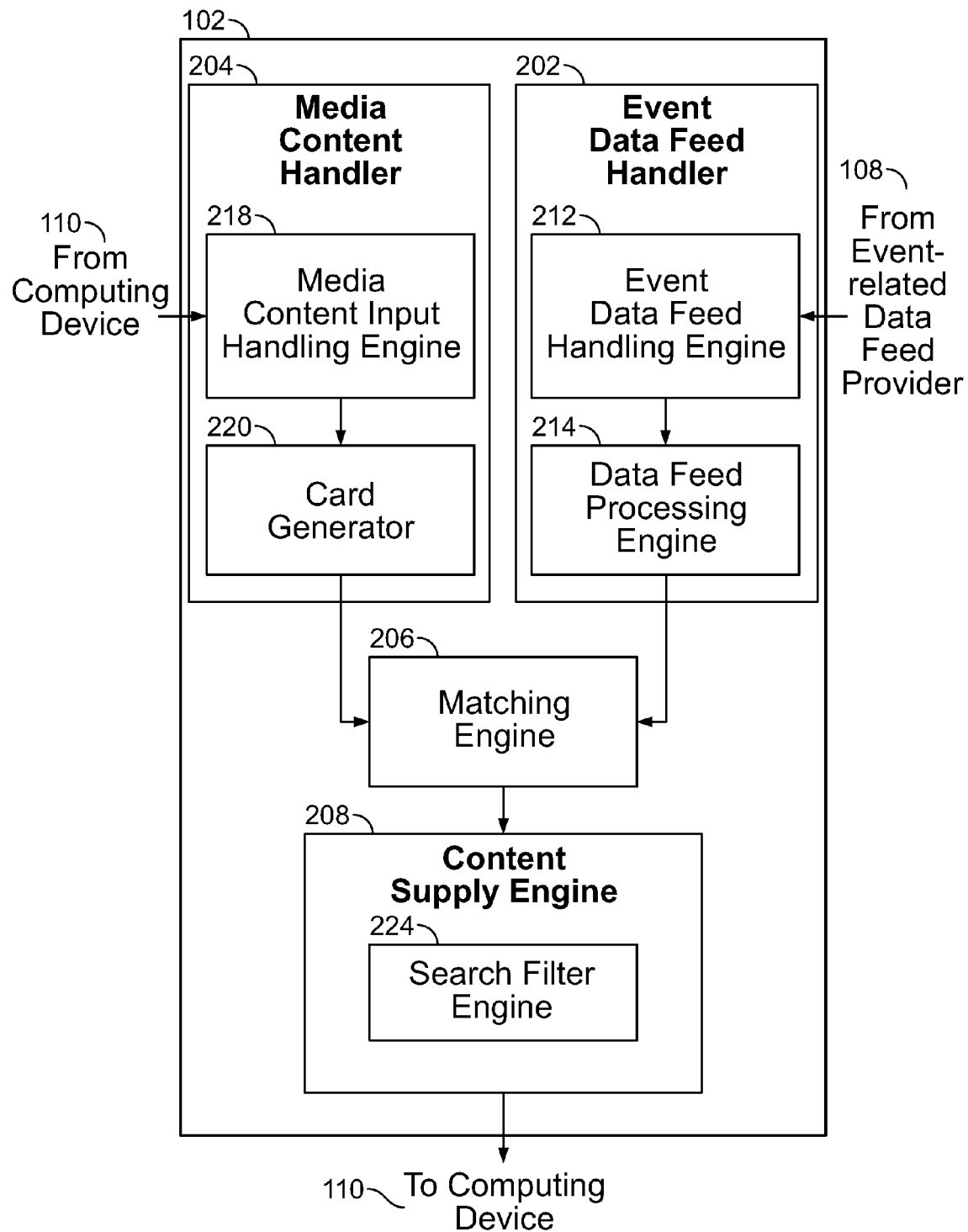
FIG. 4 is a schematic block diagram illustrating an example of the server.
Figure 5:
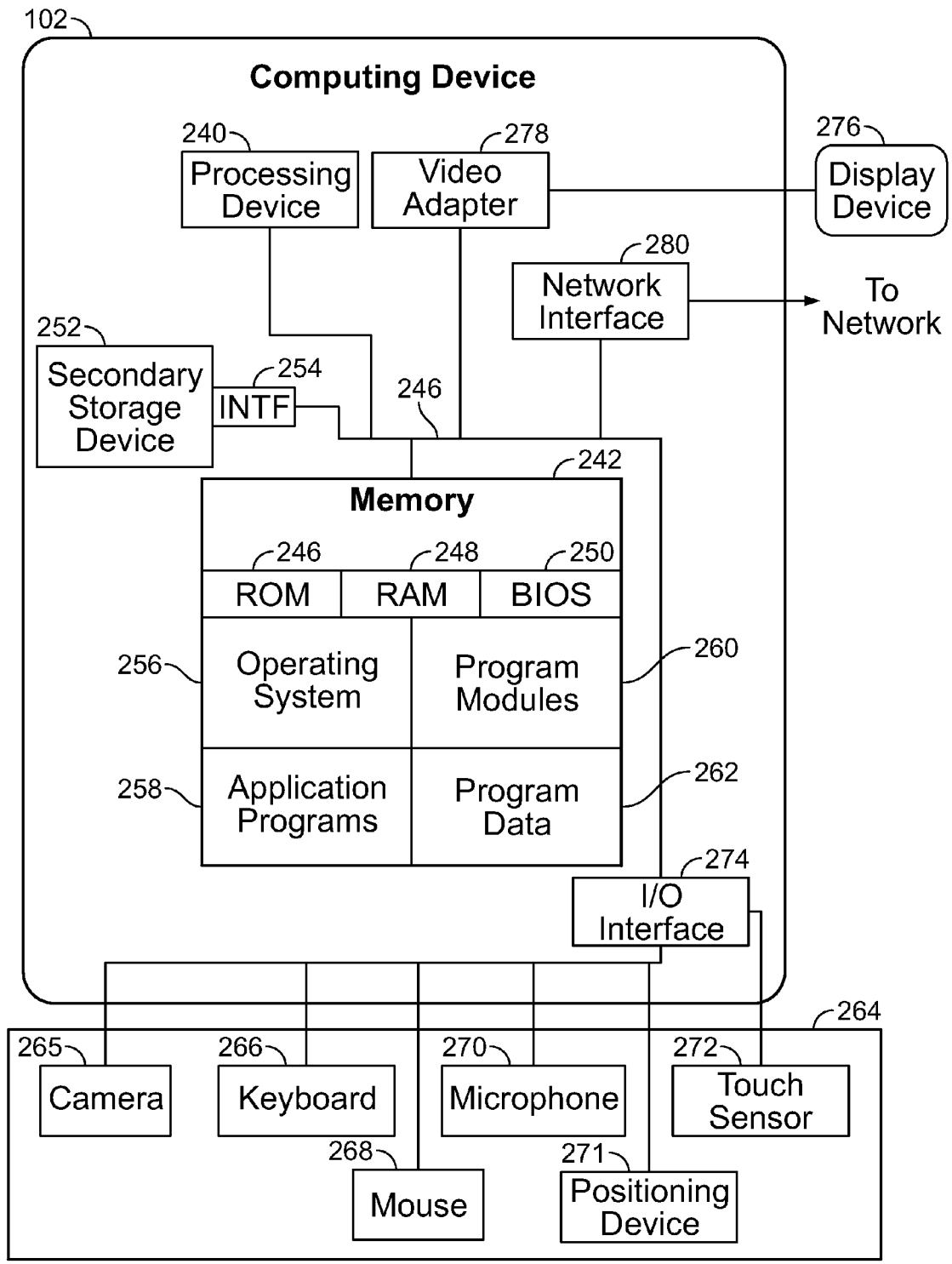
FIG. 5 illustrates an exemplary architecture of a computing device that can be used to implement aspects of the present disclosure.

FIGS. 4-5 illustrate examples of the server 102.

FIG. 4 is a schematic block diagram illustrating an example of the server 102. In this example, the server includes an event data feed handler 202, a media content handler 204, a matching engine 206, and a content supply engine 208.

The event data feed handler 202 receives and processes the event-related data 114, such as provided by the event-related data feed provider 108. In some embodiments, the event data feed handler 202 includes an event data feed handling engine 212 and a data feed processing engine 214.

The event data feed handling engine 212 handles communications with the event-related data feed provider 108. For example, in some embodiments the event data feed handling engine operates according to data communication protocols to receive the event-related data 114.

Once the event-related data 114 is received it is processed by the data feed processing engine 214. In some embodiments, the event-related data 114 is filtered and parsed according to predetermined rules. One example of the processing performed by the data feed processing engine 214 is illustrated and described in more detail with reference to FIG. 5.

The media content handler 204 receives and processes media content, such as from one or more computing devices 110. In some embodiments, the media content handler 204 includes a media content input handling engine 218 and a card generator 220.

The media content input handling engine 218 handles communication with the computing devices 110 to receive media content. In some embodiments the media content input handling engine 218 provides a web-page interface through one or more URL's through which the computing devices 110 can provide media content. In some embodiments the media content input handling engine 218 also or alternatively provides one or more application programming interfaces (API) through which communication can occur between the computing devices 110 and the server 102. Other embodiments communicate in other ways.

The card generator 220 operates to store the media content in the data store 104 in a form referred to herein as a media content card, for subsequent distribution by the content supply engine 208 to be displayed on the computing devices 110. Examples of media content cards are illustrated in FIGS. 22 and 23. In some embodiments a card includes at least one of: a type of non-text media content (e.g., video, audio, or a photograph), text content, and an icon. In some embodiments cards are also time stamped, as discussed in further detail herein. Examples of card generation are illustrated and described in more detail with reference to FIGS. 12-14.

The matching engine 222 is provided in some embodiments to match cards and media content from the media content handler 204 with the actions occurring during an event as identified by the event data feed handler 202. As one example, a time stamp of a card generated by the media content handler 204 is compared with one or more time stamps associated with actions during the event. In some embodiments the matching engine 206 automatically associates the card with one or more actions that occurred at that time. In other embodiments, the user is prompted to select an action, and the matching action determines whether the card time stamp matches a range of times associated with the selected action. Matching of cards to events and event segments is illustrated and described in more detail with reference to FIGS. 15-17.

Event-related data and media content data are stored by the server 102 in the data store 104 (shown in FIG. 1). An example of the data store 104 is illustrated and described in more detail herein with reference to FIG. 7.

After event-related data and media content have been stored in the data store 104 (FIG. 1), the content supply engine 208 operates to send that data to mobile computing devices 110 for display to the users. In some embodiments, for example, event-related data 114 is used to generate timelines. Cards, generated by the card generator 220, are displayed in the timeline to arrange the media content in a chronological order. Some timelines are associated with a particular event, which permits the user to view the media items for that event in the chronological order. Examples of the data supplied by the content supply engine 208 are illustrated and described in more detail with reference to the content interaction engine 432 shown in FIG. 24.

A search filter engine 224 is provided in some embodiments to receive search requests, defined by users, and to filter the content that is displayed to the user in the timelines. The search filter engine 224 can be used to filter by keywords, types of media items, types of actions, etc. Examples of the operation of the search filter engine 224 are illustrated and described in more detail with reference to FIGS. 31-32.

FIG. 5 illustrates an exemplary architecture of a computing device that can be used to implement aspects of the present disclosure, including any of the: server 102, computing devices 110 (including computing device 120 or computing device 122), the event-related data feed provider 108, and the other associated systems 112 (including the payment processor 130, third-party social media systems 132, and media and broadcast networks 134). The computing device illustrated in FIG. 5 can be used to execute the operating system, application programs, and software modules (including any one or more of the engines) described herein. By way of example, the computing device will be described below as the server 102 computing device. To avoid undue repetition, this description of the computing device will not be separately repeated herein for each of the other computing devices, including those listed above, but such devices can also be configured as illustrated and described with reference to FIG. 5, or in a similar manner.

The server 102 computing device includes, in some embodiments, at least one processing device 240, such as a central processing unit (CPU). A variety of processing devices are available from a variety of manufacturers, for example, Intel or Advanced Micro Devices. In this example, the server 102 computing device also includes a system memory 242, and a system bus 244 that couples various system components including the system memory 242 to the processing device 240. The system bus 244 is one of any number of types of bus structures including a memory bus, or memory controller; a peripheral bus; and a local bus using any of a variety of bus architectures.

Examples of computing devices suitable for the server 102 computing device or other computing devices described herein include a desktop computer, a laptop computer, a tablet computer, a mobile computing device (such as a smart phone, an iPod® or iPad® mobile digital device, or other mobile devices), or other devices configured to process digital instructions.

The system memory 242 includes read only memory 246 and random access memory 248. A basic input/output system 250 containing the basic routines that act to transfer information within the server 102 computing device, such as during start up, is typically stored in the read only memory 246.

The server 102 computing device also includes a secondary storage device 252 in some embodiments, such as a hard disk drive, for storing digital data. The secondary storage device 252 is connected to the system bus 244 by a secondary storage interface 254. The secondary storage devices 252 and their associated computer readable media provide nonvolatile storage of computer readable instructions (including application programs and program modules), data structures, and other data for the server 102 computing device.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. Additionally, such computer readable storage media can include local storage or cloud-based storage.

A number of program modules can be stored in secondary storage device 252 or memory 242, including an operating system 256, one or more application programs 258, other program modules 260 (such as the software engines described herein), and program data 262. The server 102 computing device can utilize any suitable operating system, such as Microsoft Windows™, Google Chrome™, Apple OS, and any other operating system suitable for a computing device.

In some embodiments, a user provides inputs to the server 102 computing device through one or more input devices 264. Examples of input devices 264 include a camera 265, a keyboard 266, a mouse 268, a microphone 270, a positioning device 271, and touch sensor 272 (such as a touchpad or touch sensitive display). Other examples of input devices include a remote control, or a natural user interface device (such as the Microsoft Kinect® device). Other embodiments include other input devices 264. The input devices are often connected to the processing device 240 through an input/output interface 274 that is coupled to the system bus 244. These input devices 264 can be connected by any number of input/output interfaces, such as a parallel port, serial port, game port, or a universal serial bus. Wireless communication between input devices and the interface 274 is possible as well, and includes infrared, BLUETOOTH® wireless technology, 802.11a/b/g/n, cellular, or other radio frequency communication systems in some possible embodiments.

In this example embodiment, a display device 276, such as a monitor, liquid crystal display device, projector, or touch sensitive display device, is also connected to the system bus 244 via an interface, such as a video adapter 278. Another example of the display device 276 is a television. In addition to the display device 276, the server 102 computing device can include various other peripheral devices (not shown), such as speakers or a printer.

When used in a local area networking environment or a wide area networking environment (such as the Internet), the server 102 computing device is typically connected to the network 106 through a network interface 280, such as an Ethernet interface, a cellular communication interface, or other wireless or wired communication interface. Other possible embodiments use other communication devices. For example, some embodiments of the server 102 computing device include a modem for communicating across the network.

The server 102 computing device typically includes at least some form of computer readable media. Computer readable media includes any available media that can be accessed by the server 102 computing device. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the server 102 computing device. Computer readable storage media does not include computer readable communication media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 5 is also an example of programmable electronics, which may include one or more such computing devices, and when multiple computing devices are included, such computing devices can be coupled together with a suitable data communication network so as to collectively perform the various functions, methods, or operations disclosed herein.

Figure 6:
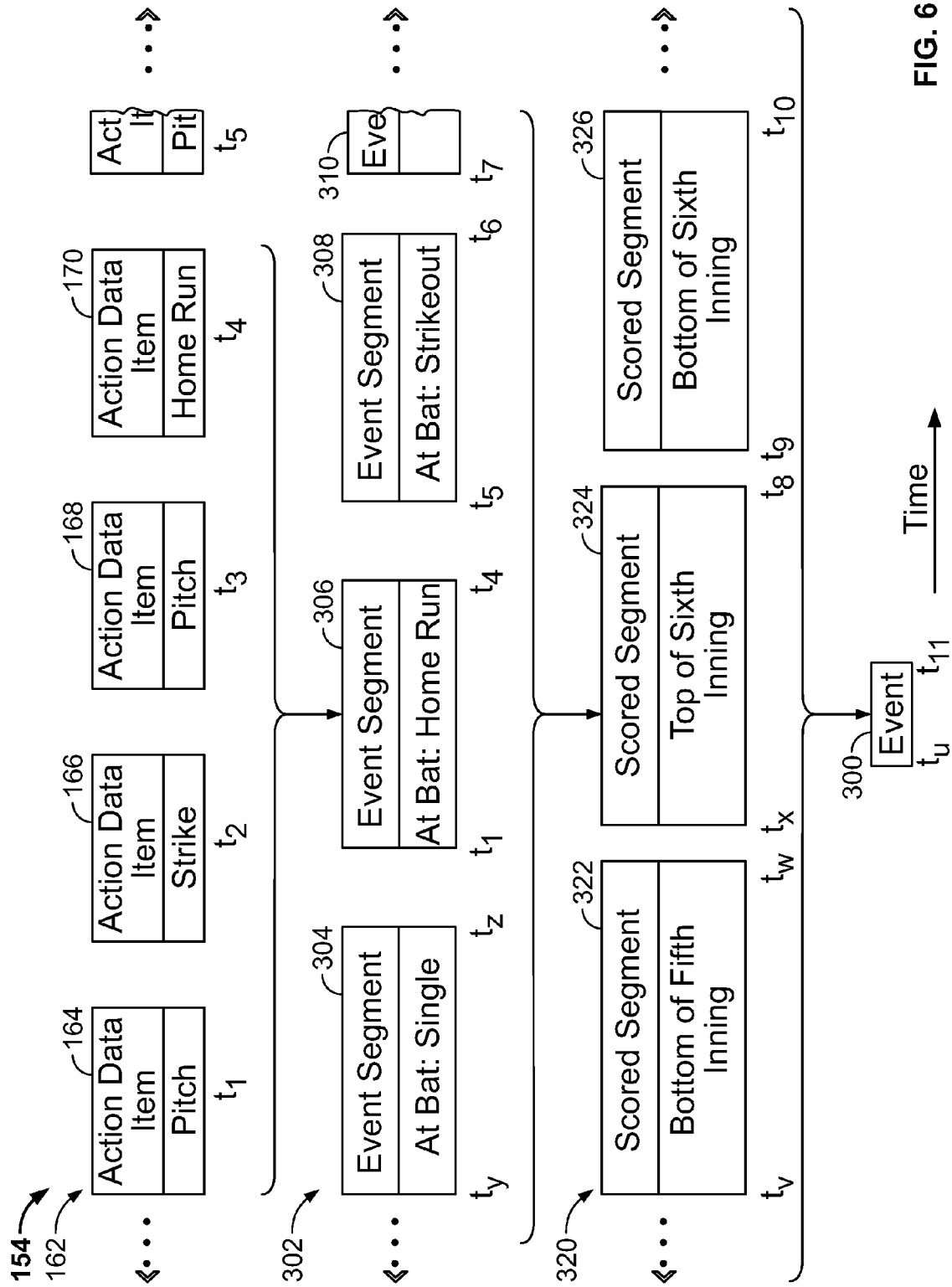
FIG. 6 is a schematic diagram illustrating an exemplary method of processing an event data feed.

FIG. 6 is a schematic diagram illustrating an exemplary method of processing an event data feed. In some embodiments, the method is an operation performed by the data feed processing engine 214, shown in FIG. 14.

In some embodiments, the event-related data feed provider 108 (shown in FIGS. 1-4) provides a discrete action data 154 feed which describes in great detail discrete actions that occur over the course of an event 300. In some embodiments, it is desirable to group the discrete actions into broader event segments. For example, although the discrete action data 154 feed may detail each and every pitch of a game, it may be overwhelming if such detail was all displayed on an event timeline. Therefore, in some embodiments the discrete action data 154 is processed by the data feed processing engine 214 to identify broader event segments that can encompass multiple discrete action data items. In doing so, the data feed processing engine 214 divides the event 300 into event segments that are more likely to be of interest to users.

In this example shown in FIG. 6, the discrete action data 154 feed includes multiple action data items 162, including action data items 164 (at time t1), 176 (at time t2), 178 (at time t3), and 180 (at time t4).

The action data items 162 are processed to group the action data items 162 into event segments 302. In this example, the event segments 302 include event segments 304, 306, 308, and 310. The event segment 306 is generated based on the action data items 164, 166, 168, and 170. More specifically, the event segment 306 begins at the time (t1) of the action data item 174, and ends at the time (t4) of the action data item 180.

In some embodiments, the data feed processing engine 214 generates the event segments 302 based on a set of rules. For example, the event segment 306 is generated using a rule that states that a new event segment should begin when a player comes up to bat. In this case, the first pitch to the player (action data item 174) is therefore identified as the beginning of event segment 306. The event segment 306 is also generated using a rule that states that an event segment should end upon the conclusion of the player's at bat. In this case, the action data item 180 indicates that the player hit a home run at time t4, and therefore the event segment 306 concludes at the time (t4) of the action data item 180 for the home run. In some embodiments the time of the event segment is identified as beginning or ending a predetermined time before or after an event. For a home run, for example, it is known that it will take the player some time to run around the bases, and therefore the event segment 306 can be determined to conclude after a period of time (e.g. 25 seconds) has elapsed after the action data item 180. In some embodiments, the rules engine utilized by the data feed processing engine includes a list of important actions (e.g., a new player coming to bat, a home run, a single, a double, a triple, a strikeout, etc.), and event segments are defined to start and end when an action data item 162 matches one of the actions in the list of important actions. In this way, the entire event 300 can be divided into a series of event segments 302. In some embodiments the event segments 302 are non-overlapping in time. In some embodiments the event segments 302 also include a pre-game event segment and a post-game event segment. The pre-game event segment encompasses a period of time before and up to the beginning of an event, and the post-game event segment encompasses a period of time immediately following the conclusion of the event.

In some embodiments, the event segments 302 are also grouped together by the data feed processing engine 214. In this example, the event segments 302 are grouped together into scored segments 320. Scored segments 320 correspond with the scoring system of a sport, for example, and identify the unit of measurement that is used for scoring of the particular sport. In the baseball example shown in FIG. 6, a baseball game is scored by half innings, and therefore the event segments 302 are grouped together to generate scored segments 320 corresponding to each half inning More specifically, the scored segments 320 include a scored segment 322 for the bottom of the fifth inning, a scored segment 324 for the top of the sixth inning, a scored segment 326 for the bottom of the sixth inning, etc. The scored segment 324 begins at a time tx and ends at a time t8, and encompasses all of the event segments 302 therebetween, including event segments 304, 306, 308, 310, etc.

In non-scored events, the segments 320 can be defined by other periods, sessions, or other logical divisions of the event, rather than being based upon segments of time used for scoring.

In some embodiments the times associated with the action data feeds are the recording times—the times at which the action data items are recorded by a person observing the event. The recording times are slightly delayed from the actual time in some embodiments. Therefore, in some embodiments the recording times are converted to actual times by subtracting a predetermined delay time from the recorded time. In some embodiments the delay time includes a broadcast time delay (a delay required to broadcast the event across a television or other video communication system) as well as an entry time delay. An example of a broadcast time delay might be 3 seconds, and an example of an entry time delay might be another 3 seconds. Therefore, an example of the delay time is 6 seconds.

Figure 7:
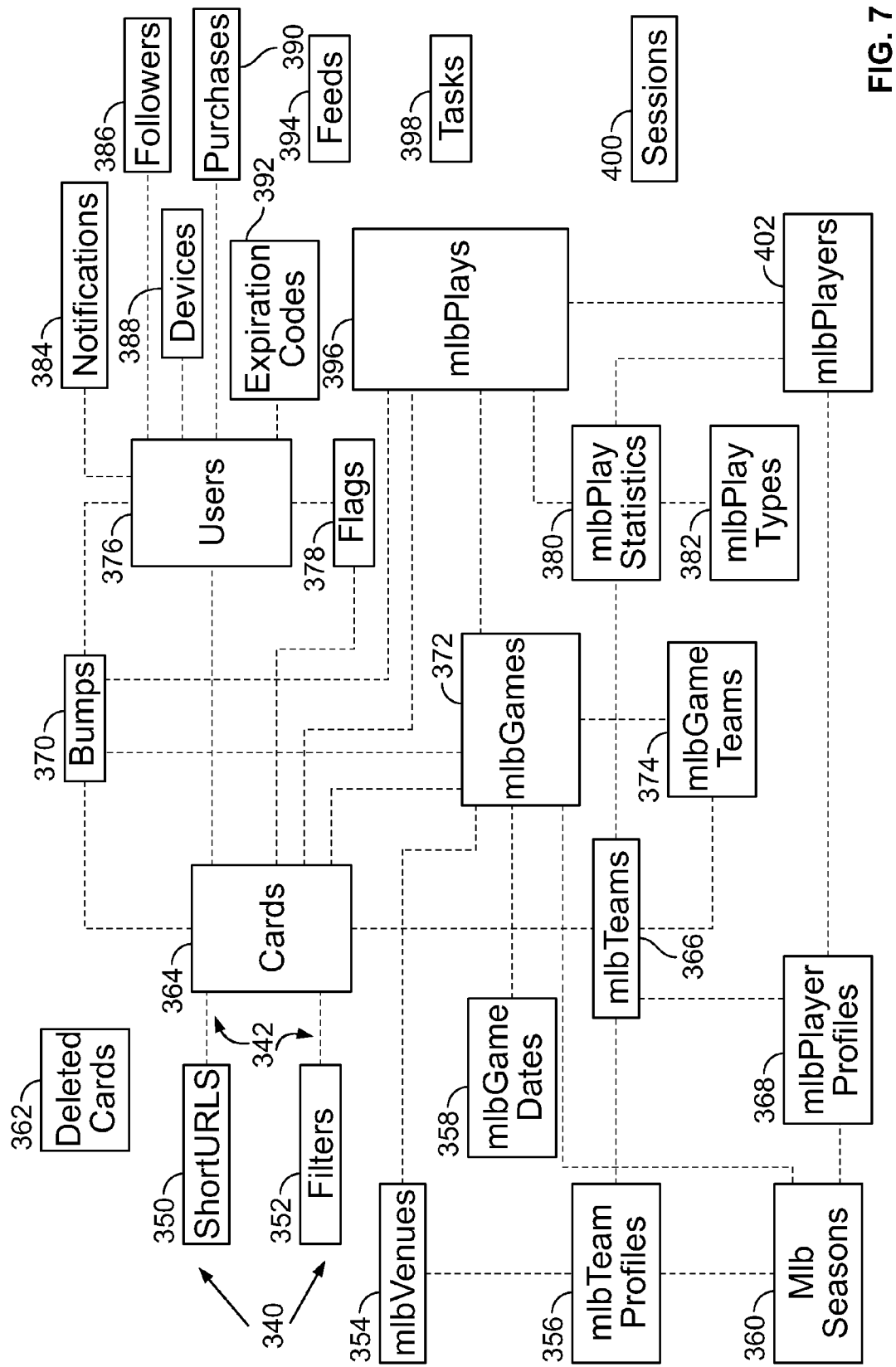
FIG. 7 is a schematic diagram illustrating an example structure of a data store of the event-related media management system shown in FIG. 1.

FIG. 7 is a schematic diagram illustrating an example structure of the data store 104, shown in FIG. 1. This example of the data store 104 shows exemplary data structures utilized for a baseball event. The database includes a plurality of records 340 and a plurality of relationships 342 defined between the records.

In some embodiments the data store 104 is a relational database in which the records 340 are tables and the relationships 342 are defined within the tables. In other embodiments the data store 104 is a graph database in which the records 340 are nodes and the relationships 342 are defined by edges.

In this example, the records include a shortUrls record 350, filters record 352, mlb Venues record 354, mlb Team Profiles record 356, mlb Game Dates record 358, mlb Seasons record 360, deleted Cards record 362, cards record 364, mlb Teams record 366, mlb Player Profiles record 368, bumps record 370, mlb Games record 372, mlb Game Teams record 374, users record 376, flags record 378, mlb Play Statistics record 380, mlb Play Types record 382, notifications record 384, followers record 386, devices record 388, purchases record 390, expiration codes record 392, feeds record 394, mlb Plays record 396, tasks record 398, sessions record 400, and mlb Players record 402. Other embodiments include more, fewer, or different records.

In some embodiments, the records include the following exemplary data items. Other embodiments include more, fewer, or different data items.

The short Urls record 350 includes an id, url, value, and created data item.

The filters record 352 includes an id, cardId, type, order, and created data item.

The mlbVenues record 354 includes an id, name, location and created data item.

The mlb Team Profiles record 356 includes an id, mlbTeamId, mlbSeasonId, mlbVenueId, name, abbreviation, location, league, division and created data item.

The mlb Game Dates record 358 includes an id, mlb Game Id, date and created data item.

The mlb Seasons record 360 includes an id, year and created data item.

The deleted Cards record 362 includes an id, mlb Game Id, mlb Play Id and created data item.

The cards record 364 includes an id, user Id, parent Id, app, mlb Game Id, mlb Play Id, child Count, bump Count, text Type, asset Type, short Url Id, date, text, text Plain, icon, filter, photo Path, photo Urls, video Path, video Url, width, height, certified, delta, created and updated data item.

The mlb Teams record 366 includes an id and created data items.

The mlb Player Profiles record 368 includes an id, mlb Player Id, mlb Team Id, mlb Season Id, date, status, position, number, height, weight and created data item.

The bumps record 370 includes an id, user Id, card Id, mlb Game Id, mlb Play Id and created data item.

The mlb Games record 372 includes an id, mlb Season Id, mlb Venue Id, home Team Id, visitor Team Id, date, season Type, status, inning, inning Half, balls, strikes, out, simulation, bump Count, card Count and created data item.

The mlb Game Teams record 374 includes an id, mlb Game Id, mlb Team Id, wins, losses, won, lost, runs, hits, errors, innings and created data item.

The users record 376 includes an id, first Name, last Name, email, birthday, gender, username, password, salt, status, role, anonymous Key, avatar Type, avatar Path, avatar Urls, banner Type, banner Path, banner Urls, favorite Mlb Team Id, follower Count, following Count, card Count, created and updated data item.

The flags record 378 includes an id, card Id, user Id and created data item.

The mlb Play Statistics record 380 includes an id, mlb Play Id, mlb Player Id, mlb Team Id, mlb Play Type Id and type data item.

The mlb Play Types record 382 includes an id, category, order, name, abbreviation, visible, searchable, outcomes, offensive, defensive, template, exclusions and created data item.

The notifications record 384 includes an id, user Id, app, message, status, process, error, created and updated data item.

The followers record 386 includes a user Id and a follower Id data item.

The devices record 388 includes an id, user Id, text Type, created and updated data item.

The purchases record 390 includes an id, user Id, product Id, receipt and created data item.

The expiration codes record 392 includes an id, user Id, type, expiration Date and created data item.

The feeds record 394 includes an id, type, key, started, finished, duration, error and created data item.

The tasks mlb Plays record 396 includes an id, mlb Game Id, date, mlb Play Type Id, outcome, visible, description, pitcher Id, batter Id, inning, inning Half, balls, strikes, out, inning Over, game Over, game Status, rbi, runs, home Runs, visitor Runs, bump Count, card Count and created data item.

The tasks record 398 includes an id, file, data, started, finished, duration, error and created data item.

The sessions record 400 includes an id, modified, lifetime and data item.

The mlb Players record 402 includes an id, first Name, last Name, birth date, bat Hand, throw Hand and created data item.

An exemplary set of relationships 342 between the records 340 is illustrated in FIG. 7. Other embodiments include more, fewer, or different relationships.

An exemplary set of data items contained within each record 340 is also illustrated in FIG. 7. Other embodiments include more, fewer, or different data items.

FIGS. 8-32 illustrate aspects of the event-related user interaction system 111, as well as aspects of the server 102 when cooperating with the event-related user interaction system 111.

Figure 8:
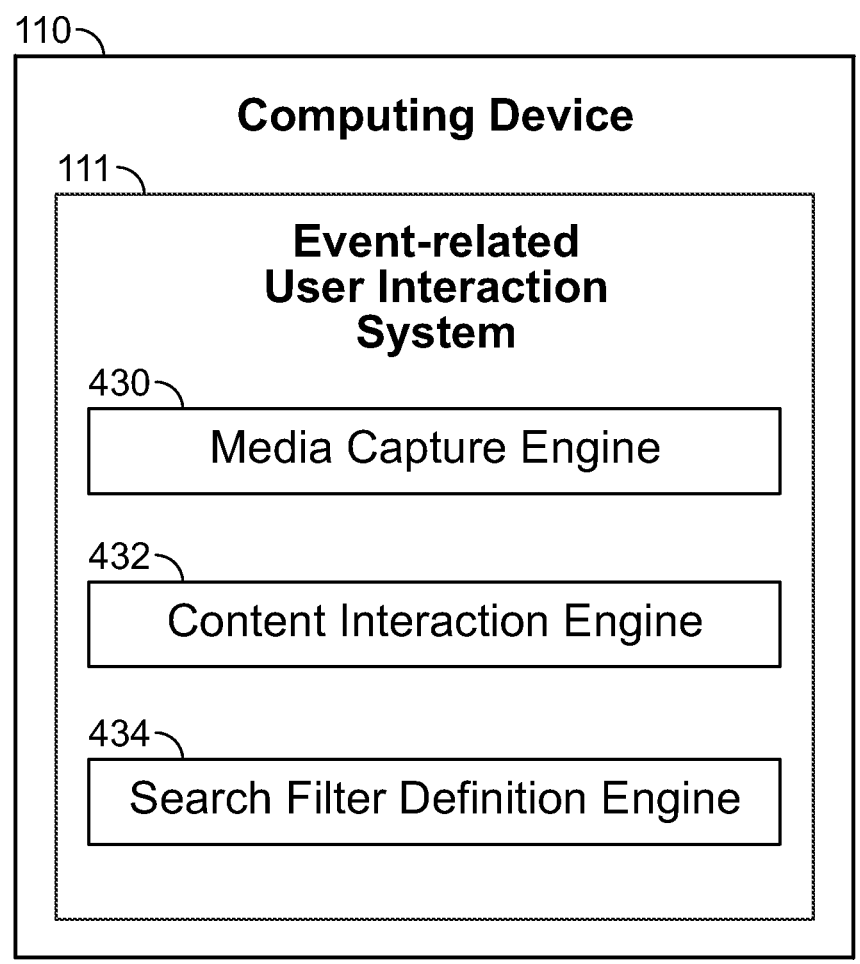
FIG. 8 is a schematic block diagram of an example of a computing device including an example of an event-related user interaction system.

FIG. 8 is a schematic block diagram of an example of the computing device 110, including an example of the event-related user interaction system 111. In this example, the event-related user interaction system 111 includes a media capture engine 430, a content interaction engine 432, and a search filter definition engine 434.

In some embodiments, the event-related user interaction system 111 is a software app stored in a computer-readable storage device of the computing device 110. The software app includes data instructions that are executable by a processing device (e.g., the processing device 240, shown in FIG. 5) of the computing device 110 to perform the operations, functions, methods, or features described herein. Although certain operations are described as being performed on the computing device 110, other embodiments can transfer the performance of at least some of these operations to other computing devices in other embodiments. Additionally, in another possible embodiment the event-related user interaction system is or includes a browser software application, which generates a user interface based on data provided by the server 102. In this example, some of the operations described as being performed on the computing device 110 could instead be performed by the server 102, but displayed on the computing device 110 through the browser. Other embodiments are implemented in yet other configurations.

In some embodiments the computing device 110 is a mobile computing device, such as a smartphone (e.g., an iPhone™, Blackberry™, Windows™, or Android™ mobile computing device), a tablet computer (e.g., an iPad™ mobile computing device), a laptop, a wearable computing device (e.g., the Google Glass™ wearable device, a watch-style device, or a patch device), an implantable computing device, a camera, a video recorder, an audio recorder, an Internet of Things device, and the like. In other embodiments, the computing device 110 is a less portable computing device, such as a desktop computer. Another example of a computing device 110 is a television, such as a smart television.

The event-related user interaction system 111 provides the interface between the event-related media management system 100 and the user U (FIG. 1). Accordingly, the event-related media management system 100 operates in some embodiments to receive inputs from the user, generate a user interface that is displayed or otherwise presented to the user, and capture media content and send the media content to the server 102.

In some embodiments the event-related user interaction system 111 includes the media capture engine 430, which operates to capture media items and send those media items to the server 102 for distribution through the event-related media management system 100. Examples of the media capture engine 430 are illustrated and described in further detail herein with reference to FIGS. 9-21.

The content interaction engine 432 operates to generate a user interface to present cards and media content to the user. Examples of the content interaction engine 432 are illustrated and described in further detail herein with reference to FIGS. 24-30.

The search filter definition engine 434 operates to receive from the user and define search filters to be applied to the content displayed by the content interaction engine 432. Examples of the search filter definition engine are described in further detail herein with reference to FIGS. 31-32.

Figure 9:
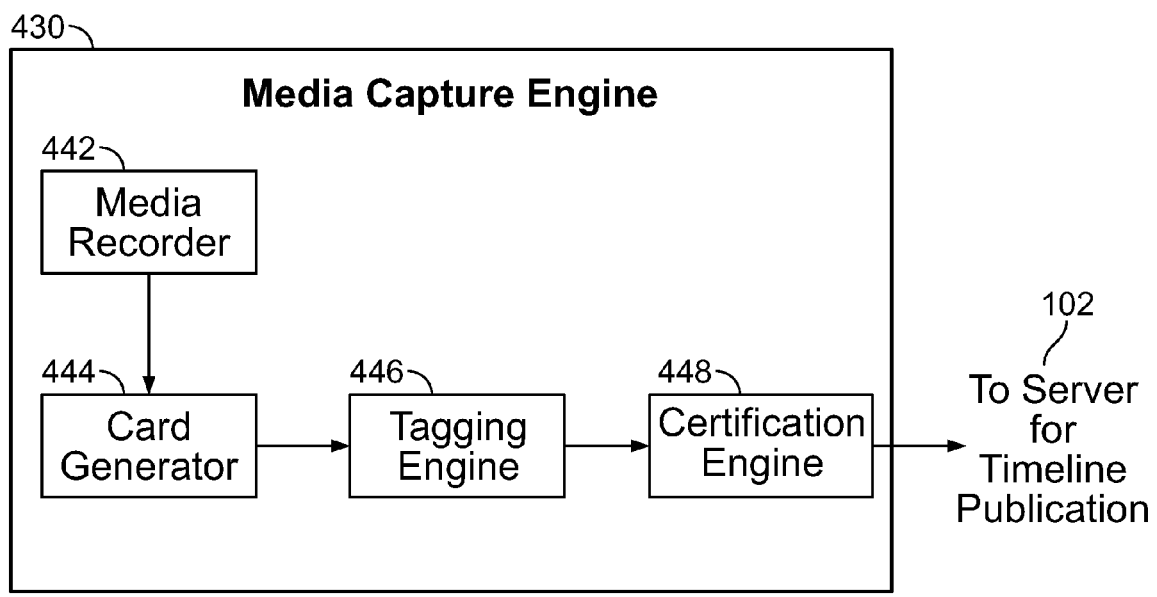
FIG. 9 is a schematic block diagram of an example of a media capture engine of the event-related user interaction system shown in FIG. 8.

FIG. 9 is a schematic block diagram of an example of the media capture engine 430, of the event-related user interaction system 111, shown in FIG. 8. In this example, the media capture engine 430 includes a media recorder 442, card generator 444, tagging engine 446, and certification engine 448.

The media recorder 442 operates to record non-text media content. In some embodiments, the media recorder 442 utilizes a camera and/or microphone of the computing device 110 to take a picture, record a video, or record audible sounds. For example, a mobile computing device 120 (FIG. 1) operated by the attendee user A at the event venue can utilize the media recorder 442 to record non-text media content of or associated with the event. An example could be a video recording or a photograph of the centerfielder jumping to catch a ball just before it passes the outfield fence. Once the media content has been recorded by the media recorder 442, it is stored in a computer-readable storage device. An example of the media recorder 442 is illustrated and described in more detail with reference to FIGS. 10-11.

The card generator 444 operates to generate a card. In some embodiments the card generator 444 cooperates with the server 102 to generate a card. The card can include the media content recorded by the media recorder 442, external media content (not recorded by the media recorder 442), text content, an icon, or other information or data, for example. In some embodiments, cards also include time stamps to permit them to be displayed within chronological (or reverse-chronological) timelines, as described herein. An example of the card generator 444 is illustrated and described in more detail with reference to FIGS. 12-14.

The tagging engine 446 operates in cooperation with the server 102 to tag cards with event-related data associated with the card. In some embodiments, cards are tagged to event segments to which they relate. For example, the card generated for the centerfielder's catch is tagged with the event segment generated for that play. Additional tagging of event-related data is also performed in some embodiments, such as to identify players involved in the play, the scored segment (e.g., half inning) associated with the play, the names of the teams, etc. The tagging engine 446 permits a lot of information to be associated with the card with little or no input from the user required, in some embodiments. An example of the tagging engine is illustrated and described in more detail with reference to FIG. 15-17.

In some embodiments the tagging of media content occurs at or near to the time at which the media content is generated. In other embodiments the media content is tagged at a later time after it is generated. For example, the tagging engine 446 can be operated to tag historical content with event-related data. In some embodiments the tagging engine 446 performs a method of method of retroactively converting a media content database, to contextualize the media content contained therein. An example of the method includes: obtaining data associated with the media content; processing the media content to associate the media content with contextual event-related data using the data; and associating the media items with contextual event-related data. The method can be used, for example, to add contextual event-related data to media items previously lacking the contextual data. In some embodiments the method or retroactively converting media content comprises tagging latent or archival content.

Further, in some embodiments the tagging engine 446 receives and processes media content to batch process collections of media content. For example, media content items can be selected or submitted and processed as a collection to tag media content to each of the media content items in the collection.

The certification engine 448 operates to evaluate the reliability of the card tagging performed by the tagging engine, such as by determine whether the tagging can be verified. If the tagging can be verified, the certification engine determines that the tagging is reliable and identifies the card as a certified card. If the tagging cannot be verified, the certification engine determines that the tagging is not reliable and identifies the card as an uncertified card. An example of the certification engine 448 is illustrated and described in more detail with reference to FIG. 21.

In some embodiments, after a card has been generated by the media capture engine 430, the card is sent to the server 102 for publication in one or more timelines, as described herein. Examples of the timelines are illustrated and described in more detail with reference to FIGS. 27-30.

Figure 10:
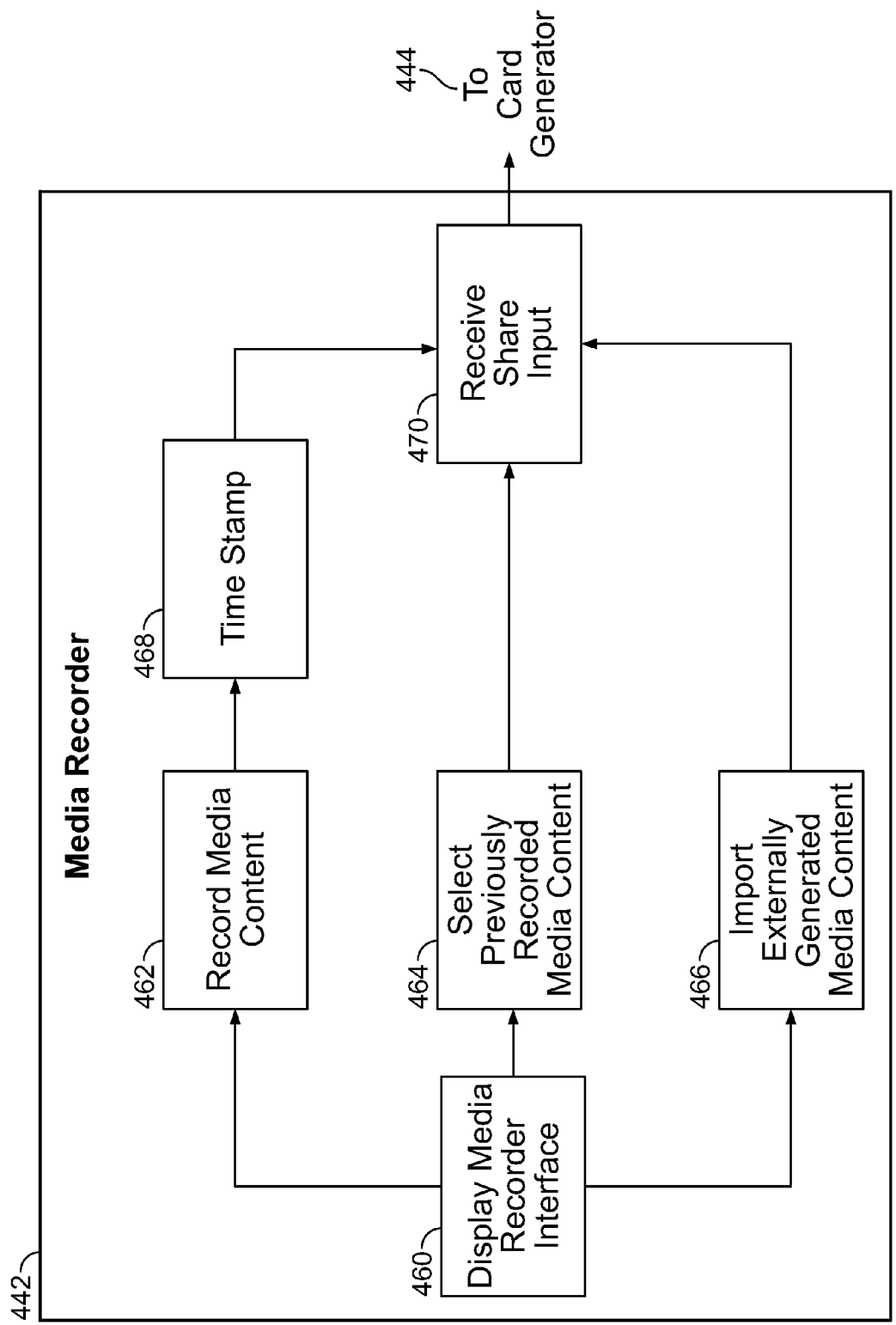
FIG. 10 is a flow chart illustrating an example of the operation of a media recorder.

FIG. 10 is a flow chart illustrating an example of the operation of the media recorder 442. In this example, the media recorder 442 performs operations 460, 462, 464, 466, 468, and 470.

Figure 11:
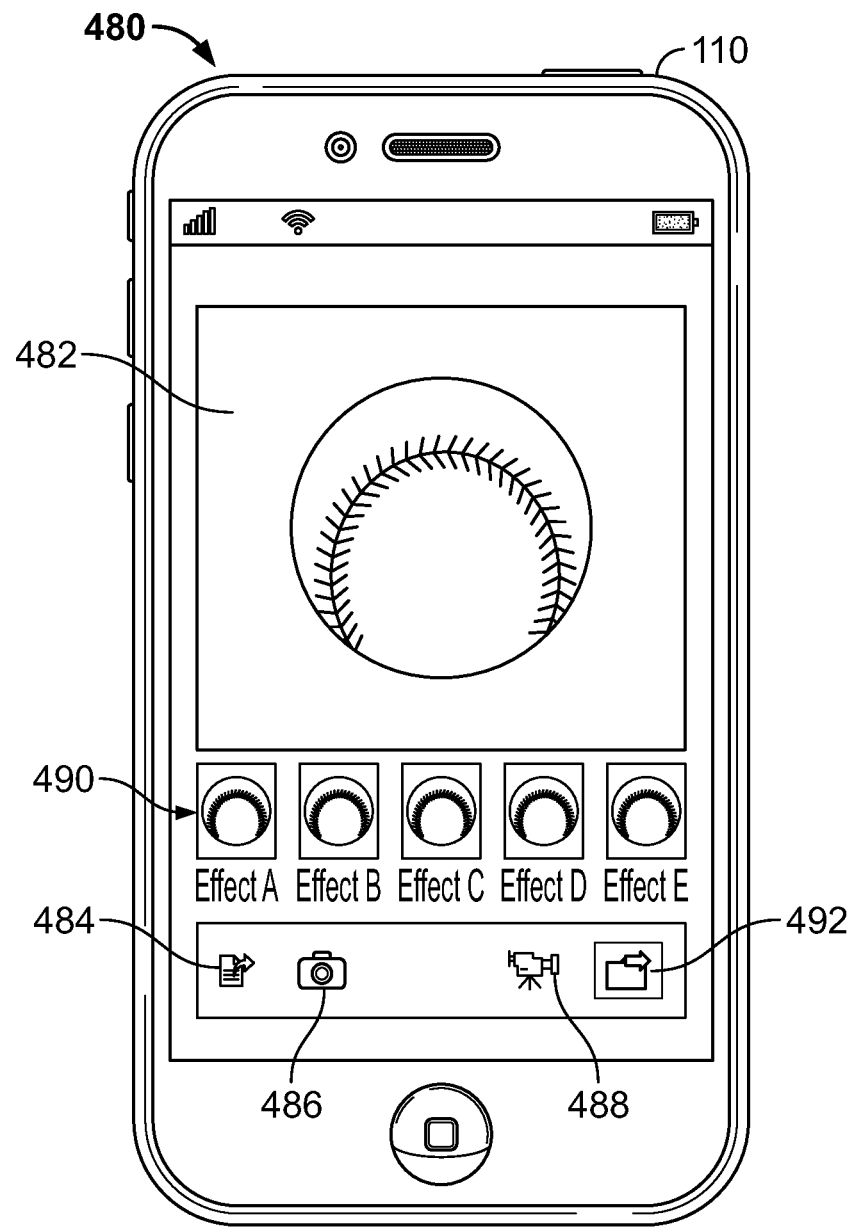
FIG. 11 illustrates an example of a computing device and a media recorder interface.

Operation 460 is performed to display a media recorder interface 480. An example of the media recorder interface 480 is shown in FIG. 11.

In some embodiments, the media recorder interface presents several options for obtaining media content. One option is to record media content in operation 462. Once recorded, the media content is tagged with a time stamp in operation 468 identifying the time at which the media content was recorded.

Another option is to select, in operation 464, media content that was previously recorded by the media recorder 442.

Yet another option is to import, in operation 466, externally generated media content. An example of externally generated media content is media content that is captured outside of the event-related user interaction system, or imported from an external source, such as from a third-party social media system 132 (FIG. 1), such as Facebook™, Twitter™, Instagram™, Pinterest™, Youtube™, or other external sources, such as a digital camera or digital video recorder. In some embodiments the media content from an external source is tagged with contextual event-related information. In some embodiments the media content from an external source is certified by the event-related media management system 100, as discussed herein.

Figure 12:
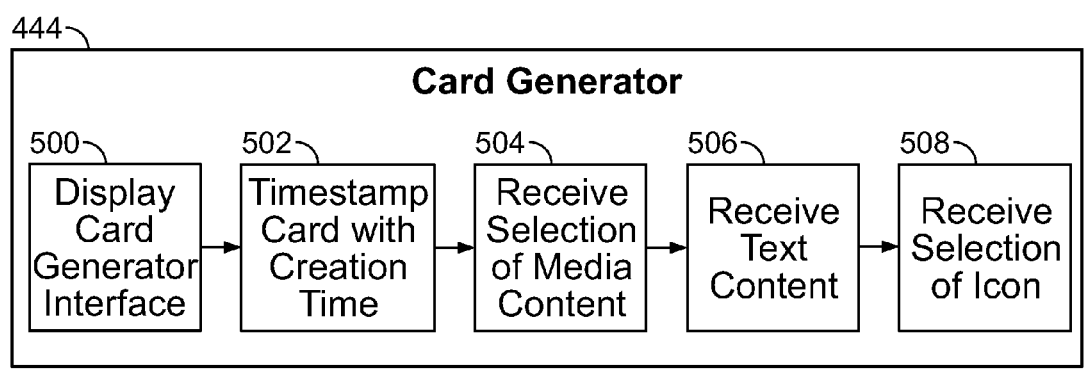
FIG. 12 is a flow chart illustrating an example of an operation of a card generator.

Once media content has been recorded or identified, an operation 470 is performed to receive a Share input from the user, indicating that the user wants to distribute the media content through the event-related media management system 100, which initiates the card generator 444, shown in FIGS. 9 and 12.

FIG. 11 illustrates an example of the computing device 110 and the media recorder interface 480. In this example the media recorder interface includes a preview window 482, selectable controls including an open button 484, a camera button 486, a video recording button 488, special effects controls 490, and a share button 492.

The preview window 482 displays the currently selected media content, or provides a preview of the media content presently available for recording through the camera.

The open button 484 is selectable to initiate the import operation 466, shown in FIG. 10. The camera and video recording buttons 486 and 488 are selectable to initiate the record operation 462, shown in FIG. 10. The share button 492 is selectable to perform operation 470 (FIG. 10) and to initiate the card generator 444, shown in FIG. 12.

Some embodiments further include special effects controls 490. Once media content has been recorded and selected, the special effects controls 490 are selectable to apply a special effect to the media content. Special effects include, for example, color, contrast, brightness, and focus adjustments. In some embodiments certain special effects are available only to users who have purchased them.

FIG. 12 is a flow chart illustrating an example of the operation of the card generator 444. In some embodiments, the card generator 444 performs one or more of operations 500, 502, 504, 506, and 508.

Figure 13:
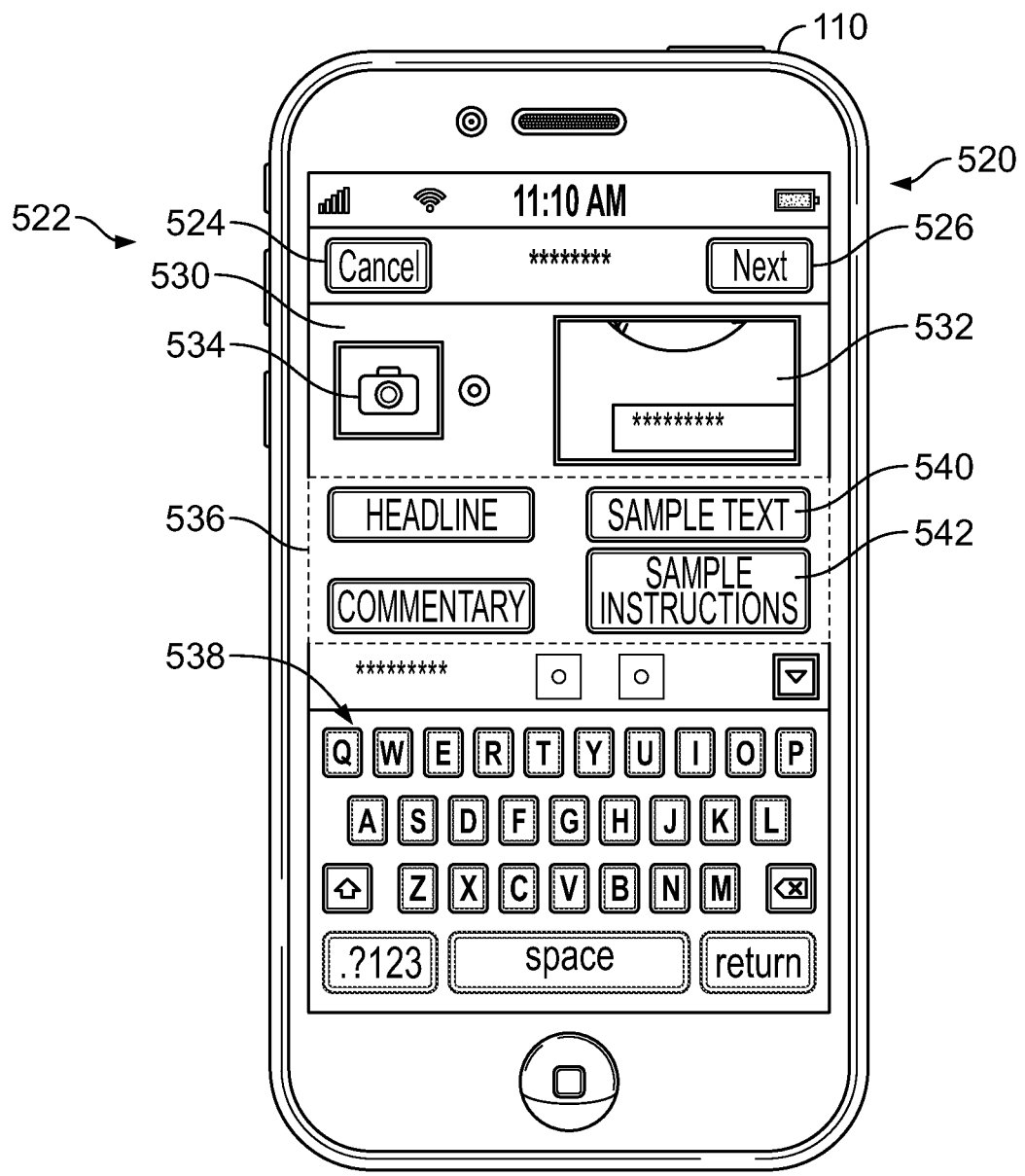
FIG. 13 illustrates an example of a computing device and an example of a card generator interface.

The operation 500 is performed to display the card generator interface 520. An example of the card generator interface 520 is shown in FIG. 13.

The operation 502 is performed to time stamp the card with a card creation time. The card creation time is different from the time that the media content is recorded (operation 462), and can be significantly different when the card is created by retrieving previously recorded media content (operation 464, shown in FIG. 10).

The operation 504 is performed to receive a selection of non-text media content, if not previously selected. Additionally, operation 504 can be performed to change the media content when one was previously selected.

The operation 506 is performed to receive text content to be included with the card.

The operation 508 is performed to receive a selection of an icon to be included with the card.

FIG. 13 illustrates an example of the computing device 110 and an example of the card generator interface 520. In this example, the card generator interface includes navigation controls 522 (including a cancel button 524 and a next button 526), a card preview window 530 (including a media content preview window 532), a media recorder button 534, text entry controls 536, and keypad 538.

The navigation controls 522 include a cancel button 524 that can be selected to exit the card generator 444 and a next button 526 that can be selected to initiate the tagging engine 446 (FIG. 9).

The preview window 530 provides a preview of the card as it is being generated. In this example, the preview window 530 includes a media content preview window 532 in which a thumbnail version of the selected media content (if any) is displayed.

If no media content has been selected, or to change the selected media content, the media recorder button 534 is provided. Upon selection of the media recorder button 534, the media recorder 442 is initiated, as shown and described with reference to FIGS. 10-11.

Text can be added to the card through the text entry controls 536 and the keypad 538. In some embodiments, the text entry is displayed in the text preview window 540, and instructions are provided in the instruction window 542.

In some embodiments the text entry can be provided as a headline or commentary. The headline control is selected to enter a headline, and the commentary control is selected to enter commentary. A headline is text content having a maximum quantity of characters (e.g., 40) that is less than the maximum number of characters (e.g., 120) permitted for commentary. Additionally, in some embodiments a headline is displayed differently than commentary in a card. For example, a headline is displayed in all capital letters, while a commentary is displayed in all lowercase letters. Other visually distinguishable display characteristics can be used in other embodiments.

Figure 14:
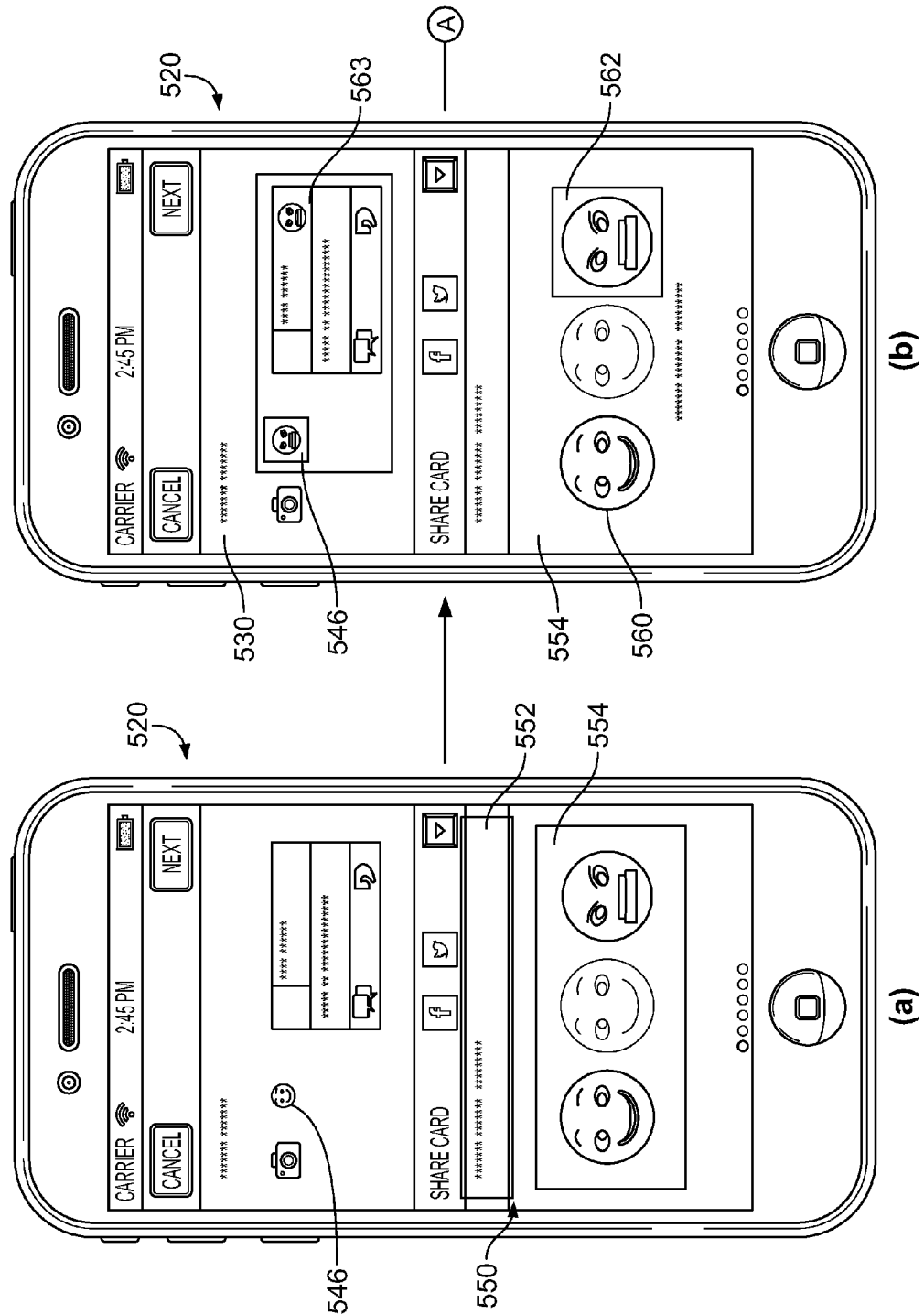
FIG. 14 (including FIGS. 14A-14C) illustrates an exemplary method of assigning an icon to a card.
Figure 14:
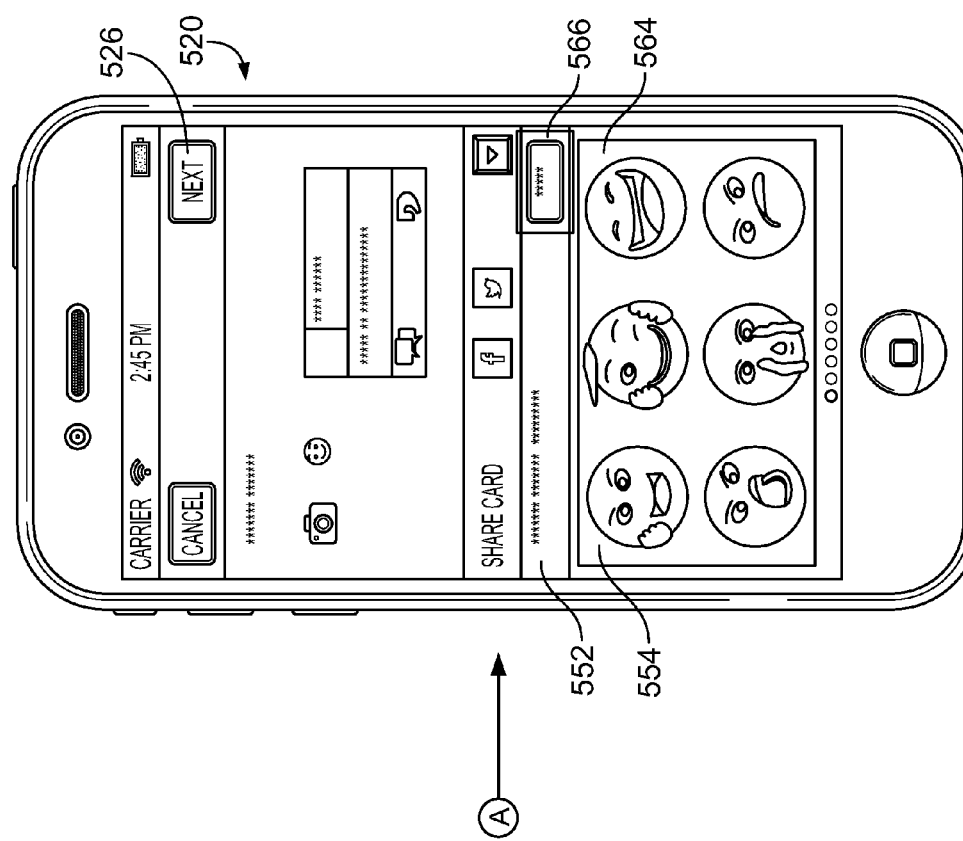

FIG. 14 illustrates an example method of assigning an icon to a card, such as in operation 508, shown in FIG. 12. FIG. 14 includes displays (a), (b), and (c), each depicting various views of the card generator interface 520.

In display (a), the card generator interface 520 includes an icon button 546, which can be selected to initiate the operation 508 to add an icon to the card that is being generated through the card generator interface 520. An example of an icon is an emoticon, which includes a graphical element designed to convey an emotion, such as a smiling face, an angry face, a sad face, etc. Other embodiments include other graphical icons.

Upon selection of the icon button 546, the icon selection window 550 is displayed. The icon selection window 550 includes an icon group identifier 552, and an icon display window 554. The icon group identifier provides a name of the icon group shown in the icon display window 554. In some embodiments, a name or alias of the person or company that provided the icon is also displayed in the icon group identifier 552.

To add an icon to the card, as shown in display (b), the icons 560 and 562 can be selected. In this example, the icon 562 has been selected. Once selected, the card preview window 530 is updated to include the icon in the icon preview window 563.

Some embodiments include premium icons 564 that are available for a fee, such as shown in display (c). In this example, the icon group identifier 552 identifies a premium set of icons 564, which are displayed in the icon display window 554. The cost to access one or the entire set of icons is shown in the price display 566. If the user wants to purchase access to the premium icons 564, the payment processor 130 is used to complete the transaction.

Once the building of the card has been completed, the next button is selected to initiate the tagging engine 446.

Figure 15:
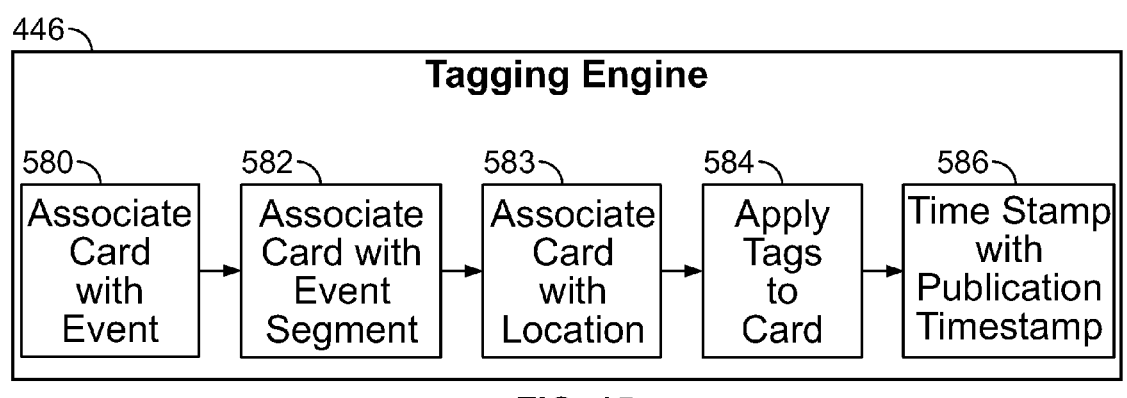
FIG. 15 is a flow chart illustrating exemplary operations performed by a tagging engine.

FIG. 15 is a flow chart illustrating example operations performed by the tagging engine 446, shown in FIG. 9. In this example, the tagging engine 446 performs operations 580, 582, 583, 584, and 586.

Figure 16:
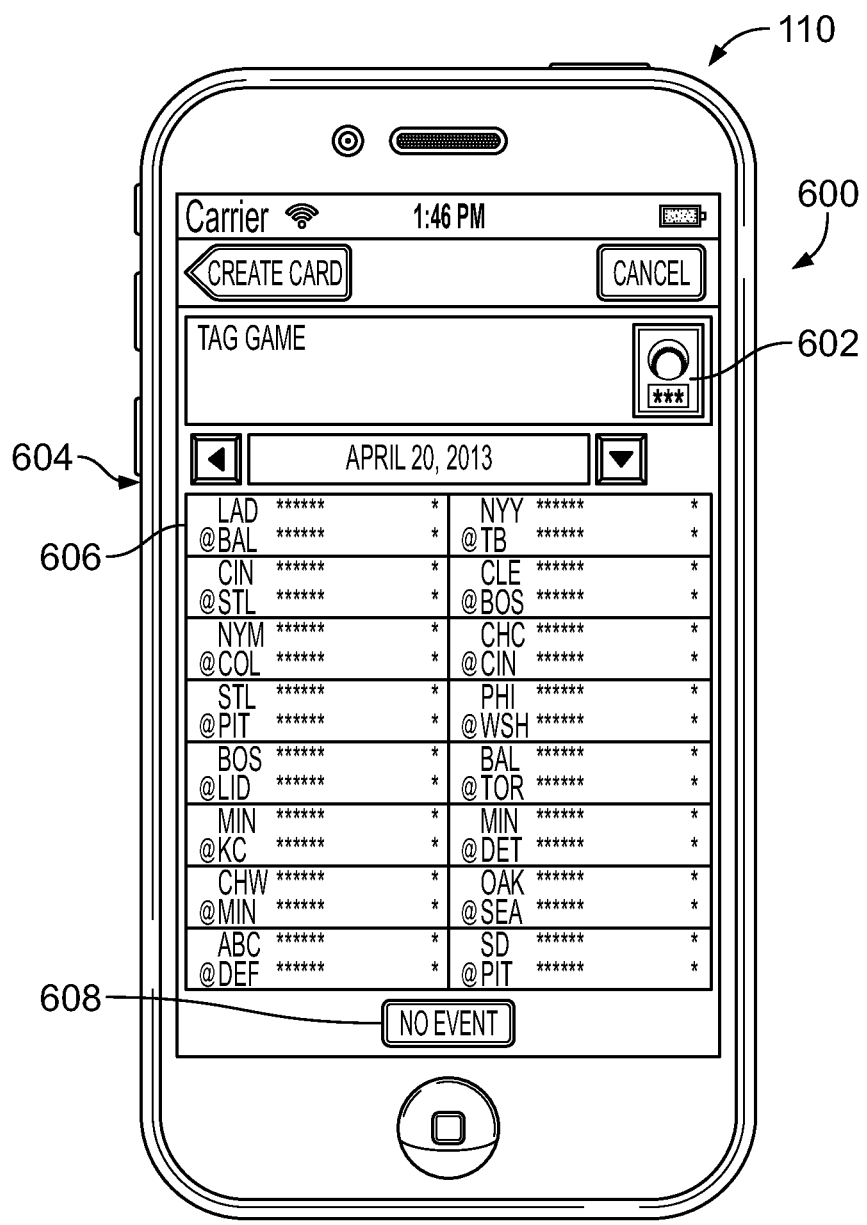
FIG. 16 illustrates an example of a computing device and an example of an event selection interface.

Operation 580 is performed to associate the card with an event. An example is shown in FIG. 16.

Figure 17:
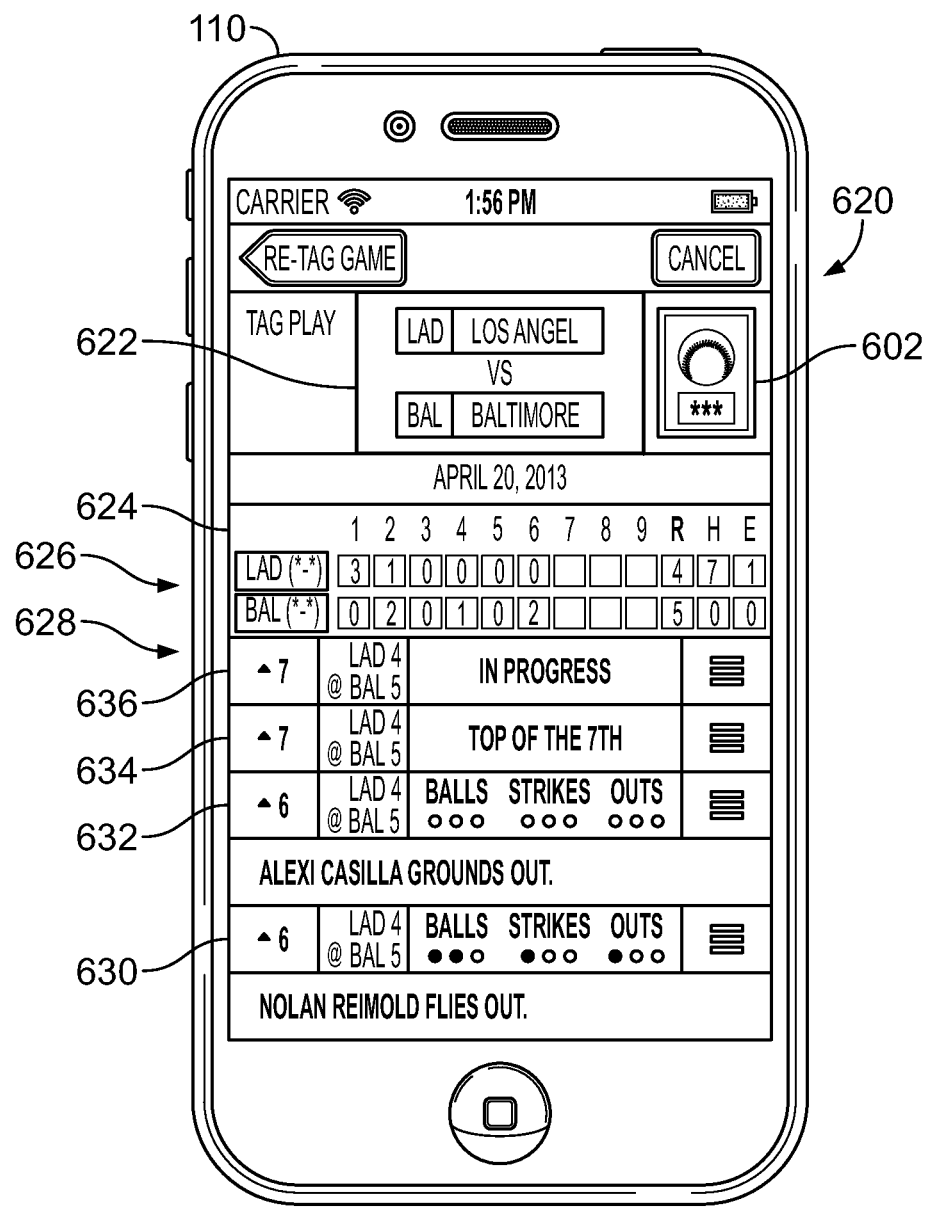
FIG. 17 illustrates an example of a computing device and an example of an event segment selection interface.

Operation 582 is performed to associate the card with an event segment. An example is shown in FIG. 17.

Figure 18:
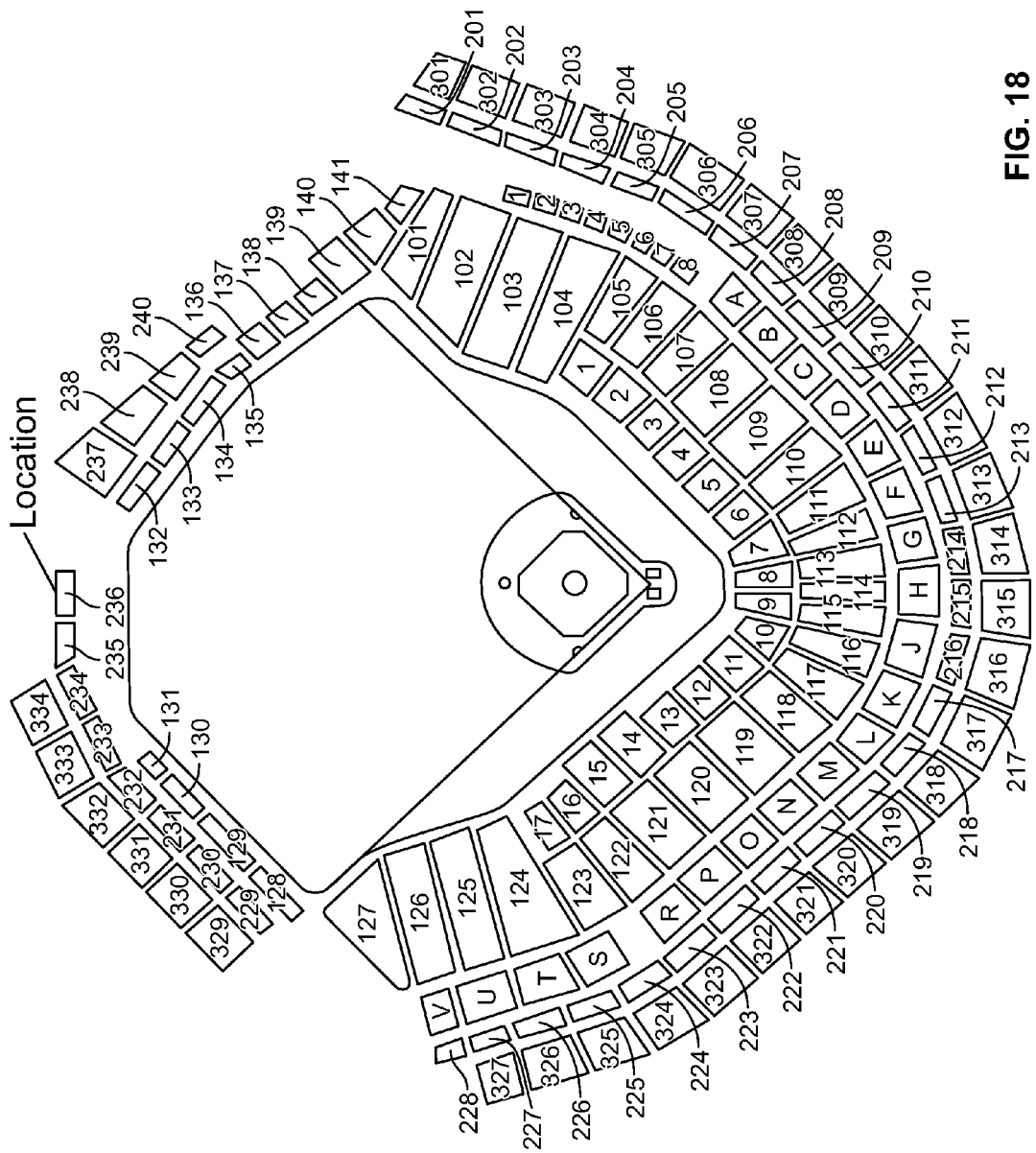
FIG. 18 illustrates an example event venue of a baseball field.
Figure 19:
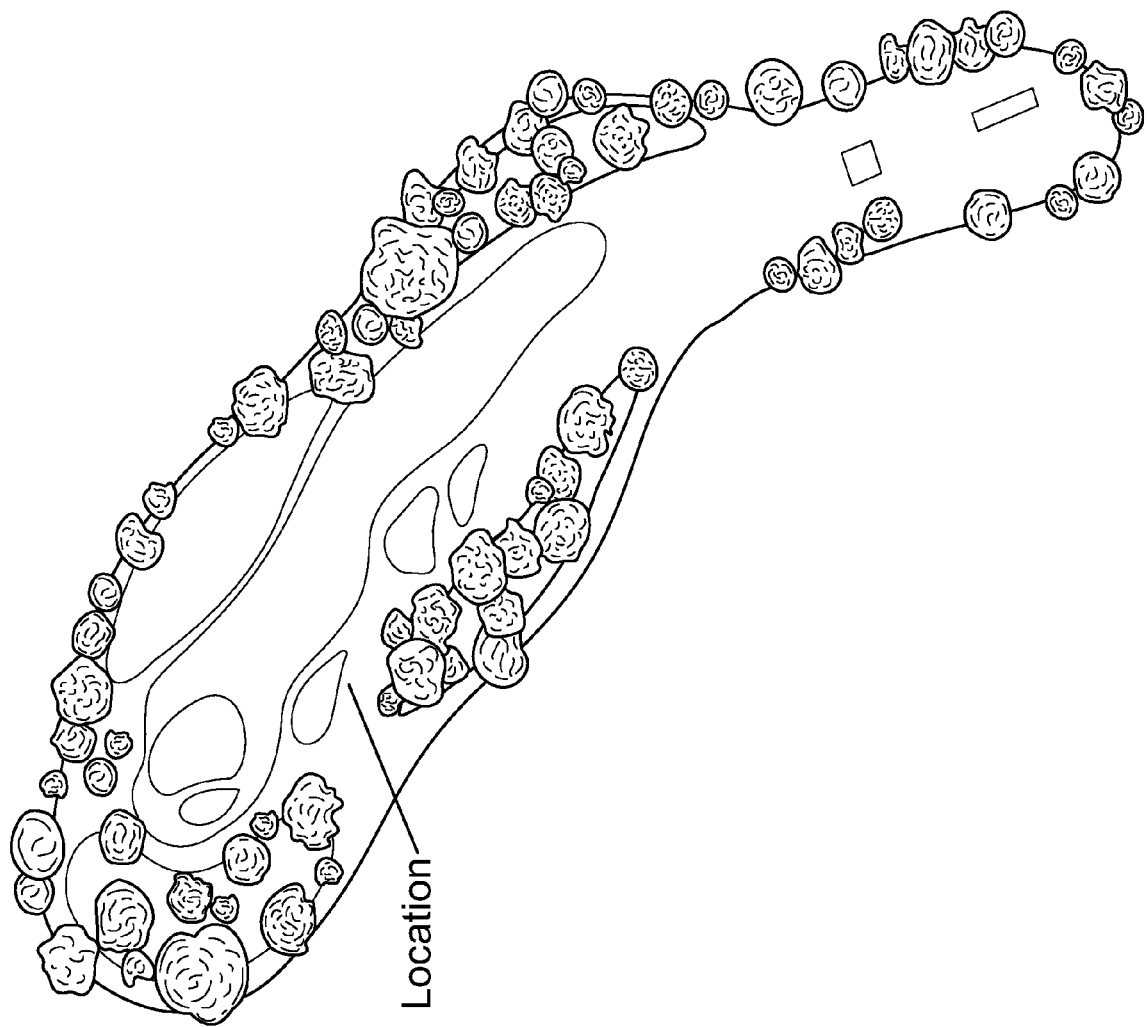
FIG. 19 illustrates an example event venue of a golf course.
Figure 20:
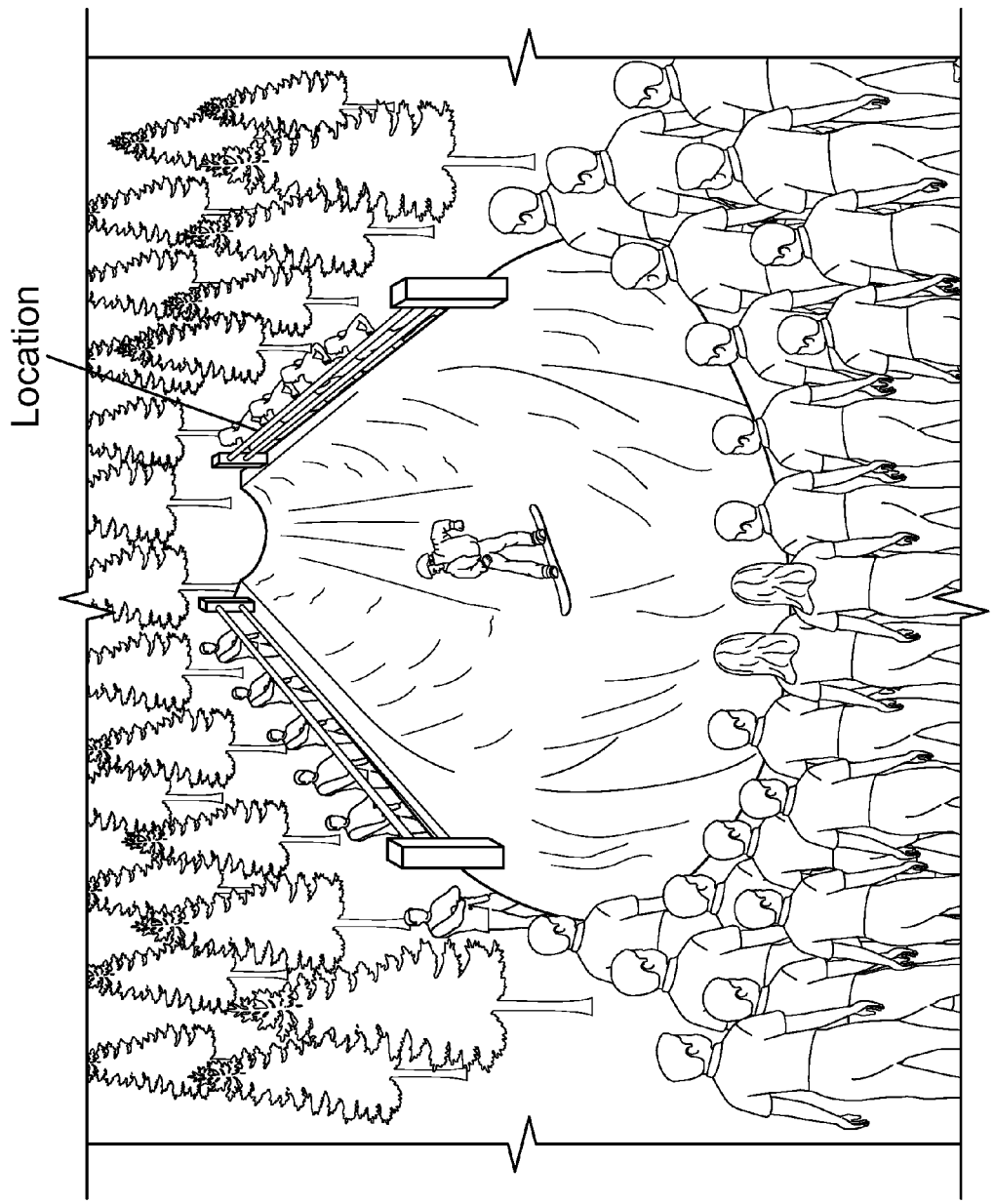
FIG. 20 illustrates an example event venue of a half pipe.

Operation 582 is performed to associate the card with a location. Several examples are shown in FIGS. 18-20.

Operation 584 is performed to apply tags to the card. In some embodiments, all data associated with the event segment is tagged to the media content card. Some examples of possible data are shown in Tables 1 and 2. More, less, or different data can be used in other embodiments, such as any of the possible data described herein or combinations or derivatives thereof.

Operation 586 is performed to apply a publication time stamp to the card. The publication time stamp identifies the time that the card was sent to the server 102 for publication.

FIG. 16 illustrates an example of the computing device 110 and an example of an event selection interface 600, such as used to perform the operation 580 (FIG. 15) to associate the card with an event. In this example, the event selection interface 600 includes a card preview window 602, date selection controls 604, event listing window 606, and a No Event control 608.

The card preview window 602 displays a preview of the current card associated with an event.

The date selection controls 604 permit the user to navigate among various days to select a date on which the event occurred. In some embodiments the date is automatically selected based upon one or more of the time stamps associated with the card, such as the content creation time stamp, or the card creation time stamp.

The event listing window 606 displays a listing of the events that occurred on the day selected with the date selection controls 604. In this example, the event listing window displays a set of baseball games that occurred on the selected date. The user selects an event from the list by tapping on the appropriate event.

Alternatively, if the user cannot find the event in the list, or the card is not tied to any particular event, the user can select the No Event control 608 to skip the event tagging process.

In another possible embodiment, the event is automatically identified using a location identifier associated with the card. For example, a GPS location is associated with the media content when it is recorded. The GPS location is then associated with the card when it is created. The GPS location can then be used by the matching engine (e.g., 206 (FIG. 2) to identify the event venue V (FIG. 1) that is located at the location. The content creation time stamp or card creation time stamp can be used to identify the time of the event.

FIG. 17 illustrates an example of the computing device 110 and an example of an event segment selection interface 620, such as used to perform the operation 582 (FIG. 15) to associate the card with an event segment. In this example, the event segment selection interface 620 includes a card preview window 602, a selected event preview window 622, and an event segment selection window 624.

The card preview window 602 displays a preview of the current card associated with an event.

The selected event preview window 622 identifies the event selected through the event selection interface 600, shown in FIG. 16.

The event segment selection window 624 permits the user to identify an event segment associated with the card. In this example, the event segment selection window 624 includes a scoreboard display window 626, and an event segment display window 628.

The scoreboard display window 626 displays a scoreboard display for the selected event (shown in the selected event preview window 622). The scoreboard display depicts the event according to a set of scored segments. In this example, the scored segments are half innings, and the score for each half inning is displayed for each team. The scored segments are selectable by the user in the scoreboard display window 626, such as by tapping on the scored segment.

The event segment display window 628 displays at least some of the event segments for the selected event. The event segments shown in the event segment display window 628 can be scrolled by swiping up or down within the event segment display window 628. Alternatively, the user can select one of the scored segments in the scoreboard display window 626, which causes the event segment display window 628 to display event segments associated with the selected scored segment. In this example, the event segments 630, 632, 634, and 638 are shown. To associate the card with the event segment, the user selects one of the event segments.

In some embodiments, the event segment is automatically identified utilizing the matching engine 206 (FIG. 2). In this example, one or more time stamps associated with the card are compared with the time stamps associated with the event segments (as shown in FIG. 6. For example, the content creation time stamp is compared with the start and end times of the event segment to identify the event segment having a range of times encompassing the content creation time. In this way the event segment can be automatically identified. In some embodiments, the identified event segment is displayed to the user in a visually distinguishable format, such as by highlighting the event segment with a different colored background. The user can then verify that the identified event segment is the correct event segment, or select a different event segment from the event segment display window 628.

FIGS. 18-20 illustrate examples of associating a media card with a location. FIGS. 18-20 are also examples of method 583, shown in FIG. 15.

In some embodiments, a location is identified that is then associated with the card. In some embodiments, the location is a position at the event venue V (FIG. 1) where the mobile computing device 120 was located when the media content was captured. In another possible embodiment, the location is a location of one or more subjects that are captured in the media content. In yet a further possible embodiment, both a capture location and a subject location are identified and tagged to the media content card.

In various possible embodiments, the identification of a location associated with a card can be performed automatically, partially automatically, or manually.

In some embodiments, the mobile computing device 120 automatically identifies the location. This can be performed, for example, using the positioning device 271 (FIG. 5), such as a global positioning system (GPS). The positioning device identifies a position of the mobile computing device 120 at the time that the media content is captured, for example, such as by a GPS coordinate (e.g., latitude and longitude, and possibly elevation). Other positioning devices or technologies can also be used, such as by using Wi-Fi hotspot data and/or cell tower data, an iBeacon, and a near-field communication device, for example. Some embodiments interact with Google™ NEST™ devices.

Once a position has been identified, the position can be used directly as the location, or can be mapped to another location. For example, the position can be mapped to a region of the event venue (V). In some embodiments the regions are defined in the event venue. For example, many event venues (such as the example baseball field shown in FIG. 18) identify seating positions with respect to one or more of a deck (e.g., upper or lower deck), section, row, and seat. In other embodiments, the regions are defined in relation to aspects of the event. In a sport, for example, the regions can be identified in relation to characteristics of the sports field, such as being on the first base side, third base side, behind the plate, outfield, etc. As another example, such as in golf or snowboarding, the positions can be associated with a position along a length of an event venue, such as between starting and ending positions of a hole of a golf course (e.g., FIG. 19) or of a run of a half pipe (e.g., FIG. 20). An example of a location on the golf course is the left side 100 yards from pin. An example of a location on the half pipe is the right side 50 feet down from the top of the half pipe. Any desired level of abstraction can be used to divide the event venue into regions and map specific positions to those resulting regions.

As noted above, the identification of the location can be performed automatically in some embodiments by identifying the position, mapping the position to a region of the event venue, and associating the position and/or region with the media card. In some embodiments the media card is associated with multiple regions (e.g., upper deck, section 236, row 5, seat 3, outfield, center field, etc.). In some embodiments the location information permits automatic or semi-automatic tagging of media content with contextual event-related data without requiring further user input, or with less or optional user input, for example.

In some embodiments the user is prompted to confirm the identified location. This can be done by displaying the identified location and/or one or more identified regions to the user and requesting confirmation or correction. The display can be a text-based display or a graphical display, such as including a display of a map of the event venue with the identified location visually depicted.

In another possible embodiment, the user is prompted to manually identify the location. For example, the user can be prompted to identify the region, such as by one or more of deck, section, row, and seat. In another example, a map of the event venue is displayed and the user is prompted to tap or click on the location in the map display.

Once the location has been identified, the media content card is associated with that location, and the location is stored in a computer readable storage device for the media content card, such as within the data store 104 (FIG. 1).

In some embodiments, the media content card is associated both a location and a direction. In some embodiments, the direction is the direction that a recording device (e.g., digital camera or camcorder) is facing when the media content is captured. One example of a technology that can identify the direction at which the recording device is pointed is the CrowdOptic™ technology from CrowdOptic Inc. of San Francisco, Calif. Eye-tracking or motion-tracking technology could be similarly used to identify a direction and an object or point of interest, which can be associated with the media content, or used to identify event-related data related to the media content. Such technology could also be used for other purposes, such as for navigation within the user interface, for example.

Once the direction has been identified, the media content card is associated with the direction. Examples of directions include compass directions, vector directions, directions with respect to an event venue, etc. Additionally, in some embodiments the directions are mapped to a direction relative to the event venue, using both the location and the direction data. For example, knowing that the location is in center field, and that the direction is due South, the tagging engine can determine that the recording device is pointing toward home plate. In some embodiments the field of view, focus, focal point location, or other data can also or alternatively be used to specify the location and/or direction. The direction is then stored in a computer-readable storage device, such as in the data store 104 (FIG. 1), and associated with the media content card.

In some embodiments the data generated and stored by the tagging engine 446 is used to subsequently locate media content cards using search queries. The search queries can be formed to search for any of the data tagged to the media content cards, such as the event, event segment, location, direction, and time.

Figure 21:
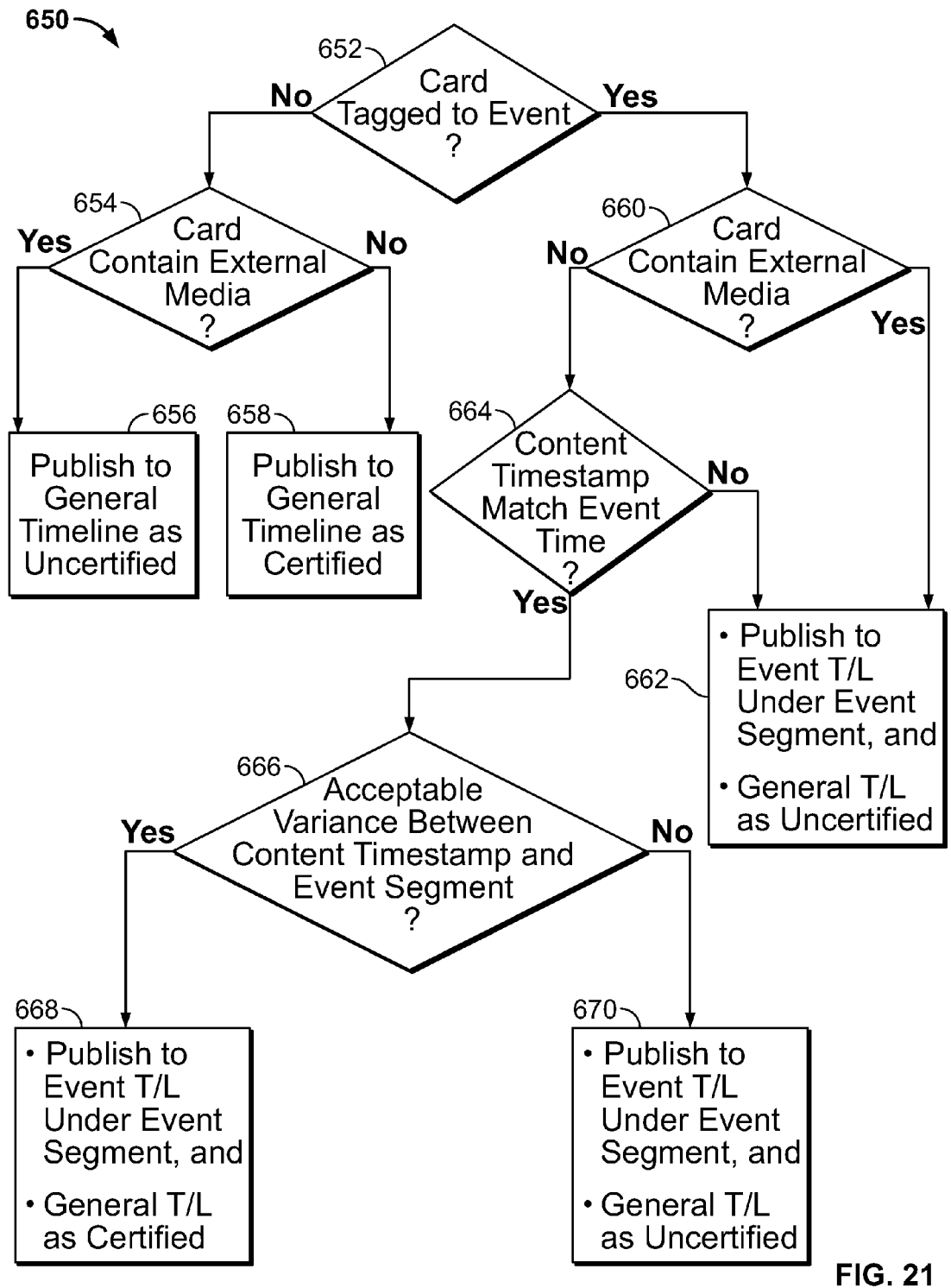
FIG. 21 is a flow chart illustrating a method of certifying media content cards.

FIG. 21 is a flow chart illustrating example method 650 of certifying media content cards. FIG. 21 also illustrates an example of the operations performed by the certification engine 448 of the media capture engine 430, shown in FIG. 9. This example includes operations 652, 654, 656, 658, 660, 662, 664, 666, 668, and 670.

Certification of media content cards allows the event-related media management system 100 to identify certain media content cards (i.e., certified cards) as being more reliably associated with an event than other media content cards (i.e., uncertified cards). The event-related media management system 100 can then use this information to treat the certified cards different from the uncertified cards, such as by promoting the certified cards to a more prominent position in a timeline, or by labeling or otherwise graphically depicting the certified cards in such a way that they are distinguishable from uncertified cards. In some embodiments, the certification process provides a type of spam filter, by promoting those cards that can be certified as being reliably tagged, while still permitting users to submit content that cannot be certified as reliably tagged. As another example, in some embodiments a search query can be performed for media content cards that are tagged to a particular event, event segment, or scored segment. To obtain more reliable results, the search query can be limited to certified cards, to reduce the chance of obtaining results that are unrelated to the query. In another possible embodiment, the certified cards are simply promoted in the search results above uncertified cards.

An example method 650 of certifying cards is shown in FIG. 21. The method 650 begins with operation 652, such as after a card has been generated and tagged. The operation 652 determines whether the card is tagged to an event, such as described with reference to FIGS. 15 and 16. If the event was not tagged to an event, such as by selection of the No Event control 608 (FIG. 16), the method advances to operation 654.

Operation 654 determines whether the card contains external media. External media is any media content that was not generated by a media recorder 442 (FIG. 9) of the event-related media management system 100, for example. The basic concept is that the date and time that media content is created is not necessarily reliable if the media content is received from an external source, because the date and time can be easily changed, or may be incorrect. On the other hand, media content that is generated by the media recorder 442 is more trustworthy, because the time stamps are assigned by the media recorder in a known and trustworthy manner. For example, in some embodiments the time stamps applied by the media recorder (or other component of the event-related user interaction system 111) are synchronized with the server, and do not rely solely on the computing devices internal clock.

If the card contains external media, then operation 656 is performed to publish the card to the general timeline (as discussed in more detail herein) as an uncertified card, because the tagged data is determined to be unverifiable. On the other hand, if the card does not contain external media, then operation 658 is performed to publish the card to the general timeline as a certified card. Publication of the card involves sending the card data and media content to the server, where it is stored in the data store and made available for distribution through the content supply engine 208 (FIG. 4), for example. In these examples, the cards are only published to the general timeline because they are not tagged to any particular event. Cards that are tagged to a particular event can also be published to the respective event timeline, according to the operations 660, 662, 664, 666, 668, and 670.

More specifically, if the card is determined to be tagged to an event in operation 652, operation 660 is then performed to determine whether the card contains external media. If so, the card is tagged as uncertified, and is published to both the general timeline and the event timeline. The publication in the event timeline includes publication of the card in association with the event segment that it is tagged to (e.g., in operation 582, FIG. 15), such as to display the card under the event segment in the timeline.

If the card does not contain external media, operation 664 is performed to determine if the content time stamp matches the event time.

To explain this with a more concrete example, and referring to FIG. 6, if the media content card includes a content creation time stamp of time t3 (including a date and time), and the media content card has been tagged to an event 300, the operation 664 compares the creation time stamp time t3 with the start and end times tu and t11 of the event 300. In some embodiments, the operation 664 utilizes and communicates with the server's matching engine 206, shown in FIG. 4 to perform some or all of the operations for this comparison. For example, the time stamp t3 is compared with the beginning time tu and the end time t11 of the event 300, and calculation is performed to determine whether the time t3 is between or equal to either of the times tu and t11. In some embodiments an additional buffer (e.g., 1-2 hours) is provided before the start time tu and after the end time t11. If the time t3 does not match the event time, the card is tagged as uncertified and is published to the general and event timelines in operation 662.

If the card time stamp does match the event time, then operation 666 is performed to determine whether there is an acceptable variance between the card creation time and the event segment times to which the card has been tagged.

Referring again to FIG. 6, and continuing with the prior example, the operation 666 compares the card time stamp at time t3 with the start and end times t1 and t4 of the event segment to which the card has been tagged, and if necessary, other event segments (304, 308, etc.). In some embodiments, the operation 664 utilizes the server's matching engine 206, shown in FIG. 4 to perform some or all of the operations for this comparison. The operation 666 compares the time stamp at time t3 with the beginning time t1 and the end time t4 of the event segment 306, and determines whether the time t3 is equal to or between the times t1 and t4. If so, the operation 664 determines that the time stamp matches the event time, and therefore verifies that the media content card is tagged to an appropriate event segment 306.

In some embodiments, the operation 666 also permits some variance. For example, an acceptable variance includes any time that is within plus or minus one event segment from the tagged event segment. In this example, the operation 666 compares the time t3 with the range of times beginning with the start time ty of the prior event segment 304 and the end time t6 of the following event segment 308. If the time t3 is equal to or between the times ty and t6, then the variance is considered acceptable and the media content card is verified as being properly tagged to the event segment 306. In another possible embodiment, a time buffer of a fixed time period (e.g., 10 seconds, 30 seconds, etc.) is applied before and after the event segment start and/or end times to determine the acceptable variance.

The operation 668 is then performed to tag the media content card as a certified card, and to publish the media content card to the general timeline and the event timeline. In the event timeline, the media content card is published in association with the event segment 306, such as by displaying the media content card under the event segment 306.

If the tagging is not verified, such as when the time t3 does not have an acceptable variance from the event segment time, the media content card is tagged as uncertified and operation 670 is performed to publish the media content card to the general timeline and the event timeline. In the event timeline, the media content card is published in association with the event segment 306, such as by displaying the media content card under the event segment 306.

FIGS. 22 and 23 illustrate examples of media content cards 700. FIG. 22 illustrates an example certified media content card 702. FIG. 23 illustrates an example uncertified media content card 722. The media content cards 700 include a media content window 704, user information window 706, icon window 708, text window 710, and social interaction controls 712.

The media content window 704 displays the media content, such as a photograph or a video. Photographs or other digital images can be in one or more of a variety of digital image types, such as JPEG or GIF, for example. When the media content is a video or audio recording, the media content window 704 includes a media player with appropriate controls to permit the user to control the playback of the media content.

The user information window 706 identifies the user that created the media content card 702, such as with a user photograph, user name, and favorite team.

The icon window 708 displays an icon of the media content card 700, such as an emoticon.

The text window 710 displays the text media associated with the media content card 700. In some embodiments the text media is selected from a headline and commentary, as discussed herein.

The social interaction controls 712 permit users to interact with media content cards that they like. In this example, the social interaction controls 712 include a react control 714 and a bump control 716. The react control 714 can be selected to generate a reaction card to the media content card. The reaction card is a new media content card that is linked to the card 702, such as to permit dialog between users. The number of reaction cards linked to the card 702 is displayed next to the react control 714.

The bump control 716 can be selected by a user to indicate a positive reaction to the media content card, such as to indicate that the user likes the media content card. The number of bumps that a media content card has received is displayed next to the bump control 716.

In some embodiments one or more aspects of the media content cards 700 are adjusted depending on whether the media content card 700 is a certified card or an uncertified card. As one example, a background color of certified media content card 702 has a first color (e.g., white), while a background color of an uncertified media content card 722 has as second color (e.g., black) different than the first color. Text colors are also selected to contrast with the background colors so that the text is visible on the background.

Figure 24:
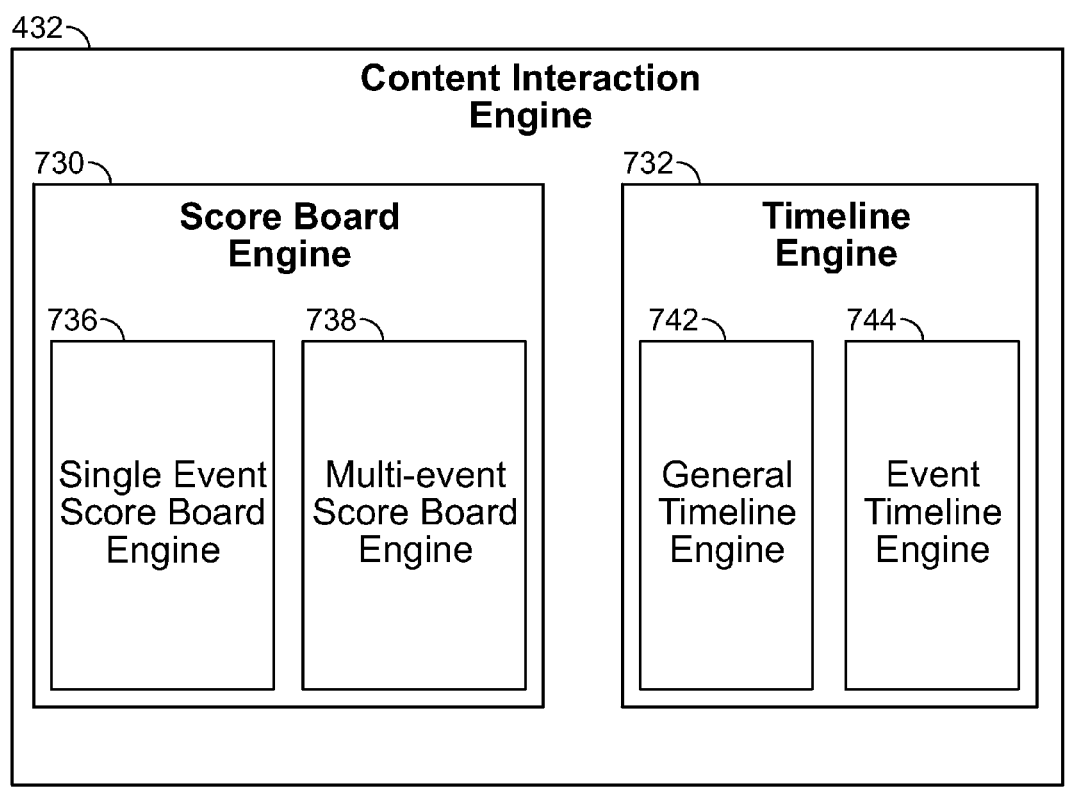
FIG. 24 is a schematic diagram illustrating an example of the content interaction engine of an example event-related user interaction system.

FIG. 24 is a schematic diagram illustrating an example of the content interaction engine 432 of the event-related user interaction system 111. In this example, the content interaction engine 432 includes a scoreboard engine 730 and a timeline engine 732. In some embodiments the content interaction engine 432 communicates with the content supply engine 208 of the server 102 (FIG. 4) to perform the operations described herein, such as to obtain media content and event-related data from the database and generate scoreboard and timeline user interfaces.

The scoreboard engine 730 generates interactive scoreboard displays for events. In some embodiments the scoreboard engine 730 includes a single event scoreboard engine 736 and a multi-event scoreboard engine 738.

Figure 25:
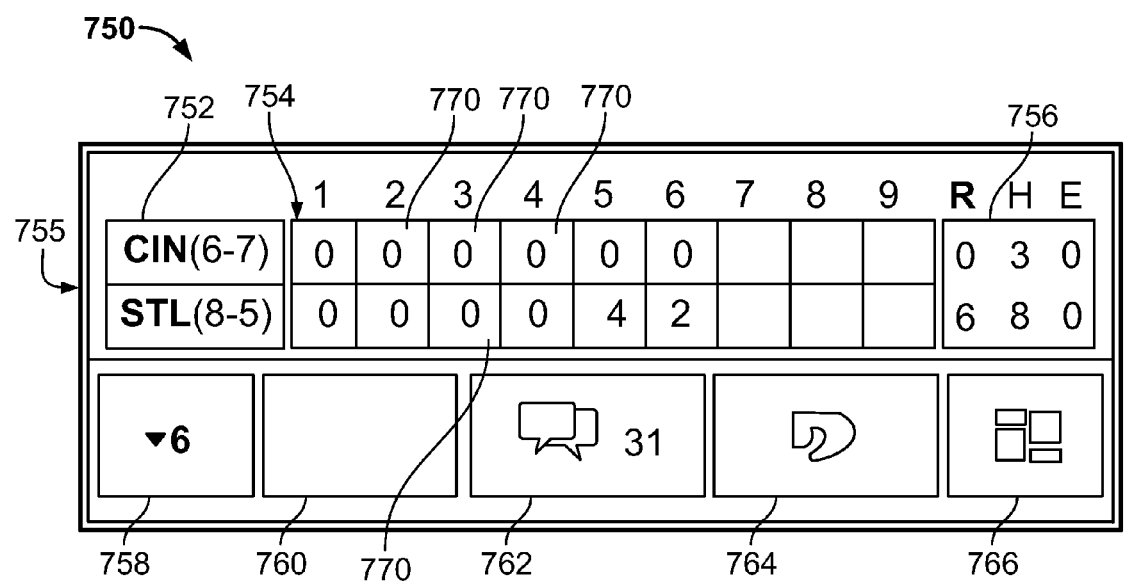
FIG. 25 illustrates an example of a scoreboard display.

The single event scoreboard engine 736 generates an interactive scoreboard display 750 associated with a single event. An example of the scoreboard display 750 is shown in FIG. 25. An example of a single event is a sports game.

The multi-event scoreboard engine 738 displays multiple interactive scoreboard displays 780 associated with multiple events. For example, on a given day there may be multiple sports teams that are playing within a sports league, such as within major league baseball. The multi-event scoreboard engine 738 can be used to display an interactive scoreboard display 750 for each of the games occurring on that day. In some embodiments the multi-event scoreboard engine 738 utilizes the single event scoreboard engine 736 to display the multiple scoreboard displays 780. An example of a multi-event interactive scoreboard display is shown in FIG. 26.

The timeline engine 732 generates timelines displays for the display of event-related data and media content cards. In some embodiments the timeline engine 732 includes a general timeline engine 742 and an event timeline engine 744. The general timeline engine displays a general timeline including media content cards from multiple events and even those that are not associated with an event. An example of a general timeline display is shown in FIG. 27.

Figure 28:
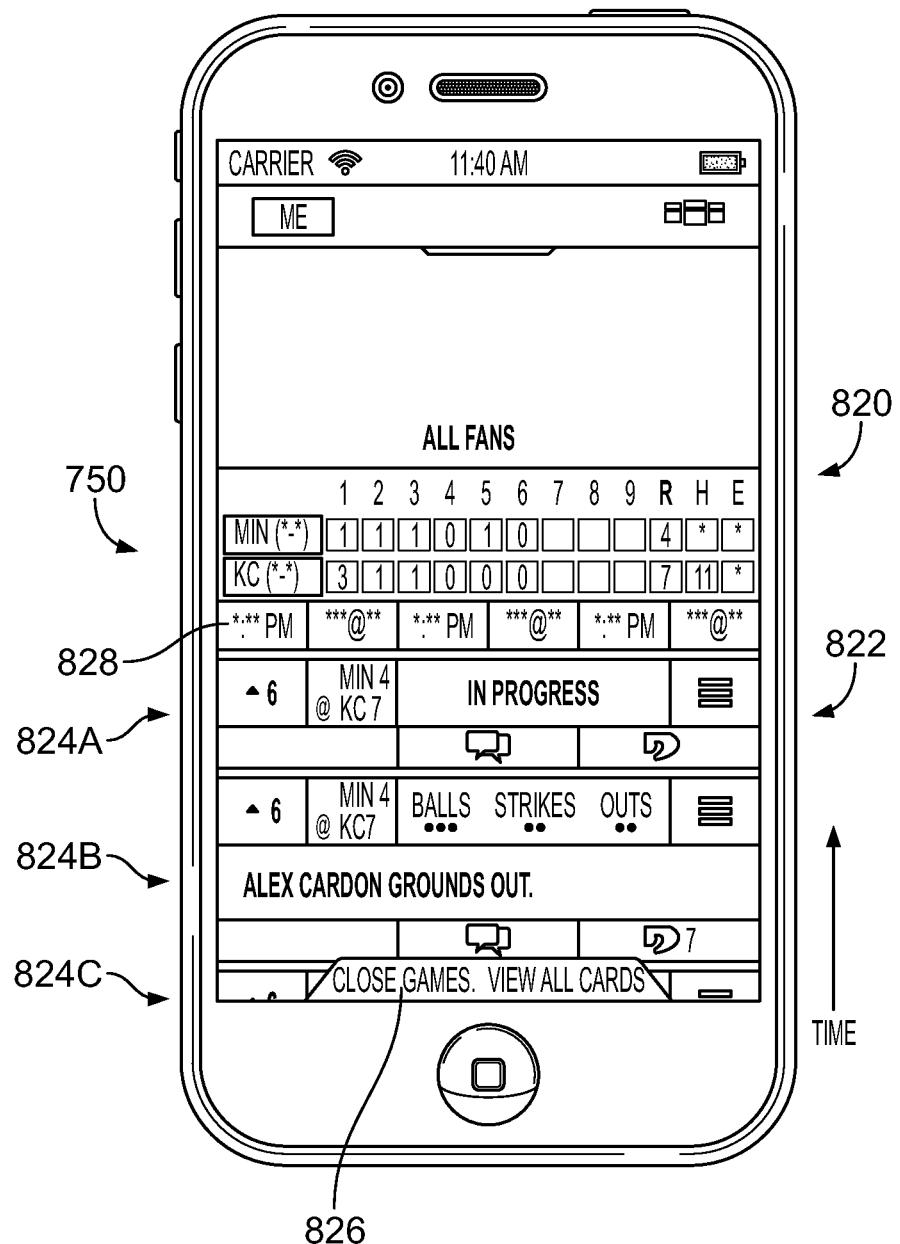
FIG. 28 illustrates an example of an event timeline display.

The event timeline engine 744 displays a game timeline including event-related data and media content cards that are associated with a particular event. An example of an event timeline display is shown in FIG. 28.

FIG. 25 illustrates an example of a scoreboard display 750, such as generated by the single event scoreboard engine 736. In this example, the scoreboard display 750 includes teams window 752, a scoreboard window 754, a summary statistics window 756, an event status window 758, a favorite content window 760, a card count window 762, a bump window 764, and event timeline button 766.

The teams window 752 identifies the teams involved in the event. In this example, the away team is displayed on top and the home team is displayed on the bottom.

The scoreboard window 754 displays a scoreboard 755 for the event. The format of the scoreboard is selected according to the type of event, and based on the structure (or rules) of the event. The scoreboard includes a plurality of event segment displays 770, where each scored segment display 770 is associated with a single scored segment for the event. In this example, the scored segments are half innings of a baseball game. In some embodiments the scored segment displays 770 each show a score associated with the scored segment. In some embodiments the scoreboard window 754 displays a scoreboard based upon the rules and/or customs of a sport or other event, such as may be found at the event venue V for that sport or other event.

In the illustrated example, the scored segment displays 770 are arranged in a grid configuration where each scored segment display 770 forms a cell of the grid. The scored segment displays 770 are arranged in two rows and at least nine columns (additional columns can be added, for example, if a game goes into extra innings). Each row is associated with the respective team identified in the teams window 752, and each column is associated with the two scored segments for each team making up a full inning.

In some embodiments the scoreboard window 754 is an input field. More specifically, each of the scored segment displays 770 is selectable, such as by receiving a tap, click, or other selection input into one of the scored segment displays 770. Upon receipt of the input, the event-related user interaction system 111 updates the user interface to display information related to the selected scored segment display 770. For example, a timeline is displayed and one or more event segments associated with the scored segment are shown to permit the user to quickly navigate to a segment of the event that is of interest to the user. As one example, the user may select the scored segment display 770 for Cincinnati for the top of the third inning A timeline is then displayed in the user interface showing one or more event segments for the top of the third inning, and any media content cards that are associated with the event segments.

In some embodiments, the selection of a scored segment in the scoreboard window 754 is a two step process. A first input (such as a tap or click) into the scoreboard window 754 executes an expand function, which zooms the scoreboard horizontally to expand the size of the scored segment displays 770. For example, the first input causes the scoreboard to display only a subset of the innings, such as 4-5 innings, thereby increasing the size of each of the scored segment displays 770. A sliding input scrolls the scoreboard in the event that the user wants to view or select a scored segment display 770 that is not visible after the expand function. Then, a second input is received to select the specific scored segment display 770 of interest, which causes the event segments associated with the scored segment to be displayed in the timeline display.

The summary statistics window 756 displays a summary of certain game statistics, such as the total runs, hits, and errors for each team.

The event status window 758 displays the current status of the event. If the event is in processes, for example, the event status window 758 identifies the current scored segment of the game, such as the bottom of the sixth inning. Pre-event and post-event segments are available in some embodiments for a period of time before and after the event. In some embodiments a letter "F" indicates that the event has concluded and the scores are final scores.

The favorite content window 760 displays a preview of the media content card that has generated the most buzz, and is selectable to jump to the that media content card in the event timeline. In another possible embodiment, the window 760 is selectable to advance to the current event segment in the event timeline.

The card count window 762 displays the total number of media content cards that are tagged to the event. Selection of the card icon in the card count window opens the game timeline at the most recent event segment, to permit viewing of the event segments and media content cards.

The bump window 764 displays the total number of bumps that the event has received, and includes a bump icon that can be selected to add a bump to the event. The bump input indicates that the user likes some aspect of the event, for example. The bump is stored in the data store and associated with that event.

The event timeline button 766 is selectable to display the event timeline associated with the event at the most recent event segment.

FIG. 26 illustrates an example of a multi-event interactive scoreboard display 780. In this example, the multi-event interactive scoreboard display 780 includes a plurality of scoreboard displays 750 (750A-D, etc.), such as generated by the single event scoreboard engine 736 (FIGS. 24-25). Each of the scoreboard displays 750 includes a scoreboard 755 (755A-D, etc.) for the respective game.

In some embodiments, the multi-event interactive scoreboard display 780 is used as a home or landing page for the event-related user interaction system 111. As one example, the display 780 provides a set of scoreboards for all games within a given sports league that are scheduled for the current day, such as all of today's major league baseball games.

A vertical up or down swipe input permits viewing of additional displays 750 for other events, to scroll the display 780 up or down.

In some embodiments the events are selectable, such as by tapping on the team names window in the respective scoreboard displays 750. Upon selection of an event, the event timeline is displayed for that event.

The scoreboard is also selectable to jump to a particular event segment of the event in the event timeline, as discussed with reference to FIG. 25.

FIG. 27 illustrates an example of a general timeline display 800. In some embodiments, the general timeline display 800 displays all media content cards regardless of whether or not the media content cards are tagged to an event.

The general timeline display 800 includes a general timeline 801 in which media content cards 802 (including 802A-E) are displayed in a masonry grid configuration, and in a reverse chronological order, such that the newest card 802A is shown at the top, while older cards are arranged adjacent or below. In some embodiments the media content cards 802 are displayed in a thumbnail view, and are selectable to display the detailed view (such as shown in FIGS. 22-23).

Figure 29:
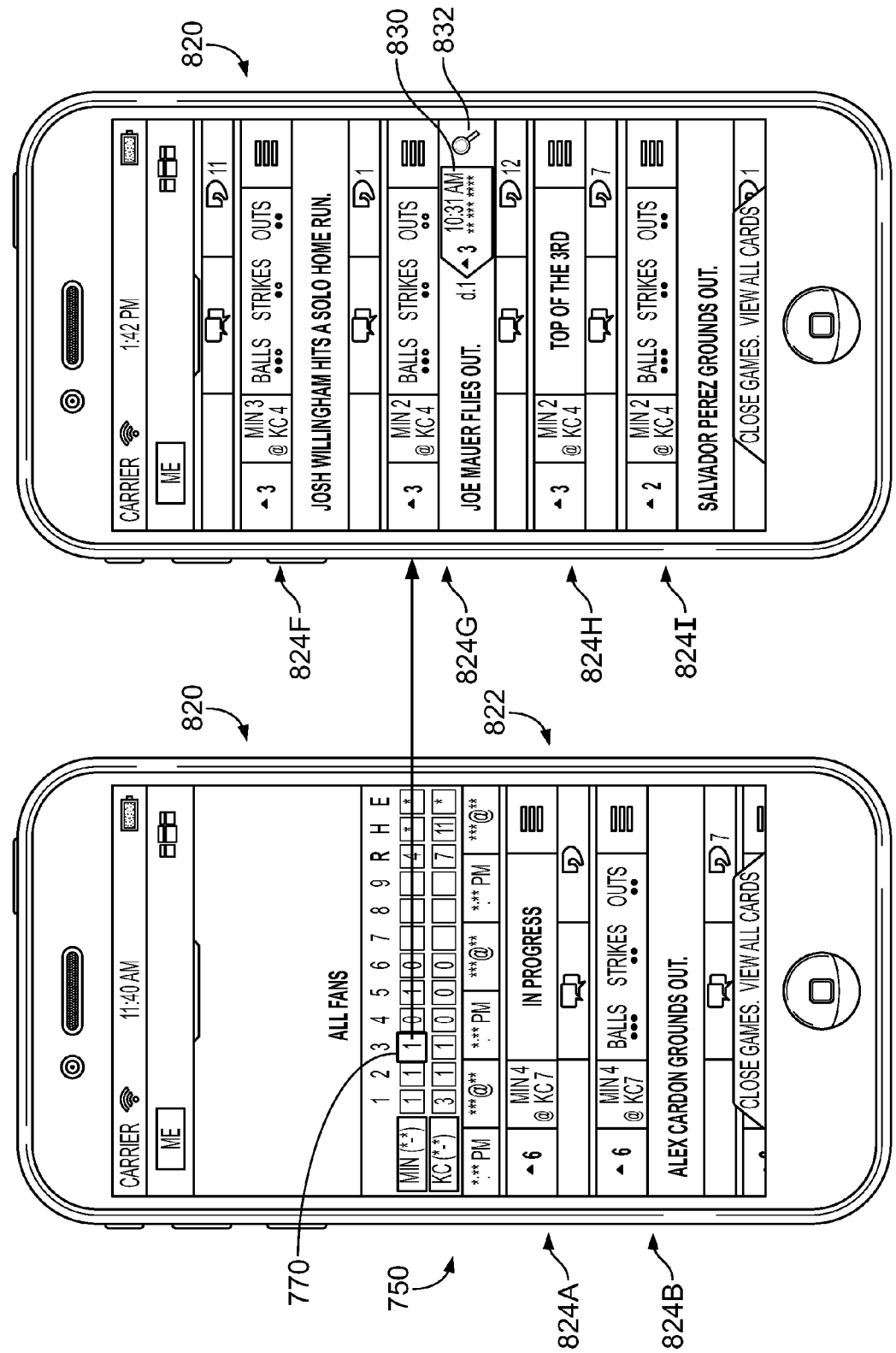
FIG. 29 illustrates an example of a scoreboard navigation feature, as well as additional details of the event timeline display shown in FIG. 28.

A vertical up or down swipe input scrolls the general timeline display 800 to permit viewing of additional media content cards 802 in the timeline 801. While scrolling, a time indicator 830 (such as shown in FIG. 29) is displayed in some embodiments to display the time associated with the media content cards, and accordingly the current position in the timeline.

In some embodiments the general timeline display 800 includes a score ticker display 804 that periodically scrolls through current scores of multiple different events. The score ticker display is selectable to navigate to the multi-event interactive scoreboard display 780, shown in FIG. 27.

FIG. 28 illustrates an example of an event timeline display 820. In some embodiments, the event timeline display 820 displays event-related data, and also displays media content cards associated with the game. In some embodiments the event timeline display 820 displays only those media content cards that are tagged to a the event, such as a particular baseball game, and does not display media content cards that are tagged to a different event, nor media content cards that are not tagged to an event.

The event timeline display 820 includes an event timeline 822. The event timeline includes a reverse-chronological listing of event segment displays 824 (including event segment displays 824A-C, etc.) identifying the event segments that have been generated from the event-related data feed (such as shown in FIG. 6) and are associated with the event. Additionally, in some embodiments media content cards (not shown in FIG. 28) that are associated with the event and an event segment, are displayed below the respective event segment in the event timeline 822. The event timeline can be scrolled up or down with an up or down swipe input.

A close event control 826 is provided in some embodiments. Selection of the close event control 826 closes the event timeline display 820 and navigates to the general timeline display 800, shown in FIG. 27.

A score ticker display 828 is displayed in some embodiments, and selection of the score ticker display 828 closes the event timeline display 820 and navigates to the multi-event interactive scoreboard display 780, shown in FIG. 26.

FIG. 29 illustrates another example of a scoreboard navigation feature, as well as additional details of the event timeline display 820 (shown in FIG. 28). FIG. 29 also depicts an example time indicator 830.

The scoreboard display 750 includes a plurality of scored segment displays 770 associated with scored segments of the event. Selection of one of the scored segment displays 770, such as the scored segment display 770A associated with the top of the third inning, automatically updates the event timeline display 820 to show event segment displays 824 that are associated with the scored segment. In this example, event segment displays 824F, G, and H are shown, which are all associated with the top of the third inning.

Some embodiments include a time indicator 830 that is used to display a time associated with a position on the timeline. The time indicator 830 is provided in both the general timeline display 800 (FIG. 27) and the event timeline display 820, in some embodiments. In some embodiments the timeline indicator displays a start time and date (e.g., 10:34 AM; 30 Sep. 2012) associated with an event segment 824G that is currently vertically aligned with the time indicator 830, as well as the scored segment (e.g., top of the third inning) associated with the event segment 824G. When the timeline is scrolled using a swipe input, the time displayed by the time indicator changes accordingly.

To avoid obscuring the view of the media content cards and event segment displays 824 in the timeline display 820, the time indicator 830 automatically fades after a predetermined time period (such as in a range from about one to five seconds) has elapsed without user input. The time indicator 830 reappears when an input is detected into the timeline display 820.

In some embodiments the time indicator 830 also includes a search filter toggle button 832. In some embodiments the search filter toggle button is selectable to toggle a search filter on and off. In some embodiments, the time indicator 830 is displayed in a first color (e.g., black) when the search filter is turned off, and in a second color (e.g., red) when the search filter is turned on. In this way, the time indicator 830 provides a convenient indication of whether or not a search filter is currently applied.

FIG. 30 illustrates an example of multiple different timeline views that are available in some embodiments.

In some embodiments, general and event timelines can be quickly filtered by switching between multiple different views. In this example, a general timeline is displayed in four different views including a My Cards view, All Fans view, Following view, and Single User view. The user can quickly scroll between the views by swiping left or right to scroll left or right in the order depicted in FIG. 30, in some embodiments. In another possible embodiment, the single user view is not accessible in this manner, but is only accessible after selecting a particular user of interest.

The MyCards view displays only those media content cards that were generated by the user that is currently logged into the event-related user interaction system 111 (shown in FIG. 1).

The All Fans view displays all media content cards that are available.

The Following view displays only those media content cards that were generated by users that the current user has chosen to follow.

The single user view displays only those media content cards that were generated by a selected user.

The event timeline display described herein can be similarly filtered according to these views in some embodiments.

Some embodiments include more, fewer, or different available views.

Figure 31:
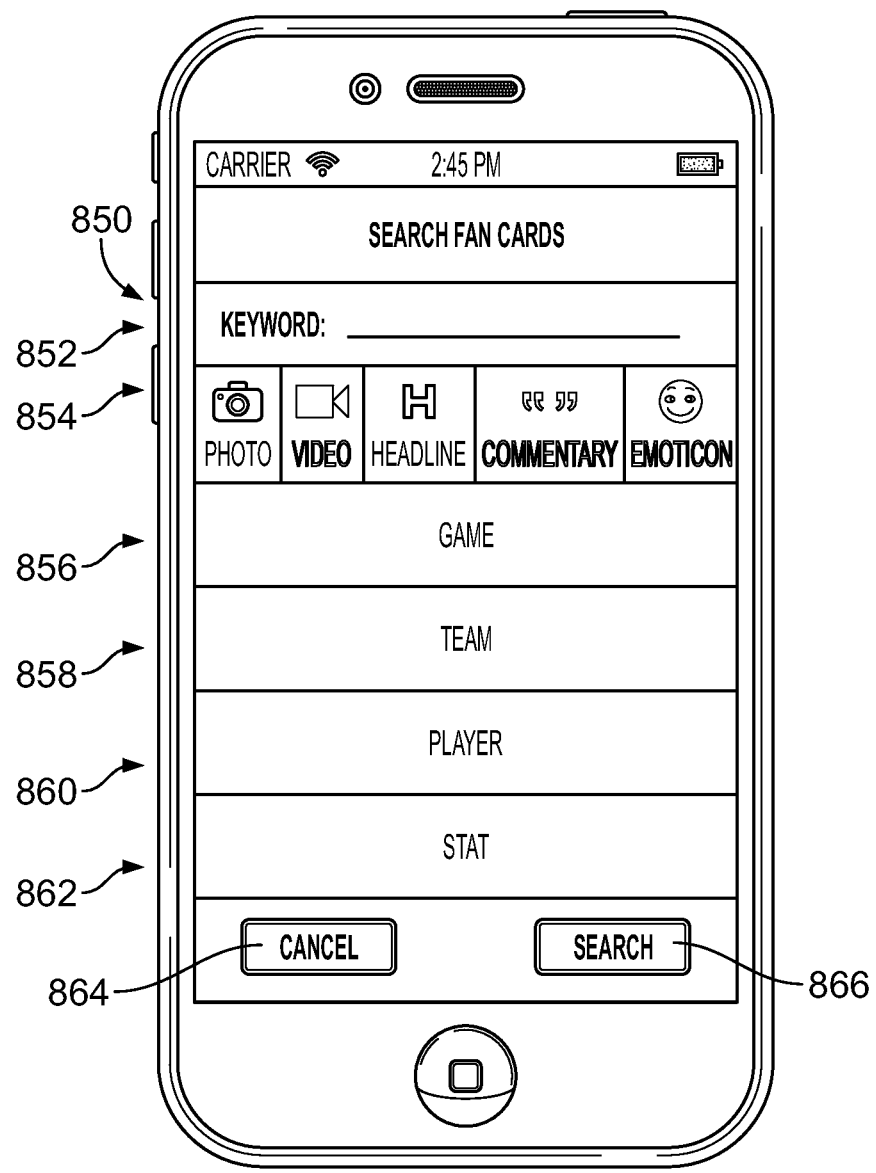
FIG. 31 illustrates an example search filter definition display, such as provided by a search filter definition engine.

FIG. 31 illustrates an example search filter definition display 850, such as provided by the search filter definition engine 434, shown in FIG. 8. In some embodiments the search filter definition engine 434 cooperates with the search filter engine 224 (FIG. 4) of the server 102 to perform search operations.

In this example, the search filter definition display 850 includes a plurality of search filter categories, including a keyword filter 852, card content filters 854, event filters 856, team filters 858, player filters 860, and statistic filters 862.

Within each category are a plurality of available filters that can be selected to define a search filter to be applied.

The keyword filter 852 includes a text field in which one or more keywords can be entered. Some embodiments permit Boolean operators to be used. In some embodiments hash tags can also be searched through the keyword filter 852.

The card content filters 854 permit the selection of one or more possible card content items, such as a photograph, video, headline, commentary, or icon. The card content filters can be used to locate cards having the selected content items. In another possible embodiment, the icon filter can be used to search for media content cards having a particular icon. In this example, the icon button is selected to display an icon selection window in which the specific icon(s) can be selected.

The event filters 856 permit the selection of a particular event. Upon selection of the event filters 856 category, an event list is provided along with a date selection control. One or more events can be selected.

Team filters 858, player filters 860, and statistics filters can similarly be used to select one or more teams, players, and statistics to be used for filtering.

Another example of a search filter category is a location (not shown in FIG. 31). The location filter can be used to identify one or more of: a location at which the media content was captured, and a location of one or more subjects in the media content. In some embodiments, and as discussed herein, the location can be a specific position, or a region, for example. In some embodiments, when the location filter is selected, a map display is shown, such as one of the map displays shown in FIGS. 18-20. The user can then select a position or region from the map display to conduct a search for media content cards associated with that location. The location can also be identified in other ways, such as by selecting the location from a menu.

Another example of a search filter category is a direction (not shown in FIG. 31). The direction filter can be used to identify a direction that the recording device was pointing when the media content was captured.

As one example, a location and direction can be identified with a touch sensitive display by touching a position in the map display (e.g., FIGS. 18-20) and then swiping a finger in a direction. The touch input identifies the location and the direction of the swipe identifies the direction.

For a video production, search filters such as a date, a season, a person (e.g., user/actor/player/musician) can be used.

In some embodiments search filters can include popularity filters (e.g., most popular content) or time filters (e.g., on a particular date, at a particular time, within a range of dates or times, most recent content).

A cancel button 864 can be selected to exit the search filter definition display 850. A search button 866 can be selected to apply the search filter.

In some embodiments, multiple filters can be applied simultaneously, such as to search for cards including a photograph that are also tagged to a particular team. However, some filters can conflict with each other, such that if both of the filters are applied simultaneously, the search would, by definition, result in no hits. To avoid this situation, some embodiments include a conflicting event search auto-exclusion feature. This feature utilizes a list of conflicting filters. When one of the filters is selected, the conflicting filters are automatically disabled to prevent the user from selecting the conflicting filter. In this way, the system prevents conflicting filters from being applied.

Upon selection of the search button 866, a search is conducted for event segments and/or cards that match the search, and the respective timelines are displayed including the event segments and/or media content cards that match the search filter criteria.

Some embodiments include an intelligent auto-search feature. The auto-search feature is executed when a search filter is applied and does not result in any hits in the current timeline or the current view of the timeline. Rather than just indicating that no results were found, the auto-search feature automatically executes an expanded search for results matching the search filter outside of the current timeline and/or outside of the current view of that timeline.

In one example embodiment, after an unsuccessful search is performed, a No Results Found message is displayed for a period of time (e.g., two seconds). An expanded auto-search is then automatically activated which attempts to locate additional results outside of the current view and outside of the current timeline. In some embodiments the views and timelines are searched in a predetermined order. For example, views are searched in order from: My Cards, All Fans, Following, and One Fan, and timelines are searched in order from: event timeline to general timeline.

The expanded auto-search attempts to hits (in some embodiments, two or more hits) and continues expanding the search until the hits are located or until the search fails. During this process, an indicator is displayed showing that the expanded auto-search is in progress. If results are found, a results message is displayed, and the expanded auto-search results are displayed.

Another feature of some embodiments is a persistent search feature. Once a search filter has been defined using the search filter definition display 850 and applied, the search filter remains on as the user navigates between general and event timelines, and also between the various possible views of those timelines (as shown in FIGS. 27-30). This feature allows the user to navigate between the various displays without having to re-execute the search each time for a different display. The search filter can be toggled on or off using the timeline indicator, such as illustrated and described with reference to FIG. 29. The search filter can also be cleared or modified as shown in FIG. 32.

Figure 32:
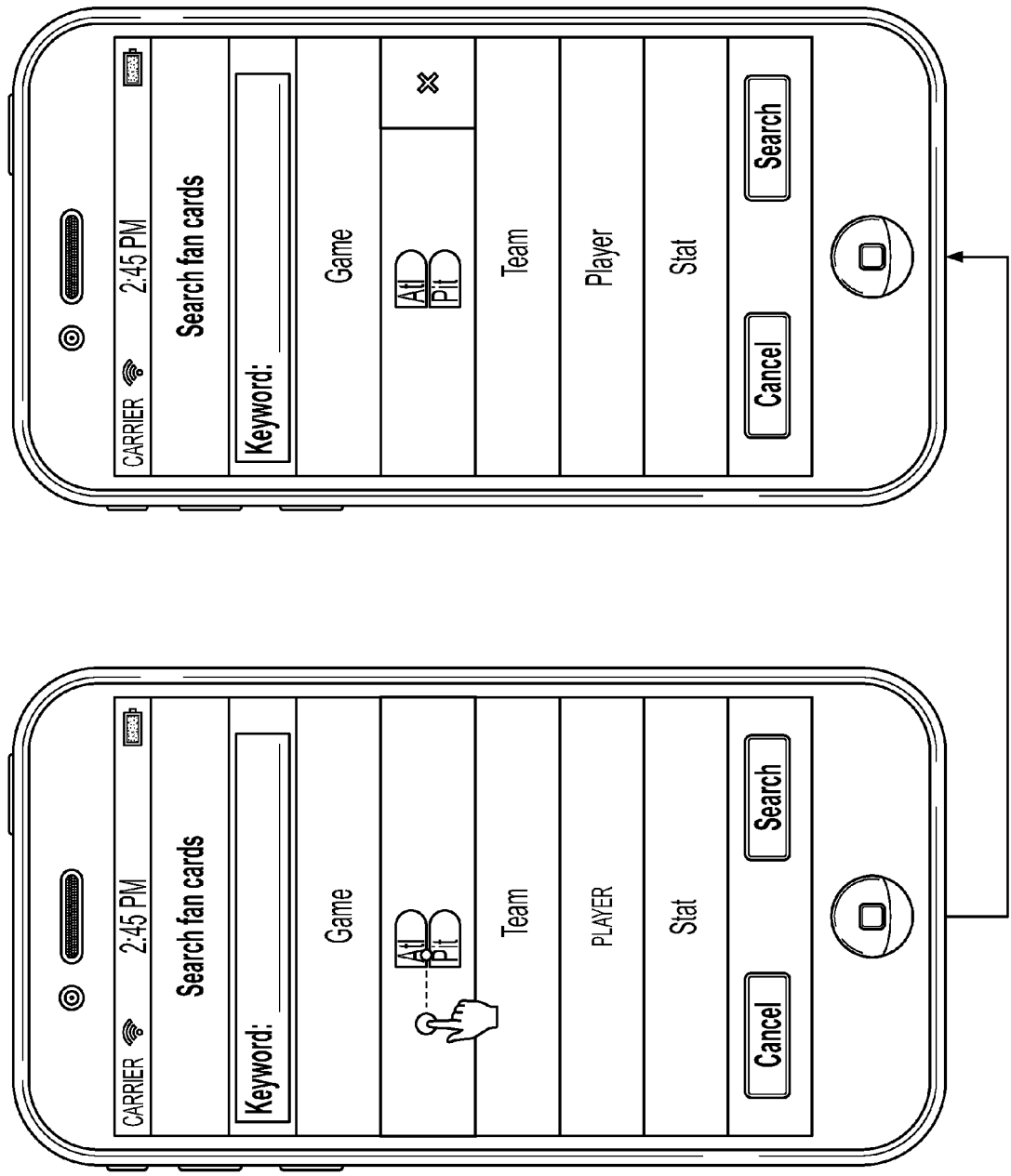
FIG. 32 illustrates additional search editing functionality that is provided in some embodiments.
Figure 32:
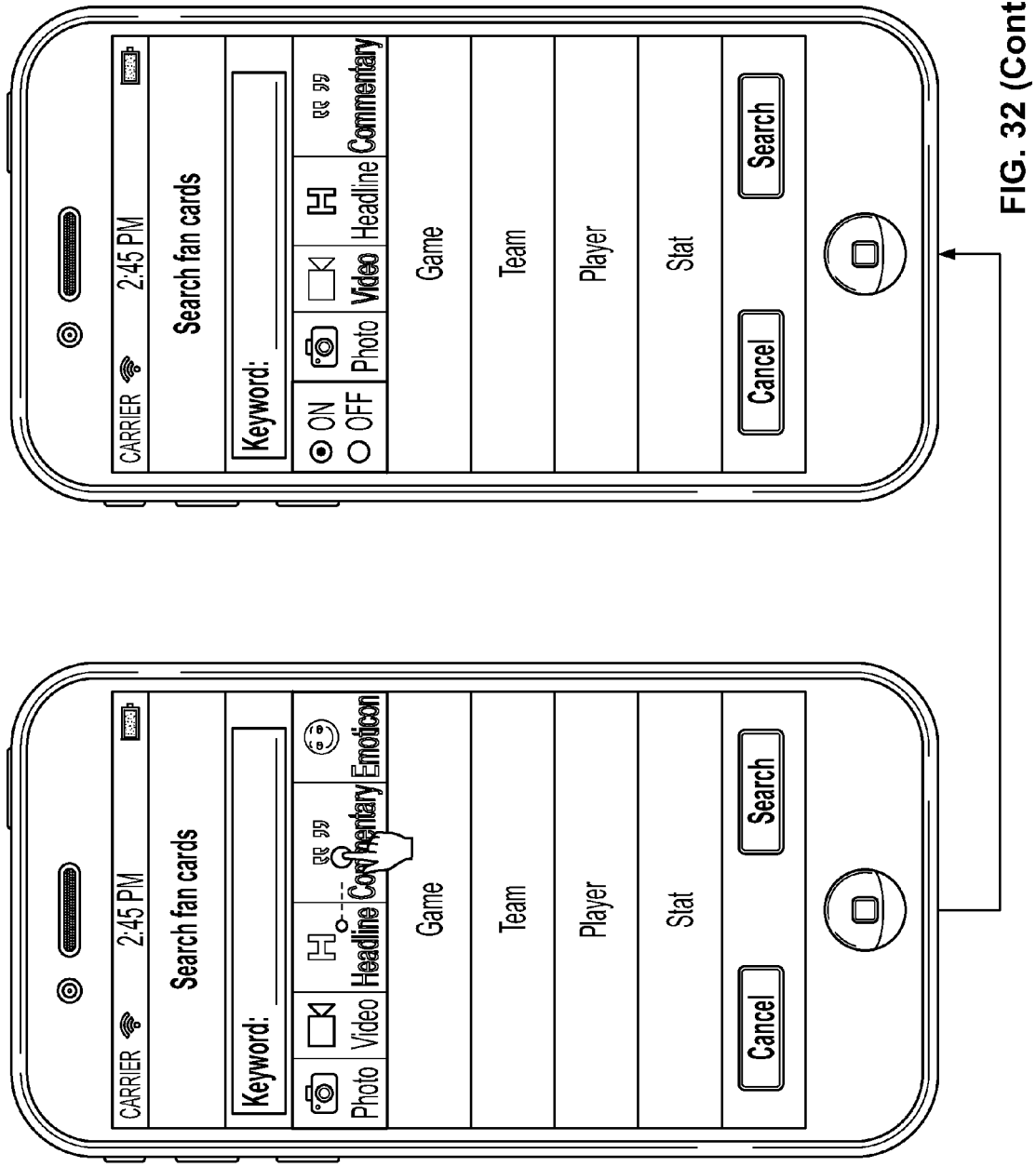

FIG. 32 illustrates additional search editing functionality that is provided in some embodiments.

For example, when the computing device has a touch sensitive display, touch inputs can be used to adjust search criteria. A search criteria screen uses gestures to access editing options. For example, swiping to the left or to the right will expose tools.

A swipe to the left exposes the clear button for that search criteria. Tapping on the clear button clears that search criteria from the search query, removing all selections that have been made for that search criteria.

A swipe to the right exposes the ALL ON/OFF buttons. Tapping on the ALL ON/OFF buttons allow the search criteria to be selectively activated or deactivated from the search query. When deactivated, the search criteria selections are allowed to remain but are deactivated. In this way, if the user wants to reuse the search criteria at a later time, the ALL ON/OFF button can simply be selected without requiring the user to re-enter the search criteria selections.

FIGS. 33-36 illustrate additional aspects of the content interaction engine 432, which are present in some embodiments.

FIG. 33 is a screen shot of another example of an event timeline display 820. As discussed herein, in some embodiments the event timeline includes event segment displays 824, in which the media content cards 802 can also be displayed.

Navigation controls are provided to assist the user in navigating within the user interface. In this example the navigation controls include scoreboard display 750 and close event control 826. The time indicator 830 is also provided to display the time associated with the currently displayed position in the event timeline display 820.

In some embodiments the navigation controls are initially displayed in the event timeline display 820, but are then retracted or otherwise disappear from view once the user has scrolled the event timeline display 820 up or down (such as with an up or down swipe input).

FIG. 34 is a screen shot of the example event timeline display 820 after the navigation controls shown in FIG. 33 have disappeared. As can be seen, the removal of the navigation controls from the user interface permits viewing of a larger portion of the event timeline display 820, because the navigation controls no longer obscure from view a portion of the event timeline display 820.

In some embodiments, the navigation controls reappear upon selection of the time indicator 830. For example, a tap input onto the time indicator 830 causes the navigation controls to extend or otherwise be displayed in the user interface, as shown in FIG. 33.

It can be seen that the time indicator 830 also obscures a small portion of the timeline display 820 from view. As a result, in some embodiments after a period of time has elapsed without receipt of an input into the event timeline display 820, the time indicator fades or otherwise disappears from view, revealing the previously hidden portion of the event timeline display 820, as shown in FIG. 35.

FIG. 35 is a screen shot of the example event timeline display 820 after the time indicator 830 (FIG. 34) has disappeared from view. As can be seen, the removal of the time indicator 830 permits viewing of the portion of the event timeline display 820 that was previously hidden from view.

To view the time indicator 830, the user simply provides an input into the user interface, such as by scrolling the event timeline display up or down with a swipe input, for example. Upon receipt of the input, the time indicator 830 returns to the display as previously shown in FIG. 34.

FIG. 36 is another screen shot of the example event timeline display 820. In this example, a navigation menu is displayed.

Another feature provided in some embodiments is a navigation menu 880. To permit a user to more quickly access certain features of the event-related user interaction system 111, a navigation menu 880 is displayed in some embodiments when a long tap input is detected into the user interface. The long tap is, for example, a tap input that lingers for a predetermined period of time. The period of time is typically set by the operating system, and is longer than the length of time required for a tap input. A long tap input can be an input of greater than about 0.25, 0.5, 0.75, or 1 second, for example. Upon receipt of the long tap, the navigation menu 880 is displayed. In some embodiments, the navigation menu includes a set of buttons. In some embodiments the buttons include one or more internal navigation control buttons, and one or more external interaction control button. The internal navigation control buttons are provided to navigate to internal features of the event-related user interaction system 111. The external interaction control buttons are used to share content with external sources, such as with a third-party social media system 132 (FIG. 1).

The internal navigation control buttons include, in this example, a media recorder button 882, a card generator button 884, a search button 886, a user search control 888, and a profile button 890. The external interaction control buttons include, for example, a share button 892.

The media recorder button 882 can be selected to initiate the media recorder 442 (FIG. 11). The card generator button 884 can be selected to initiate the card generator interface 520 (FIG. 13). The search button 886 can be selected to initiate the search filter definition display 850 (FIG. 31). The user search control 888 can be selected to initiate the user search interface to search for another user. The profile button 890 can be selected to load a profile page that displays the user's own user profile data. The share button 892 can be selected to initiate the sharing of information of media content with a third-party social media system 132 (FIG. 1).

In some embodiments the navigation control has a honeycomb shape, where each button has a hexagonal shape, and surrounds an open space (at the location of the initial input at point 878) also having a hexagonal space. In some embodiments the space at point 878 includes another control button. In another possible embodiment, the space can be used for an advertisement, such as including a logo or other graphic.

In some embodiments the navigation menu 880 is available anywhere, or nearly anywhere, in the user interface. In this example, the user provided a long tap input into a point 878 where there is an open space in the event timeline display 820, but other locations can also be used, such as directly on one of the event segment displays 824, or elsewhere. The system distinguishes between a selection input and a navigation menu request by the duration of the input that is provided, such as discussed above. A benefit of the navigation menu being displayed with the long tap input is that the navigation menu does not have to be constantly displayed on the screen where it would occupy space that can otherwise be used for other purposes. Instead, it can be entirely hidden from view until the user needs it, thereby allowing the space to be used for other features, such as the display of a larger portion of the event timeline display 820.

Another aspect of some embodiments involves push notifications to alert the user to prepare to capture a moment that may be about to occur. In order to encourage the capturing of noteworthy moments of an event, in some embodiments the system 100 provides push notifications to alert users to an event that may be about to occur. For example, if a baseball player comes to the plate having 199 career home runs, the event-related user interaction system can alert the user that the batter may be about to hit his $200^{th}$ home run of his career. Alerts can be generated for any purpose, such as to notify a user to a potential epic, historic, or significant moment of an event. The alert can be provided in the form of a pop-up alert, a banner notice, a vibration, a sound, a graphic, and the like. In some embodiments the alert includes a button (or other selectable control) that can be selected to initiate the media recorder (or to another camera function of the mobile computing device or other recording device) to allow the user to be ready to capture the event with the media recorder. In some embodiments the selection of the selectable control causes the initiation of the recording function in a ready-to-capture/record mode, reducing the change that the user misses the opportunity to capture the event due to having to navigate menus and initiate the capture/recording function of the device. The notification provides several benefits, in some embodiments, by increasing the use of the media recorder to capture important moments within an event, by increasing the amount of media content that is captured and saved as a permanent historical record of the moment, and by making the user aware of the fact that he or she has an opportunity to participate in documenting and capturing this moment.

Figure 37:
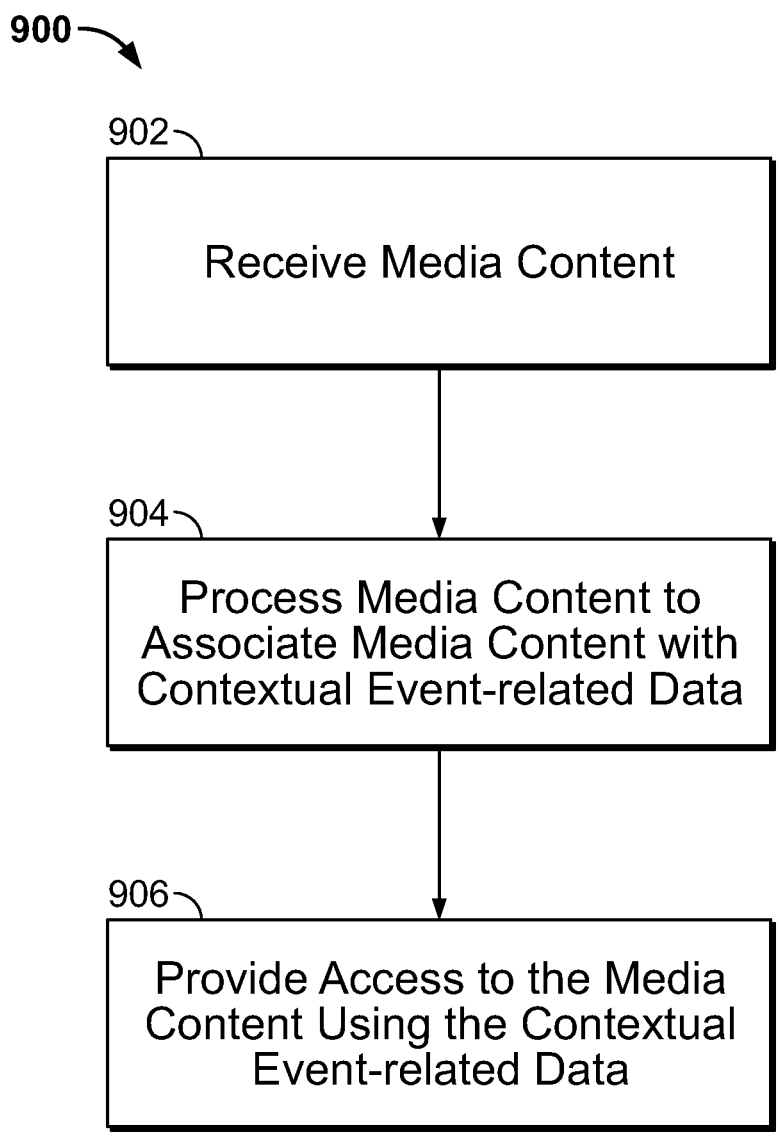
FIG. 37 is a flow chart illustrating an example method of contextualizing media content.

FIG. 37 is a flow chart illustrating an example method 900 of contextualizing media content. In this example, the method 900 includes operations 902, 904, and 906.

The operation 902 is performed to receive media content. The media content can include any one or more of a text-based message, a picture, an audio file, and a video, for example. In one example the media content is received through the media recorder 442, shown in FIG. 10. In another example, the media content is received through a user interface for receiving media content. Examples of such user interfaces are one or more of the media recorder 442 (FIG. 10) user interfaces and one of the user interfaces shown in FIGS. 38-40. Other embodiments include other user interfaces.

In some embodiments the media content is received directly from a user at the time it is generated. In other embodiments, the media content is received later, after it has been generated, such as from another computing device. For example, in some embodiments the receipt of media content of operation 902 occurs through a data transfer from another computing device or other device, such as in the form of an import process, API feed, or other data transfer.

In some embodiments media content is received from an external source. Examples of external sources include an API feed, a point and shoot camera, a digital camera, an article source, a photo source, a social media source, a news provider, a broadcast or cable television or media company, and the like.

Another example of media content is an article or an essay. In some embodiments the articles or essays are or include text-based content. Articles and essays can also or alternatively include other content, such as a picture or other graphic, and even video or audio recordings. Further, in some embodiments the media content is an excerpt or portion of an article or essay, such as a title, a summary, or other excerpt.

In some embodiments the media content includes a link, such as a hyperlink including a URL that provides a link to other or external content. For example, the link can include a link to a web site providing the full content of the article or essay. In another embodiment the media content is or includes a PDF file, or includes a link to a PDF file, such as a PDF file containing the full content of the article or essay.

The operation 904 is performed to process media content. In some embodiments, the processing of media content is performed to associate the media content with contextual event-related data. For example, in some embodiments the operation 904 utilizes one or more of a time, a location, a keyword, an identification of an event, and a user name, and/or other information, to identify a context of the media content. In some embodiments the media content is then associated with an event, and event-related data. An example of the operation 904 is illustrated and described in more detail with reference to FIG. 41.

The operation 906 is performed to provide access to the media content using the contextual event-related data. In some embodiments the media content is included in a media content display, such as any one of the displays described herein. For example, the media content can be included in an event timeline, a general timeline, a user timeline, and the like. In some embodiments, the media content is made available for searching using the contextual event-related data, and is therefore displayed in a search results display, or other filtered content display. In some embodiments the media content is included in a content feed. Other embodiments utilize the media content in other ways based on the contextual event-related data, such as those discussed herein. Several additional examples of the operation 906 are illustrated and described in more detail with reference to FIGS. 42-50.

In some embodiment the processing of media content in operation 904 is performed contemporaneous to the generation of the media content. In other embodiments, the processing of operation 904 is performed a period of time after the media content is generated, such as minutes, hours, days, weeks, months, or even years after the media content is originally generated.

Figure 38:
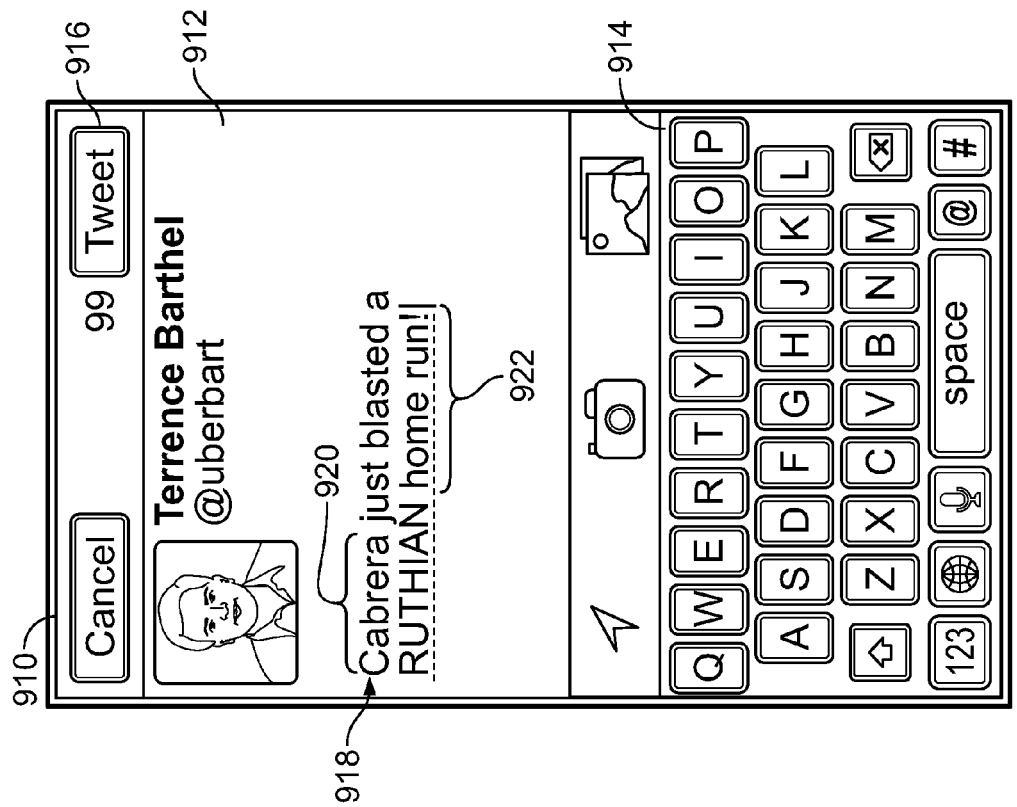
FIG. 38 is a screen shot illustrating an example user interface for receiving media content from a user.

FIGS. 38-40 illustrate examples of user interfaces for receiving media content, and also illustrate examples of media content that can be received, such as through the operation 902, shown in FIG. 37.

FIG. 38 is a screen shot illustrating an example user interface 910 for receiving media content from a user. In this example, the user interface 910 includes a content entry window 912, keypad 914, and publication control 916, which are used to receive a message 918 from the user. The message 918 is an example of media content.

In some embodiments the user interface 910 is displayed on a display of a computing device 110 (shown in FIG. 1), such as the mobile computing device 120 or computing device 122. In some embodiments the user interface 910 is generated by an app or software application running on the computing device. In other embodiments the interface is generated by the server 102 or another system, such as the third-party social media system 132. In some embodiments the server 102 and the third-party social media system 132 are the same system or parts of the same system.

The content entry window 912 is a region of the user interface 910 that operates to display a message 918 received from the user. In this example, an on screen keypad 914 is provided in the user interface. The user can touch directly onto the keypad through a touch sensitive display to enter the message 918 into the content entry window 912. Other types of input devices can also be used in other embodiments, such as a physical keypad or keyboard, a voice input device such as a microphone, and the like. Voice inputs can be recorded as media content, or can be processed using voice recognition software, for example, to generate text-based media content. Voice inputs can also be used for other purposes, such as for voice commands (for initiating actions, serving up content, providing a search query for a voice-enabled search), including voice controlled navigation through various menus or user interface displays.

Some embodiments utilize a gesture detection device, such as a video camera or the Microsoft™ Kinect system to detect gesture inputs based on the movement of the user's body.

In some embodiments a publication control 916 is provided in the user interface. Upon completion of the generation of the message 918, the publication control is selected by the user to initiate publication of the message 918.

In some embodiments the message 918 is associated with one or more time stamps. Examples of time stamps are discussed herein. For example, some embodiments include an initiation time stamp that identifies the time that the user provided an input indicating a desire to generate the message 918. Some embodiments include a publication time stamp that identifies the time that the user selected the publication control 916, or the time that the message 918 was received at the server 102, for example. In some embodiments a time stamp is included in media content metadata. Some embodiments include a time stamp indicating a time identified by the user for the message 918. Other embodiments include a time stamp associated with an event segment identified by the user. Other time stamps are used in other embodiments.

For example, a time stamp can be generated at any point in the process of generating or communicating a media content item. One example is a moment capture time stamp, which occurs when a user provides an input indicating a desire to provide media content (e.g., selection of a capture button, or selection of a control indicating a desire to generate a new media content item, etc.). Another example is the publication time stamp. In addition, in some embodiments time stamps are time adjusted forward or backward from a given moment, such as to account for a known or likely time delay. In some embodiments time stamps are adjusted based on actions that occur during an event, such as to automatically shift the time stamp to a closest time stamp at which a major action occurred during the event. Time stamps may also be captured by a separate device, and associated with the media content at a later time.

In some embodiments the message 918 is a text-based message. In some embodiments the message includes a series of characters. In some embodiments a length of the message is limited to a predetermined quantity of characters, such as 40, 120, 140, 160, 5,000, or 63,206 characters. Examples of messages 918 include the headlines and commentary discussed herein.

In this example, the message 918 is composed entirely of characters of the English alphabet. In some embodiments, messages include keywords. An example of a keyword is a word contained in or associated with event-related data 114, discussed herein. For example, the message 918 shown in FIG. 38 states: "Cabrera just blasted a RUTHIAN home run!" In this example, the words "Cabrera" 920 and "home run" 922 are keywords that are associated with the event-related data 114. More specifically, the word "Cabrera" is the last name of a player in a baseball game (see, e.g., record 402, FIG. 7, for example), and the word "home run" is a keyword for an action (see, e.g., plays record 396 shown in FIG. 7 and action data item 170, shown in FIG. 6) that occurred during the event. In this example, no action is required by the user to identify the words as keywords, and no knowledge of the keywords is required by the user when typing the message 918. Keywords can include one or more words, and can include one or more of letters, numbers, symbols, or any other characters.

In some embodiments the media content includes other content, in addition to or in lieu of the message 918, such as a photograph, video, etc. In some embodiments the media content includes a location, such as a GPS coordinate or other location identifier.

FIG. 39 is another screen shot of the example user interface 910 shown in FIG. 38.

In this example, the message 918 states: "Miggy goes yard! #HR." This example, like the example shown in FIG. 38, includes several keywords, such as keywords 924 and 926. The keyword 924 is "Miggy." The keyword is a known nickname for the player, Miguel Cabrera. In some embodiments player nicknames are stored in a database (e.g., FIG. 7) or received as event-related data 114 (FIG. 1), which associate such nicknames with the player or other event participant, for example.

The keyword 926 is "#HR." In this example, the keyword begins with a symbol, such as a pound or hash symbol, sometimes referred to as a hashtag. In some embodiments, the symbol identifies the keyword 926 as a keyword. In this example, the characters following the keyword are an abbreviation "HR" which stands for "home run." In some embodiments abbreviations are stored in a database (e.g., FIG. 7) or received as event-related data 114 (FIG. 1), which associate the abbreviations with other keywords used in the database or event-related data 114 (FIG. 1).

In some embodiments a keyword is an identifier.

FIG. 40 is another screen shot of the example user interface 910 shown in FIG. 38.

In this example, the message 918 states: "@MiguelCabrera for MVP! #tigers #MLB." This example also includes several keywords, including keywords 928, 930, and 932.

In some embodiments, keywords of the message 918 include a username. In this example, the keyword 928 is the username: "@MiguelCabrera." In some embodiments the username begins with a symbol, such as the @ symbol to identify the keyword as a username. In other embodiments, the username does not begin with a symbol. In some embodiments usernames are stored in the database or are received as event-related data. In other embodiments the username itself can be parsed to identify a known name that is associated with the username, or likely to be associated with the username. A username can identify a particular person, an event, or a group (such as a team), for example. In some embodiments a username is a handle.

In this example, the message 918 also includes the keyword 930 "#tigers" and the keyword 932 "#MLB." For example, the keyword "#tigers" is a team name associated with the Detroit Tigers baseball team, and the keyword #MLB is an abbreviation for Major League Baseball.

These examples illustrate just a few of the many different examples of keywords that can be included in a message, or other media content. Keywords can identify any one or more of a team or group, a player or event participant, a statistic, a location, an event venue, or a general topic or association, for example. Any data included in the database (e.g., such as the example shown in FIG. 7) or receiving in the event-related data stream can be usable as a keyword in some embodiments. Additionally, any keywords that can be identified as being associated with such data can also be usable as a keyword. Examples of these include abbreviations (associated with the words they represent), nicknames (associated with the name of a person), usernames (associated with the name of a person), and the like.

FIGS. 39 and 40 illustrate that media content can be displayed along with one or more keywords, or other event-related data. In some embodiments the event-related data is original content provided with the media content, and in other embodiments the event-related data is tagged to the media content. For example, the display 910 can display a keyword (including a hashtag) for a sports team (e.g., "Tigers" or "#Tigers") to which the media content relates. Any of the event-related data associated with the media content can be displayed in a media card or other display of media content. In some embodiments the event-related data is displayed in or adjacent to the media content in a media content display, and in other embodiments the event-related data is displayed in such a way to show an association between the media content and the event-related data. Media content displays can be similarly generated and displayed by external sources, such as a social media system 134 or search engine 135, for example, including both the media content and any one or more of the event related data items associated with the media content.

Figure 41:
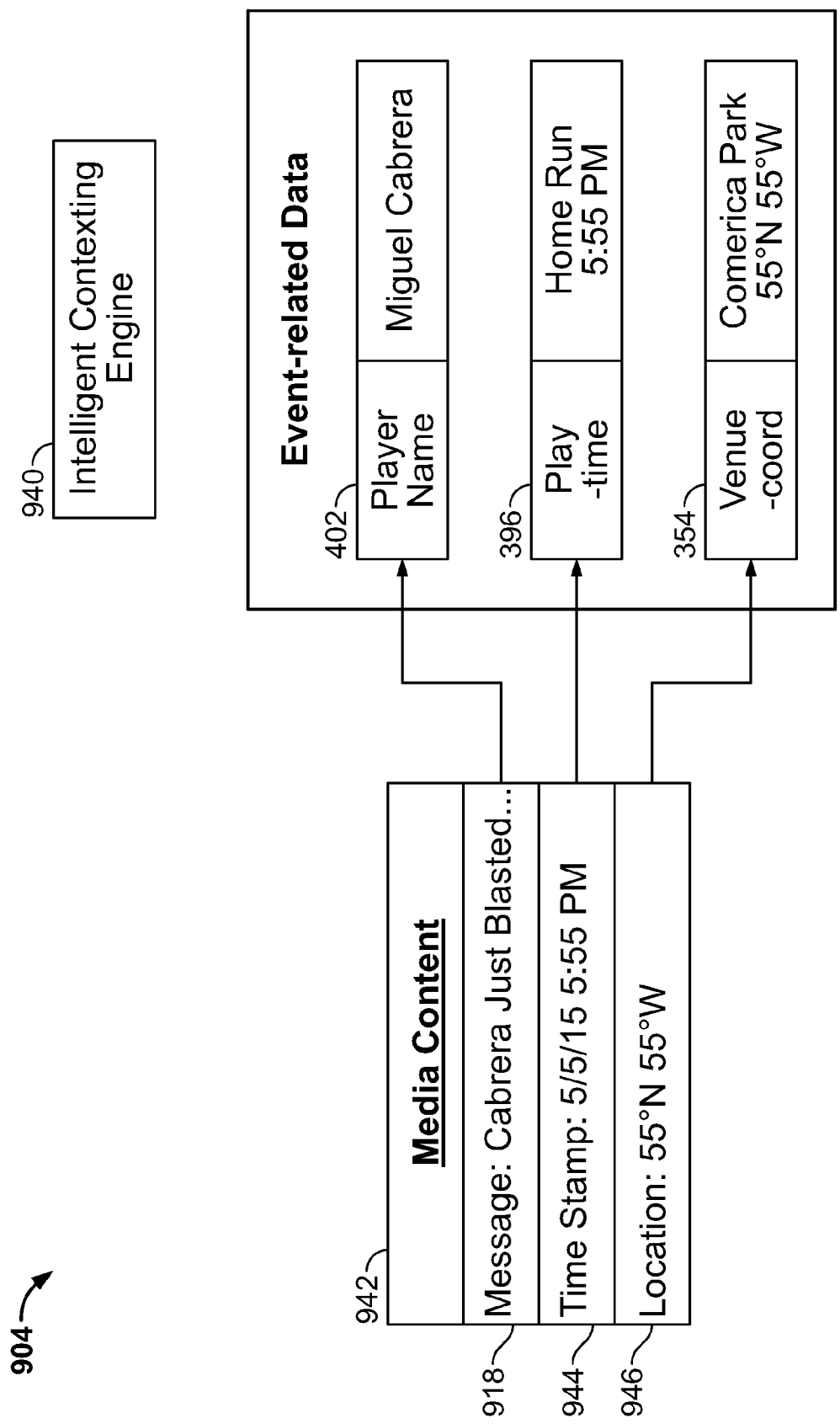
FIG. 41 is schematic block diagram illustrating an example operation for processing media content to associate media content with contextual event-related data.

FIG. 41 is a schematic block diagram illustrating an example of the operation 904, shown in FIG. 37, for processing of media content to associate media content with contextual event-related data. FIG. 41 also illustrates an example of an intelligent contexting engine 940.

Depicted in FIG. 41 are the intelligent contexting engine 940, an example of media content 942, and portions of event related data 114. In this example, the media content 942 includes the example message 918 shown in FIG. 38, as well as a time stamp 944, and a location 946. In other embodiments the media content 942 can include more, less, or other content.

In some embodiments the media content 942 is processed by an intelligent contexting engine 940, which operates to identify contextual information associated with the media content 942 (and therefore also associated with the message 918). The matching engine 206 (FIG. 5) is another example of an intelligent contexting engine.

In some embodiments, the intelligent contexting engine 940 compares the data contained in the media content 942 to event-related data 114 to determine whether any matches can be identified. In this example, multiple matches are identified. For example, the keyword 920 "Cabrara" is found to match a name of an event participant in the player record 402 for player Miguel Cabrera. The keyword 924 "home run" is found to match an action item 396 in play record 396. The time stamp is found to match the time of an action item in the play record 396. The location is found to match a GPS coordinate of an event venue in the event venue record 354.

In some embodiments matches can be full or partial matches. In some embodiments thresholds or ranges are used to identify matches, such that identical matches are not required.

The intelligent contexting engine 940 then, in some embodiments, utilizes the matches to associate the media content with contextual-event related data. For example, using the location and time stamp, the intelligent contexting engine 940 determines that a baseball game between the Detroit Tigers and the Oakland Athletics occurred at Comerica field on May, 5, 2013 and was in progress at 5:55 pm. In addition, the intelligent contexting engine 940 also determines an event segment associated with the media content 942 by identifying a particular play that occurred at 5:55 pm, during which Miguel Cabrera hit a home run. Therefore, the media content 942 is tagged, or otherwise associated, with the event and the event segment by the intelligent contexting engine 940.

In some embodiments the various data of the media content 942 is used by the intelligent contexting engine to determine a likelihood that the media content 942 is associated with certain contextual information. In some embodiments a relevance score or confidence level score is generated based on the matches. As one example, if the relevance score or confidence level score exceeds a threshold value, the media content 942 is determined to be associated with the contextual information. As another example, one or more keywords in a text-based message describing how epic Mauer's home run was, which occurred three innings ago, can be given a higher relevance score than a creation or publication time stamp associated with the media content item, so that the media content item is properly associated with the moment that the home run occurred. In other words, certain contextual information can be used by the intelligent contexting engine to override other contextual information, in some embodiments.

In some embodiments a user is prompted to verify the proposed association, while in other embodiments the association is made automatically without additional user involvement. In some embodiments a user is prompted to verify the association, or to select from multiple possible associations, when the relevance score or confidence level is below a threshold, or when the intelligent contexting engine cannot decide between multiple possible options.

In some embodiments keywords or other information contained in the media content 942 can also be used to determine that certain contextual information is not associated with the media content, such as to reduce the relevance score. For example, a message containing the keywords "baby" and "twins" may be determined to be less likely to be related to the Minnesota Twins baseball team than a message that only contains the keyword "twins" without the keyword "baby."

Other embodiments utilize additional information to determine the association between media content and contextual information. As one example, some embodiments include an event identification or event check-in feature in which a user can select a particular event that he or she is currently participating in. An event identifier is then provided with the media content 942, for example, to permit the intelligent contexting engine 940 to associate the media content 942 with the event and all associated event-related data.

In another possible embodiment, a user provides the contextual information in the form of an instruction to associate the media content with certain event-related data. For example, the user can provide a voice input that states: "tag to Mauer's home run against the Tigers today." The voice input is processed to determine the date (today), the event (a game involving a player named "Mauer" and a team named the "Tigers"), and a particular play (Mauer's home run). The contextual information is processed and identified in the event-related data to tag the media content to the play, game, and all other event-related data associated with the event. In some embodiments, the user can be prompted to clarify any ambiguity. For example, if Mauer had multiple home runs in the game, the system could prompt the user whether it should be tagged to the home run in the first inning or the home run in the sixth inning.

Some embodiments obtain or generate other contextual information. For example, some embodiments obtain information from an external communication device transmits information to the user's computing device to provide contextual information. One example is GPS data. Another example is a near field communication device. In another example, the external communication device is a wearable or implantable communication device. For example, a player can wear or have implanted a communication device that transmits the player's name or other player identifier. The user's computing device 110 receives the transmission and includes the identifying information with the media content 942. In another embodiment, the media content 942 can be processed to generate additional contextual information. As one example, a photograph or video contained in the media content 942 can be processed for identifying information, such as to identify a person using facial recognition techniques (e.g., using the DeepFace™ facial recognition system of Facebook™, Google's object recognition engine, Google info cards, etc.), or to identify a location using photographic recognition techniques (e.g., to identify a portion of a particular baseball stadium that is visible in the photograph or video), or identification techniques. Sound recognition can also be used in some embodiments to aide in determining context. For example, sounds can be compared with an audio feed at an event to match the sounds to the event and/or a particular moment of the event. Background noise may be processed to provide further contextual information. The sounds can be part of the media content or may be captured separate from the media content, such as through a microphone 270 of the computing device, shown in FIG. 5. Of course, any recording or processing of photographs, video, or sounds through the microphone 270 occurs only with explicit permission from the user and in limited circumstances permitted by the user in order to carefully protect the user's privacy. Some embodiments utilize image metadata or other media content metadata. Some embodiments utilize data tagged to or manually associated with media content.

In some embodiments the intelligent contexting engine also associates the media content 942 with all other related data, such as the team names, player statistics, and any other known data (such as the example data shown in FIG. 7, or other data). This association can be performed based, for example, on the known relationships identified in the event-related database. Notably, the media content 942 can therefore be associated with contextual information including contextual information that is included in the media content, and also contextual information that is not originally included in the media content 942 (e.g., the name of the team (Detroit Tigers) that Miguel Cabrera is on, etc.). In fact, a message 918 need not contain keywords or other contextual information to be properly associated with the contextual information (e.g., based on the time, location, and/or other information).

Also notably, the media content 942 need not be individually associated directly with each of the relevant event-related data items, but rather can be simply associated with one (or more) of the data items, such as a particular event or event segment. By associating the media content 942 with the event segment, all other data items that are associated with that event segment (e.g., the event, the players in the event, the time of the event, the location of the event, event statistics, player statistics, the team names, etc.) are automatically also associated with the media content 942, for example. This permits a large amount of contextual data to be associated with the media content 942.

In some embodiments the intelligent contexting engine is used to process media content shortly after it is created, such as upon receipt of the media content by the server 102 (FIG. 1). In other embodiments, the intelligent contexting engine is used to process a database or other collection of historical media content records, to automatically associate the media content stored therein with contextual information.

In some embodiments the intelligent contexting engine receives the media content, and/or data associated with the media content, from an external source. For example, in some embodiments the media content is received through an API feed. In some embodiments the contextual information is output to an external source after identifying the contextual information, such as through an API feed.

FIGS. 42-49 illustrate examples of operation 906, shown in FIG. 37, for providing access to the media content using the contextual event-related data. Other example displays are also discussed previously herein, which are also suitable for displaying media content. Further, numerous other displays are also possible, in addition to the specific examples illustrated herein.

FIG. 42 is a screen shot of an example display 950 for displaying message 918, or other media content. In this example, the display 950 includes a media content display 952 for displaying the message 918. In some embodiments, the media content display 952 is part of a timeline display, a content feed, or other display.

The media content display 952 includes media content, such as a message 918. In some embodiments, the media content display 952 provides contextual information, or provides access to contextual information, relating to the media content.

For example, some embodiments include a contextual information display 956. In this example, the contextual information display 956 includes one or more of a scoreboard display 958 and an event segment display 960. The scoreboard display 958 displays a scoreboard for the event (e.g., a baseball game between Oakland and Detroit) associated with the media content of message 918. In some embodiments the scoreboard display 958 is selectable to cause the user interface to display additional contextual information, or to permit navigation to additional contextual information of interest.

The event segment display 960 displays information about the specific event segment associated with the media content of message 918. For example, the event segment display 960 shows that the media content is associated with an action that occurred in the bottom of the fifth inning in which Miguel Cabrera hit a two-run home run.

In some embodiments the contextual information display 956 is originally hidden from view. In other embodiments the contextual information display 956 can be hidden from view. In some embodiments the contextual information display 956 is graphically depicted as a pull-out drawer that can be opened or closed upon the receipt of an input, such as a swipe or tap input. A graphical icon or link is provided in some embodiments to indicate that the contextual information display 956 is available and to prompt the user to provide the input to view the contextual information.

FIG. 43 is a screen shot of another example display 950 for displaying message 918, or other media content. In this example, the display 950 includes another example media content display 952.

In this example, the media content display 952 includes a link 962 to contextual information associated with the media content of message 918. As one example, the link 962 is a link to a particular event segment associated with the message 918. Upon selection of the link, additional contextual information is displayed. In some embodiments, the selection of the link 962 causes navigation to another display providing the contextual information. In another embodiment, the display 950 is updated to show the contextual information, such as by providing the contextual information display 956. In this example, the contextual information display 956 includes an event segment display 960. Other embodiments include other contextual information displays.

In some embodiments the contextual information displays are selectable to display or navigate to additional contextual information.

Figure 44:
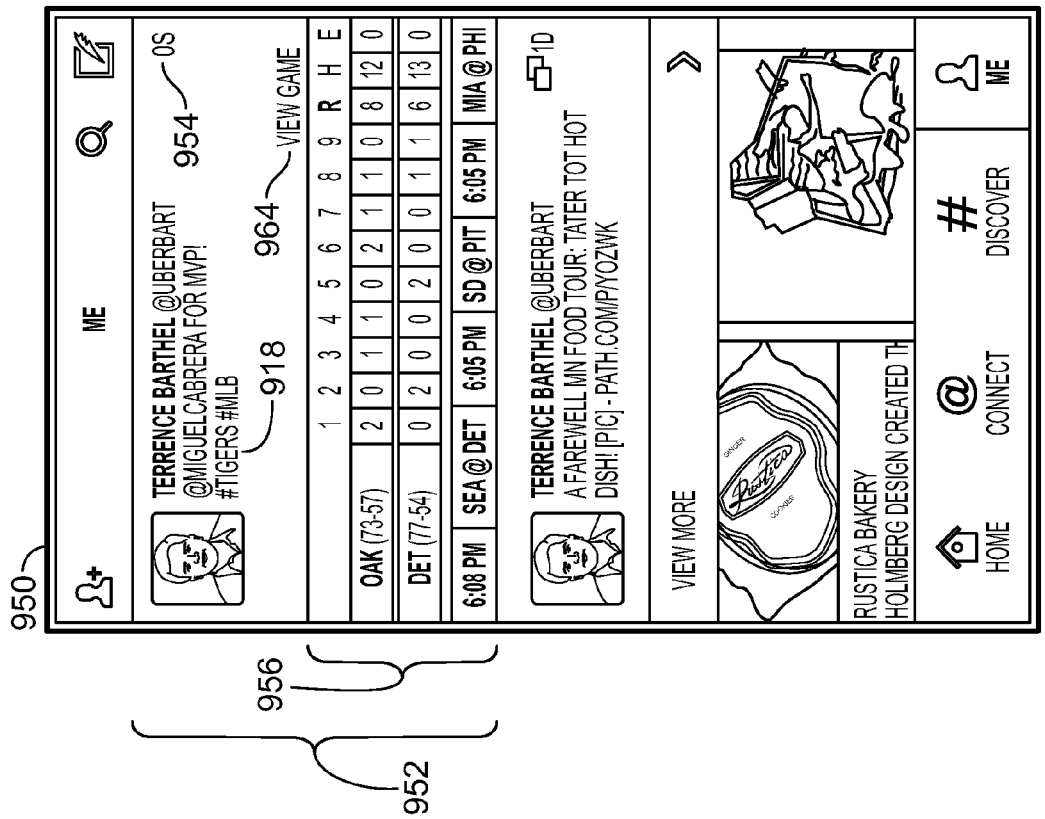
FIG. 44 is a screen shot of another example display for displaying a message or other media content.

FIG. 44 is a screen shot of another example display 950 for displaying media content, such as a message 918. In this example, the display 950 includes another example media content display 952.

In this example, the media content display 952 includes a link 964 to contextual information associated with the media content of message 918. As one example, the link 964 is a link to additional information about the event associated with the message 918. In some embodiments, the selection of the link 964 causes navigation to another display providing the contextual information for the game. In another embodiment, the display 950 is updated to show the contextual information, such as by providing the contextual information display 956 in the media content display 952. In one example, the contextual information display 956 includes the game scoreboard 958. Other embodiments include other contextual information and displays. In some embodiments the game scoreboard 958 or other contextual information is selectable to display or navigate to additional contextual information.

Detailed Description

FIGS. 45-50 illustrate other example displays.

Figure 45:
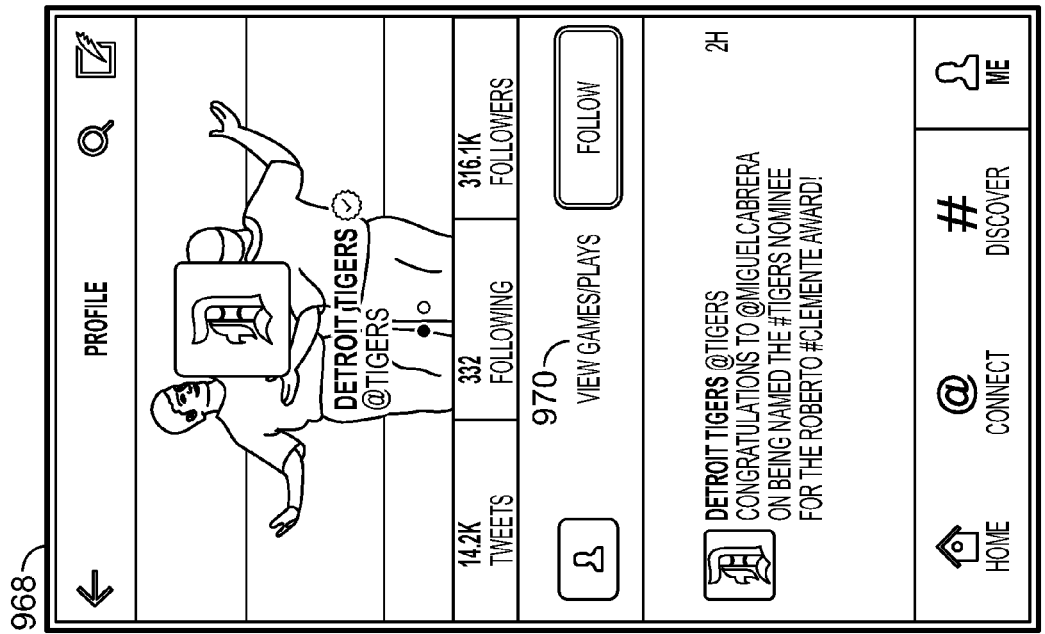
FIG. 45 is a screen shot of an example team profile display for a team.

FIG. 45 is a screen shot of an example team profile display 968 for a team, such as the Detroit Tigers. In this example, the profile page includes a link 970 to contextual information. In this example, the link 970 is selectable to display or navigate to additional contextual information, such as information about the events that the team has played in, and/or specific plays in those games. Other contextual information is provided in other embodiments.

Figures 46, 47:
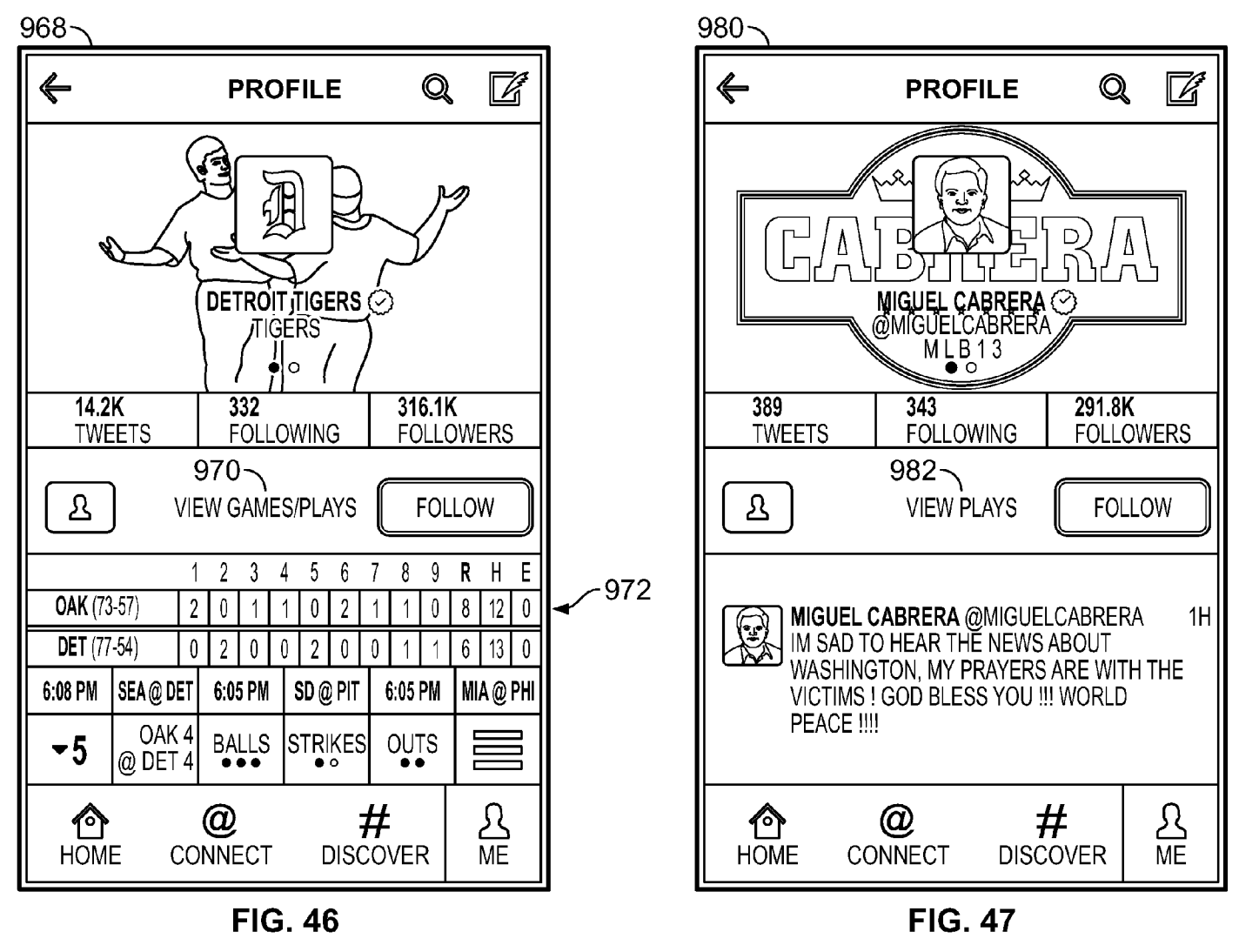

FIG. 46 is a screen shot of another example of the team profile display 968 shown in FIG. 46. In this example, upon selection of the link 970, a contextual information display 972 is presented. In this example, the contextual information display 972 includes a scoreboard and an event segment display displaying contextual information associated with the team. Other embodiments provide other contextual information. In some embodiments the contextual information display 972 can be selected to display or navigate to additional contextual information.

FIG. 47 is a screen shot of an example player profile display 980. In this example, the player profile display 980 includes a link 982 to additional contextual information associated with the player.

Figure 48:
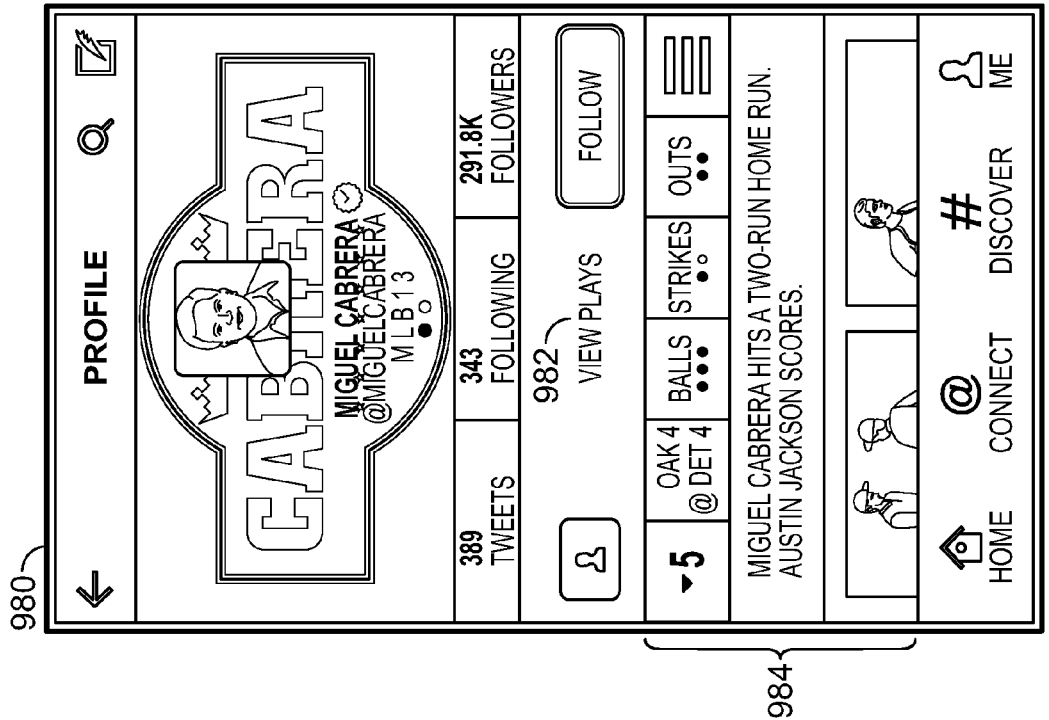
FIG. 48 is a screen shot of another example of the player profile display shown in FIG. 47.

FIG. 48 is a screen shot of another example of the player profile display 980. In this example, the player profile display 980 includes a contextual information display 984. In some embodiments the contextual information display 984 is toggled between a hidden and a visible state upon selection of the link 982. In this example the contextual information display 984 includes an event segment display. In some embodiments the player profile display includes a timeline display showing event segments associated with the player, for example, and may also include additional media content associated with the event segments. Other contextual information displays 484 are included in other embodiments.

Figure 49:
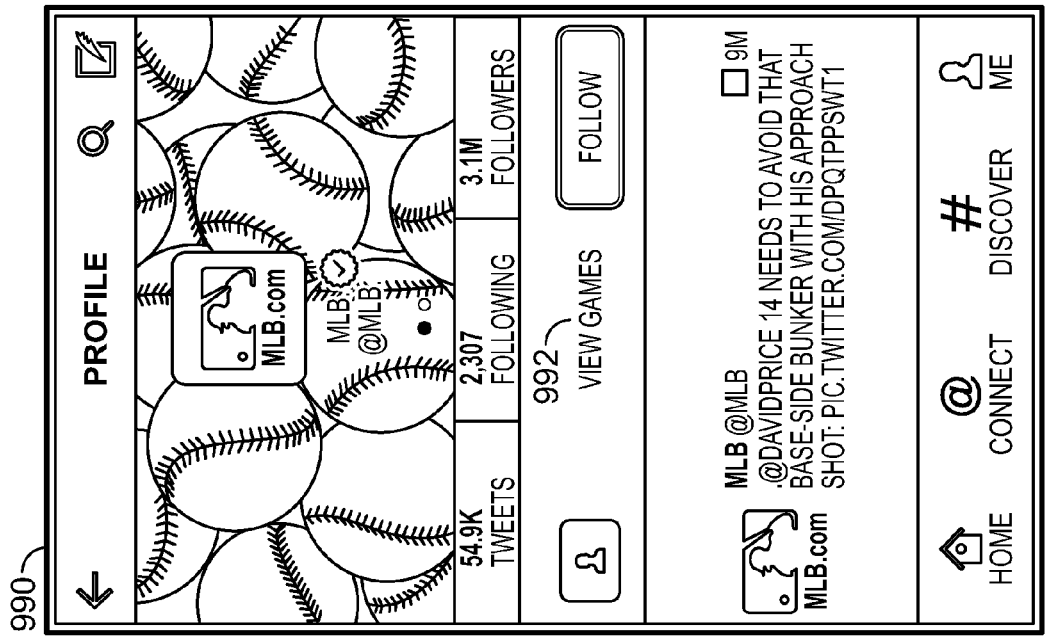
FIG. 49 is a screen shot of an example group profile display.
Figure 50:
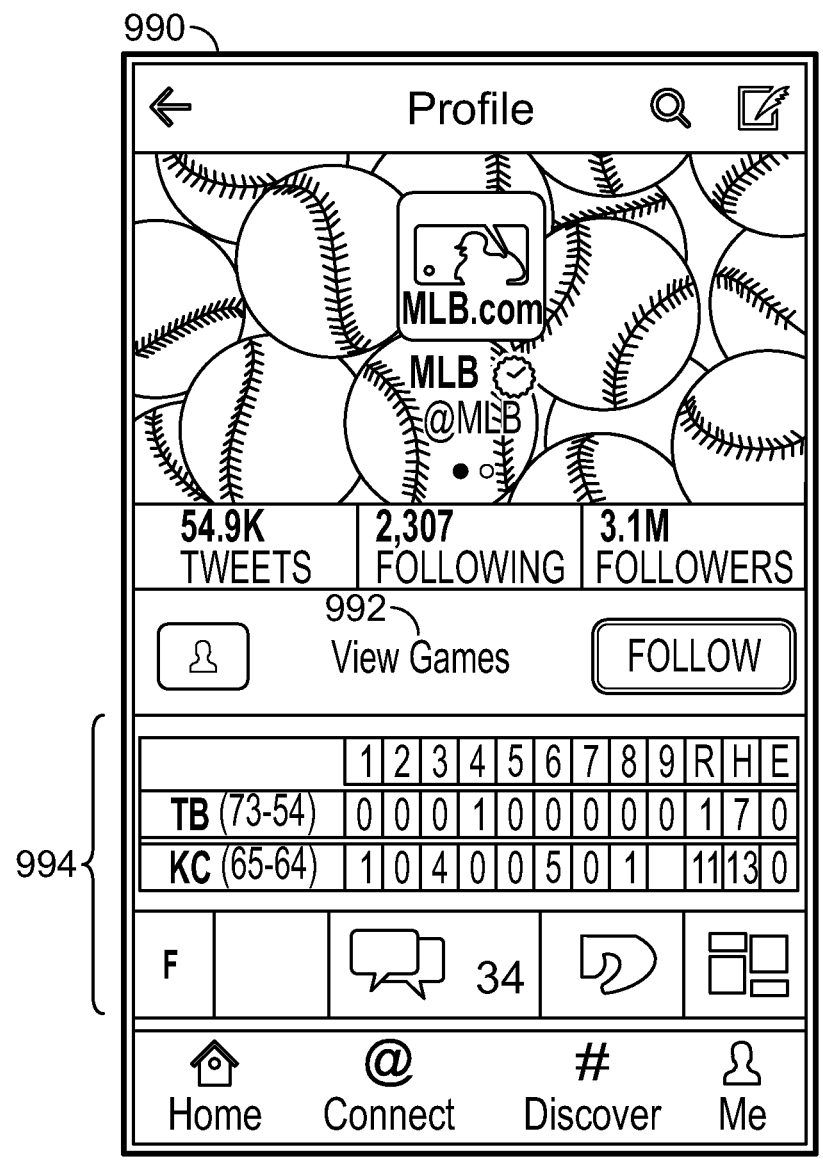
FIG. 50 is a screen shot of another example group profile display.

FIGS. 49 and 50 illustrate examples of another profile display for a group, such as for the Major League Baseball organization. Contextual information associated with the group can be similarly presented, displayed, or made available for navigation through the profile display, such as through a link 992 and/or a contextual information display 994.

FIGS. 51-56 illustrate examples involving content volume graphs.

Figure 51:
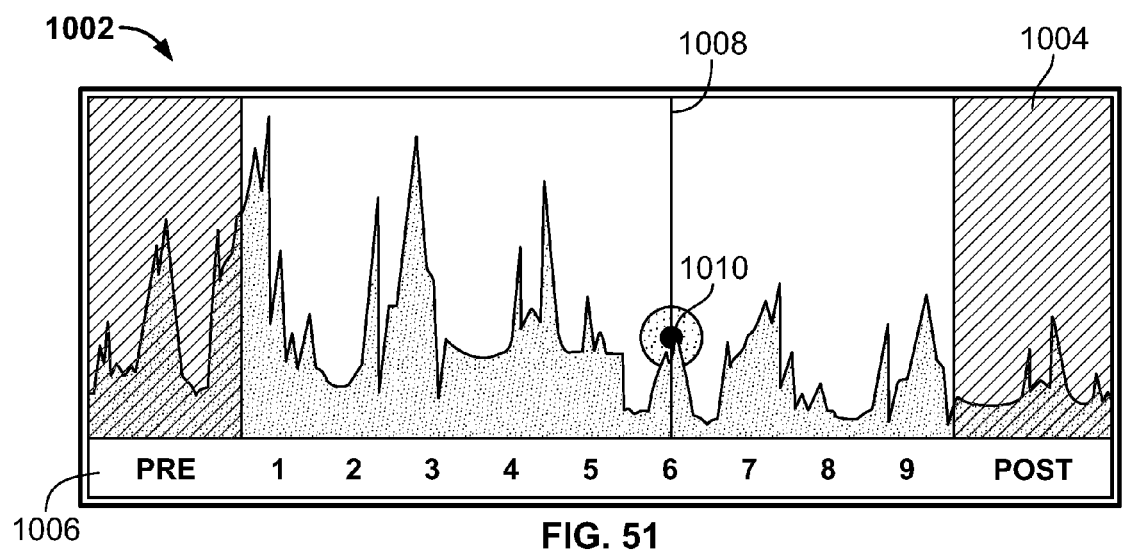
FIG. 51 is a screen shot illustrating an example content volume display including a content volume graph and a time scale.

FIG. 51 is a screen shot illustrating an example content volume display 1002. In this example, the content volume display 1002 includes a content volume graph 1004 and a time scale 1006.

The content volume graph 1004 is a diagram that graphically depicts a quantity of media content over time. The time scale 1006 identifies certain points in the content volume graph 1004.

The example shown in FIG. 51 depicts an example content volume display 1002 for a baseball game. Therefore, in this example the time scale 1006 includes identifiers for each of 9 innings (scored segments), as well as identifiers for Pre-game activity and post-game activity.

The content volume graph 1004 shows the relative volume of media content associated with the various points in time in the game. For example, it can be seen that there are spikes at the beginning of the first inning, the beginning of the third inning, and at the end of the fourth inning. These spikes correspond with points in the game that are associated with the most media content. Because media content is often generated at points of particular interest, the points in the diagram that have the greatest content often correspond to points of interest during an event. Therefore, a quick visual inspection of the content volume graph 1004 can permit a user to quickly identify particular moments in a game, as well as the media content associated with such moments. Other embodiments include other event meter displays, of which the content volume graph 1004 is an example. In some embodiments the event meter display, including the volume graph, includes a graphical display that depicts a magnitude of one or more aspects of an event over time. One example of an aspect of an event is a volume of content items associated with a moment of the event. Another example is a number of points a team obtains during a scored segment of an event. Runs, hits, errors, or actions can be similarly displayed in an event meter display, as well as any other quantifiable aspect of an event. Another aspect is a noise level, such as detected by a recording device or through a broadcast of an event.

In the content volume graph 1004 the vertical axis typically represents a quantity of the media content received during an interval of time, such as during a scored segment, during an event segment, or other interval of time (e.g., 30 seconds, one minute, five minutes, etc.).

In some embodiments the time scale 1006 is displayed on or adjacent the content volume graph 1004. The time scale can show actual times (e.g., 7:00 PM) or time segments, such as identifiers of particular event or scored segments.

In some embodiments the content volume display 1002 is simply a display providing contextual information. For example, in some embodiments the content volume display 1002 includes a time identifier 1006 that identifies a particular point along the time scale 1006. When the content volume display 1002 is displayed adjacent a media content item, for example, the content volume display 1002 permits the user to quickly identify a point during the event that is associated with the media content.

In other embodiments the content volume display 1002 is selectable. For example, a user can tap on or otherwise select the content volume display 1002 to display or navigate to additional contextual information or additional media content.

In yet other embodiments, the content volume display 1002 is a user input control. For example, in some embodiments the user provides an input into the content volume display 1004, such as by touching and sliding a finger along the display, or by providing other inputs such as a click, drag and drop input, etc. A selected point 1008 indicates the current input location. As the user moves the point 1008 left or right, different times along the time scale 1006 are identified by the time identifier 1006. This input can be used to display or navigate to additional contextual information or media content, for example.

Figure 52:
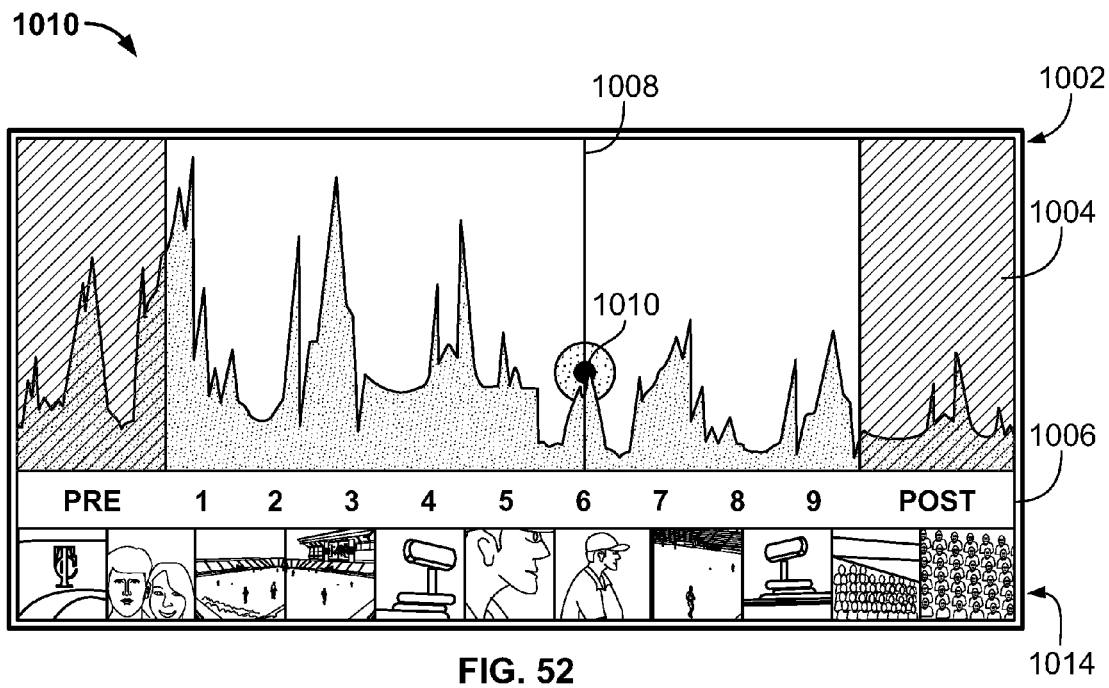
FIG. 52 is a screen shot illustrating an example user interface including a content volume display.

FIG. 52 is a screen shot illustrating an example user interface 1010 including the content volume display 1002 of FIG. 51. The example content volume display 1002 includes a content volume graph 1004, a time scale 1006, a time identifier 1006, and a selected point 1008.

In this example, the content volume graph 1004 includes a media content previous window 1014. In some embodiments the media content preview window 1014 shows a preview of media content associated with the point in the event identified by the time identifier 1006, such as the 6$^{th}$ inning. The media content depicted in the preview window can include photographs, videos, text, or any other media content in some embodiments. In other embodiments the media content shown in the content preview window 1014 is only pictures. In some embodiments only selected media items are shown in the preview window 1014, such as based on a number of views or other factors.

In some embodiments the content volume display 1002 is a user input control. Upon receipt of an input to the left or right, the time indicator 1006 is adjusted to the selected time. Similarly, the content preview window 1014 updates, such as by appearing to scroll to the left or to the right, to show content associated with the newly selected time during the event.

In some embodiments the content preview window 1014 is selectable. In some embodiments the individual media content thumbnails are selectable to display or navigate to that media content or additional contextual information.

Figure 53:
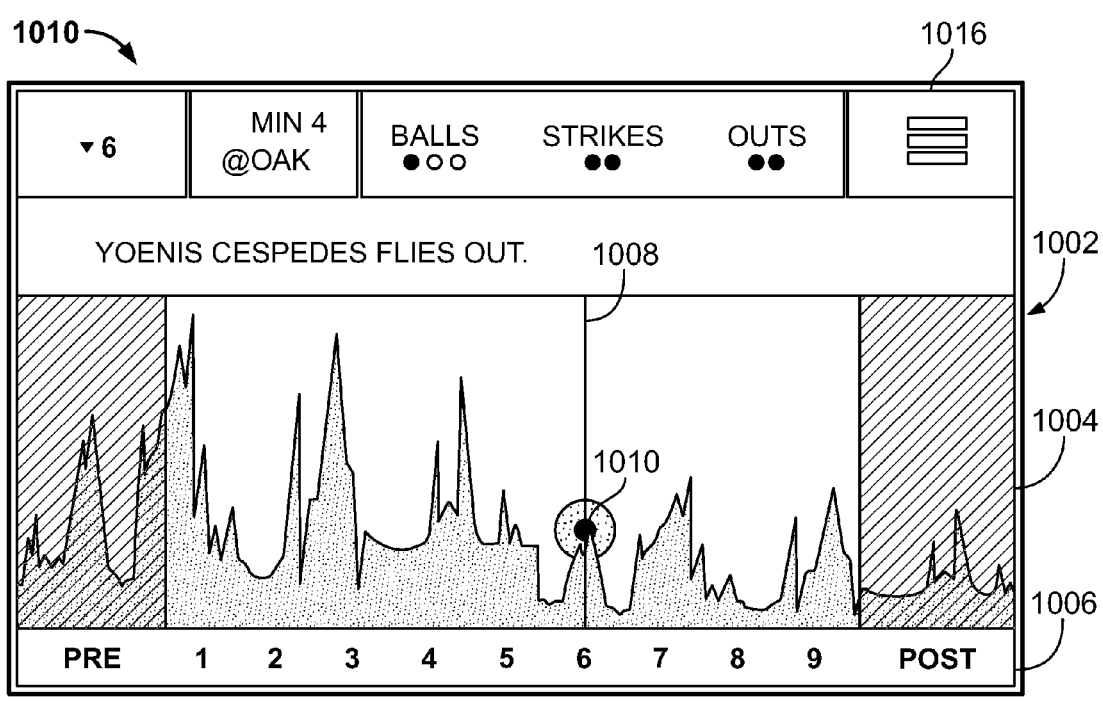
FIG. 53 is a screen shot illustrating another example of a user interface including a content volume display.

FIG. 53 is a screen shot illustrating another example of the user interface 1010 including the content volume display 1002 of FIG. 51. The example content volume display 1002 includes a content volume graph 1004, a time scale 1006, a time identifier 1006, and a selected point 1008.

In this example, the user interface 1010 includes the content volume display 1002 and an event segment display 1016.

The event segment display 1016 displays contextual information associated with the event segment in the game occurring at the time identified by the time indicator 1008.

In some embodiments the time indicator 1008 is adjustable, and in some embodiments upon movement of the time indicator 1008 in the content volume graph 1004, the event segment display 1016 is updated accordingly.

Figure 54:
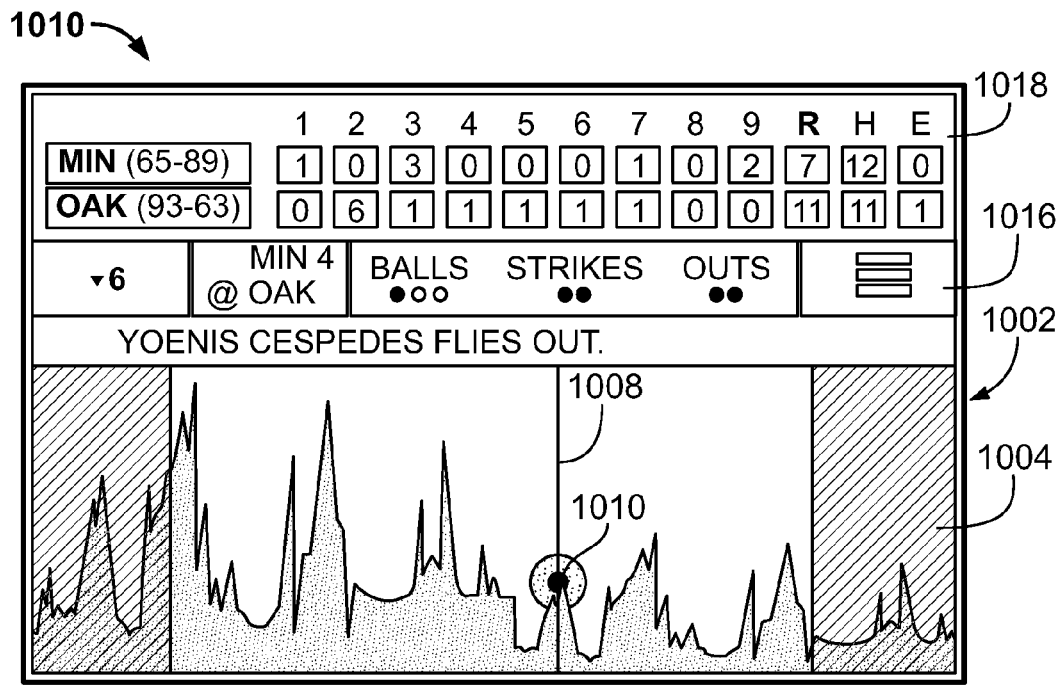
FIG. 54 is a screen shot illustrating another example of a user interface including a content volume display.

FIG. 54 is a screen shot illustrating another example of the user interface 1010 including the content volume display 1002 of FIG. 51. In this example, the user interface 1010 includes the content volume display 1002, an event segment display 1016, as well as a scoreboard 1018.

In this example, the content volume display 1002 does not include a time scale display 506.

Figure 55:
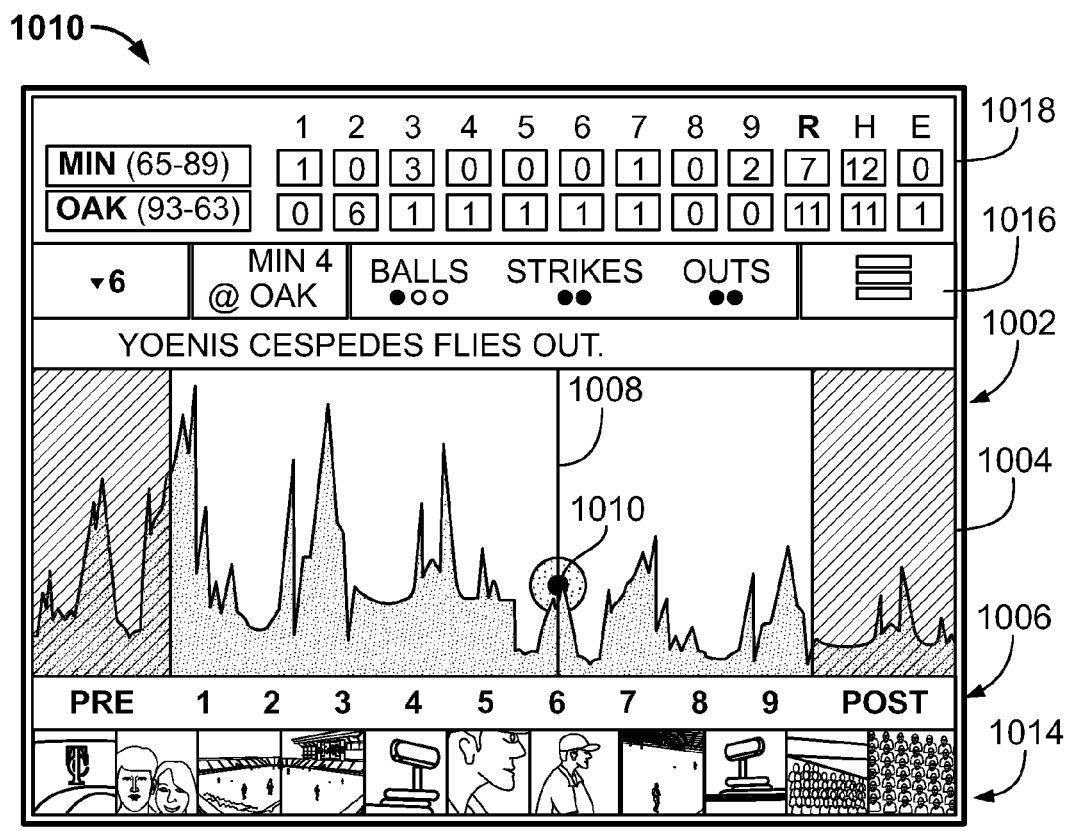
FIG. 55 is a screen shot illustrating another example of a user interface including a content volume display.

FIG. 55 is a screen shot illustrating another example of the user interface 1010 including the content volume display 1002, the content preview window 1014, the event segment display 1016, and the scoreboard 1018.

Additional combinations of one or more of these components of the example user interfaces are also possible to form yet other embodiments.

FIG. 56 is a screen shot illustrating another example of the user interface 1010. In addition to the content volume display 1002, the content preview window 1014, the event segment display 1016, and the scoreboard 1018, shown in FIG. 54, this example also includes filter controls 1020.

The filter controls 1020 permit the user to define search criteria to identify certain characteristics of desired media content. Examples of such search filters are discussed herein.

Once the filter controls 1020 have been set to identify search criteria, in some embodiments the content volume display 1002 is updated to show the volume of media content that matches the search criteria. For example, the search criteria can be used to filter out all media content except that associated with a particular player, such as Joe Mauer. The content volume graph 1004 is then updated to show the quantities of media items that are associated with that player. Other search criteria can also or alternatively be defined. This allows particular media content of interest to the user to be quickly located, for example.

FIG. 57 is a screen shot illustrating an example of a media content display 1030. The media content display 1030 includes a media content window 1032 that displays the media content (a photograph in this example), as well as contextual information display 1034 that displays at least some of the contextual information associated with the media content.

FIGS. 58-65 illustrate additional examples of the event-related media management system 100. In these examples, the event-related media management system 100 operates to receive and store media associated with video productions and to subsequently provide access to that media.

Referring briefly back to FIG. 1, in some embodiments the events of the event-related media management system 100 are the video productions themselves. Examples of video productions include television programs and movies. Such video productions can be distributed in a variety of forms, such as through a cable television (TV) provider, satellite TV provider, or broadcast television. Video products are also distributed across the Internet in a variety of forms, including on-demand streaming video providers and also in physical form, such as encoded on DVDs. Examples of video products include situational comedies, news programs, reality TV shows, game shows, sports games, movies, and concerts.

In some embodiments, media content can also be generated with or input by a user through a television, or another computing device in proximity to the television (e.g., in the same room as the television). In some embodiments, media content entered through a television or other computing device around the television is automatically associated with video production that was playing on the television when the media content was initiated, created, or published, for example. This can be particularly useful with non-live video productions, including television shows that are delayed in different time zones, online streaming of movies, and on demand videos, for example, because it allows the media content to be easily associated with the event (the video production), an exact moment in the event, and situational details of that moment in the event, and as a result, to all other event-related content known to the event-related media management system 100.

A user can participate in the event from various locations. Often video products are viewed from home on a computing device, such as a television or a computer, although they can also be viewed from many other locations, such as at a hotel or a business, for example. Movies are also often watched at movie theaters.

In some embodiments the event-related media management system 100 provides the ability for a user to generate media associated with the event, and to tag that media to the event. Examples of the media are discussed herein, and include text-based messages, audio, photographs, video, combinations of these, or other forms of media content.

As one example, when a user is watching a news program, the user may provide a text-based message that includes a reaction to a particular story. As another example, when the user is watching a competition television program, the user may provide a message reacting the announcement of the winner. Users may also provide media content before or after events. Additional examples are discussed herein.

The event-related media management system 100 operates to connect the media content provided by the user to the event, and to a vast amount of data related to and surrounding the event, such as names of participants (e.g., actors, characters, news anchors, judges, etc.), the actual video production content, and any other information known to be related to the event.

As shown in FIG. 1, in some embodiments the event-related media management system 100 includes an event-related data feed provider. Such an event feed provider provides event-related data 114 related to the event, such as related to the video product, in a similar manner to the provision of such data for a sporting or other event as described herein.

In some embodiments the event-related data is or includes text-based transcription of a part of or all of a video production. For example, in some embodiments the text-based transcription is received from the closed captioning subtitles associated with a video production. In another possible embodiment the transcription is generated using voice recognition technology, such as to process the sounds from an announcer. The transcript can be used in some embodiments as a "play-by-play" event-related data feed associated with the video production to which the media content can be tagged. In some embodiments the transcript provides the discrete action data (including the action data items) that describe each action that occurs during the video production.

In some embodiments the event-related data includes participant data, which may be associated with the transcript, for example, which identifies the one or more participants, such as the name of the speaker. In some embodiments the name of the person being spoken to is included. As one example, the event-related data for a given action during a situational comedy states: "Rachel is talking to Joey and Rachel says 'Hey Joey!'"

In some embodiments the event-related data includes timestamps. In some embodiments the transcript data is associated with timestamps. In the same way that the discrete action data 154 (see, FIG. 3) is associated with timestamps, the transcript data or other event data feed data can similarly be associated with timestamps.

One or more of a variety of possible timestamps can be provided. As one example, the timestamp is a time at which an action occurred. For example, the time at which words were spoken during the video production. In some embodiments a timestamp is based on a clock time, such as 6:02 PM Pacific. In another embodiment, a timestamp identifies a duration from the start or to the end of the video production (e.g., 35 minutes from the start of the video production).

Some television programs are broadcast at different times in different parts of the world. For example, a television program may be aired at 6 PM in each timezone (6 PM Eastern, 6 PM Central, 6 PM Mountain, and 6 PM Pacific). Therefore, in some embodiments the timestamps are associated with certain locations or regions in which the television program was broadcast at that time. In some embodiments the action data is associated with a broadcast timestamp indicating the time at which the broadcasting of the action occurred.

When media content is provided, one or more timestamps associated with the media content can be matched with one or more timestamps associated with the video production. The matching process can include a determination of the user's location, for example, and the determination of which broadcast timestamp is applicable at that location.

There are numerous possible ways to determine that media content provided by a user should be associated with a given event. Many of those are previously discussed herein, such as by the evaluation of a keyword, a hashtag, based on a check-in to the event, and the like.

Further, in some embodiments a computing device can be used to detect the event, or even a particular moment during the event. For example, in some embodiments a microphone is used to detect sounds. The sounds are compared with a database of sounds associated with events (such as video productions) to identify the event that contains the sounds. The detection of the sounds can then be used to associate media content provided by the user with that event, or to identify the moment in the event in which those sounds occurred. The media content can then be tagged to the event and to the moment of the event. In another possible embodiment a video camera is used. For example, the video camera can be directed toward a television to permit the video production to be captured by the video camera. The video is then compared with a database of video content to identify a matching video production, and can also be used to identify a particular moment during the video production. Tagging to the event and to the moment can then be accomplished. The detection of audio or video can occur at or about the time of media content creation, periodically, or continuously. The detection can also be used to detect changing of channels or other transitions from one video production to another video production.

A video production event can be segmented in the same way as other event, such as discussed herein. For example, a video production can include individual actions, as well as groups of actions. Segments can be defined by the actor/participant, for example, such that a first segment occurs while a first participant is talking or present, and a second segment occurs while a second participant is talking or present. Segments can be defined by chapters or scenes. Segments can also be defined by stories, such as during a news program discussing various news stories.

A robust database of event-related data relating to the video production provides an increased ability to tag the media content to specific aspects of the video product, and also provides for unique search queries that can be performed to identify media content relating to specific aspects of the video product. Several of a vast variety of data items that can be included in the event-related data (including action data) include the name of a participant (e.g., an actor, character, or other person present in a video production), a physical feature of a participant (e.g., ponytail, wearing a red shirt, wearing a PRADA brand outfit, blond hair), a musical instrument, genre of music, a song title, a word or phrase, a physical object (e.g., a golf club, such as a 9 iron), dates, seasons (e.g., season 1, season 2, etc.), and the like.

Several exemplary screen shots are provided in FIGS. 58-65 to illustrate additional aspects of some embodiments involving a video production.

Figures 58, 59, 60:
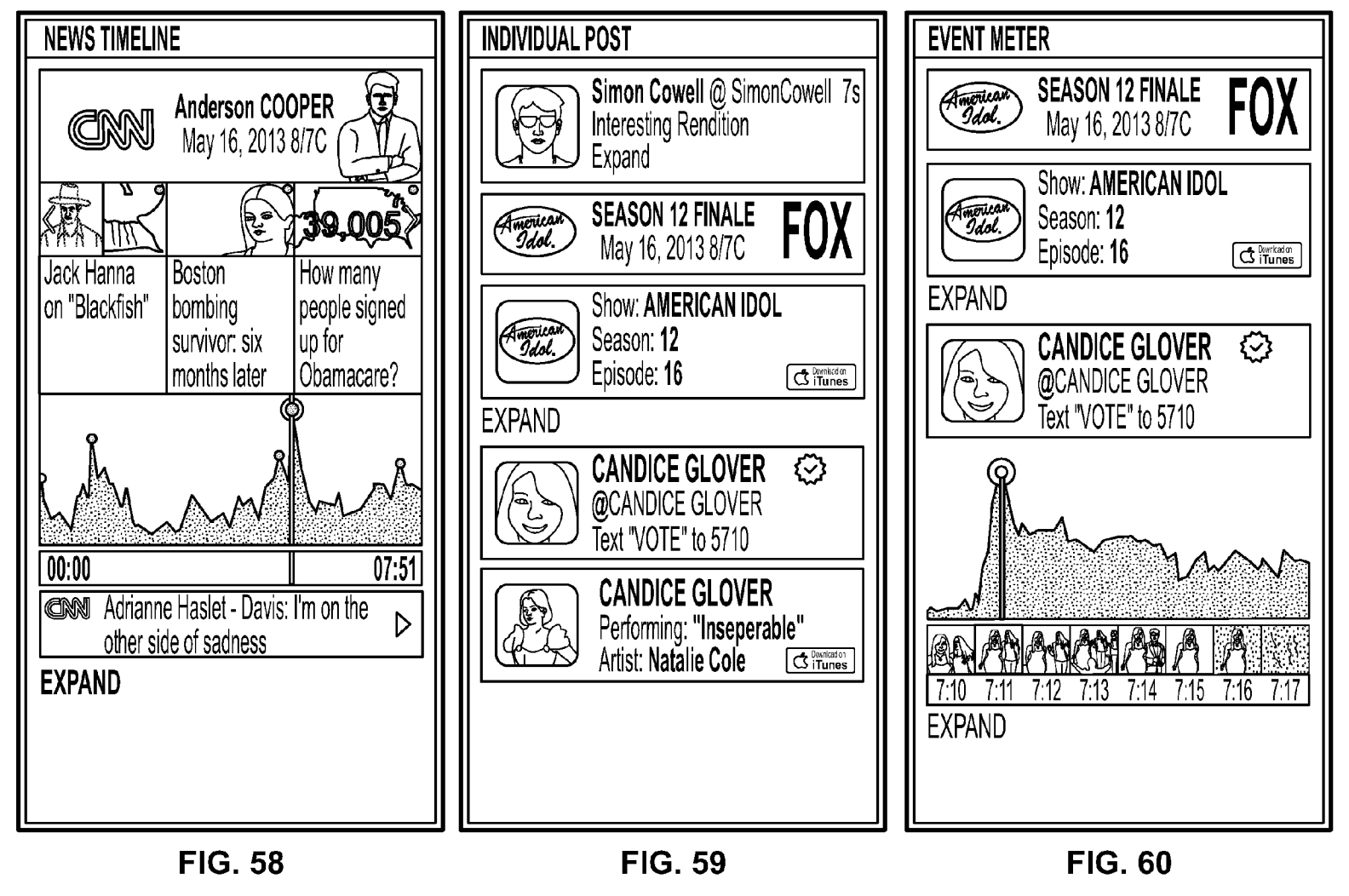

FIG. 58 is a screen shot illustrating an example of a video production timeline, and more specifically an example of a timeline for a news program.

In this example the timeline includes a header that identifies the television network (CNN) and the television program (Anderson Cooper). The date and time that the television program was broadcast is also displayed.

A carousel of stories is provided, which in this example provides a thumbnail view of several adjacent stories within the news program. In some embodiments the carousel can be scrolled to view prior and subsequent stories during the program.

Some embodiments include a content volume graph that depicts the volume of content that has been received for given portions of the television program. The greatest amount of content is depicted by the peak, which is currently selected. The carousel shows that the peak relates to a portion of the story relating to a bombing in Boston. The content volume graph is interactive, in some embodiments, to permit a user to select a point or location, or provide a slide input, to navigate to other times within the video production.

Some embodiments further include a ticker showing additional information relating to the event, to permit navigation to the associated portion of the video production, for example.

In some embodiments the news timeline also includes a listing of the media content associated with the video production below. In other embodiments, the display shown in FIG. 58 is a widget or display that can be provided in other contexts to provide links to the media content and video production.

FIG. 59 is a screen shot illustrating an example of an individual post associated with a video production event.

In this example, a user Simon Cowell has provided a text-based message of "Interesting Rendition." The text-based message was tagged by the event-related media management system 100 to a video production, and more specifically to a television program called American Idol. The tagged program is shown. In some embodiments a link is provided to the video production. In this example, a link is provided to purchase the full season of the American Idol television program.

Additionally in this example, the text-based message has also been tagged to a particular segment of the television program in which a participant, Candice Glover, was performing the song Inseparable by Natalie Cole. Accordingly, the text-based message is also tagged to this information. The association with the participant, Candice Glover is shown, along with information on how to vote for her by sending a text message to the number provided. Additionally, a link to related content is provided, namely a link to purchase the same song performed by another artist.

In a similar manner, any content available through the event-related media management system (e.g., a picture, video, audio recording, article, essay, PDF file, text-based content, and the like) can be made available for purchase. For example, in some embodiments media content can be purchased through the event-related media management system. Some embodiments include or interact with a purchase processing engine that handles the receipt of a payment from a user in exchange for providing the media content (or rights to the media content, such as a copyright license) to the user.

FIG. 60 is a screen shot illustrating another example of a video production timeline, similar to that shown in FIG. 58. In this example the timeline includes a content volume display showing the amount of content associated with various actions within the television program. The content volume display provides a convenient way of identifying the most interesting moments of the television show, and a convenient way to navigate to the media content associated with those moments, for example.

In this example, the timeline includes a carousel of moments below the content volume display. In this example the carousel includes thumbnail images associated with the identified moments in the video production, which may be taken from the video production itself, or from the media content associated with such moments.

Figure 61:
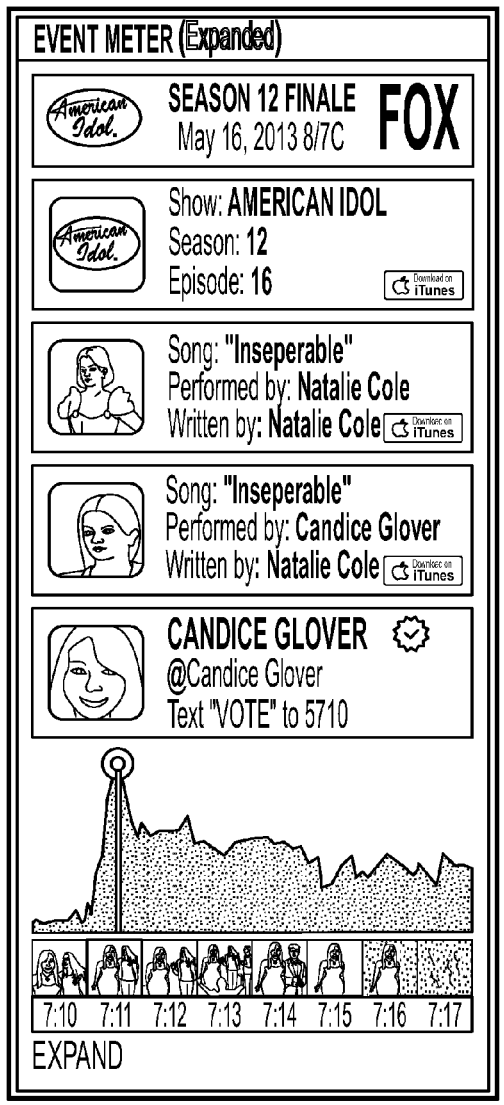
FIG. 61 is a screen shot illustrating another example of the timeline shown in FIG. 60, and further including additional event-related information.

FIG. 61 is a screen shot illustrating another example of the timeline shown in FIG. 60, and further including additional event-related information.

Figure 62:
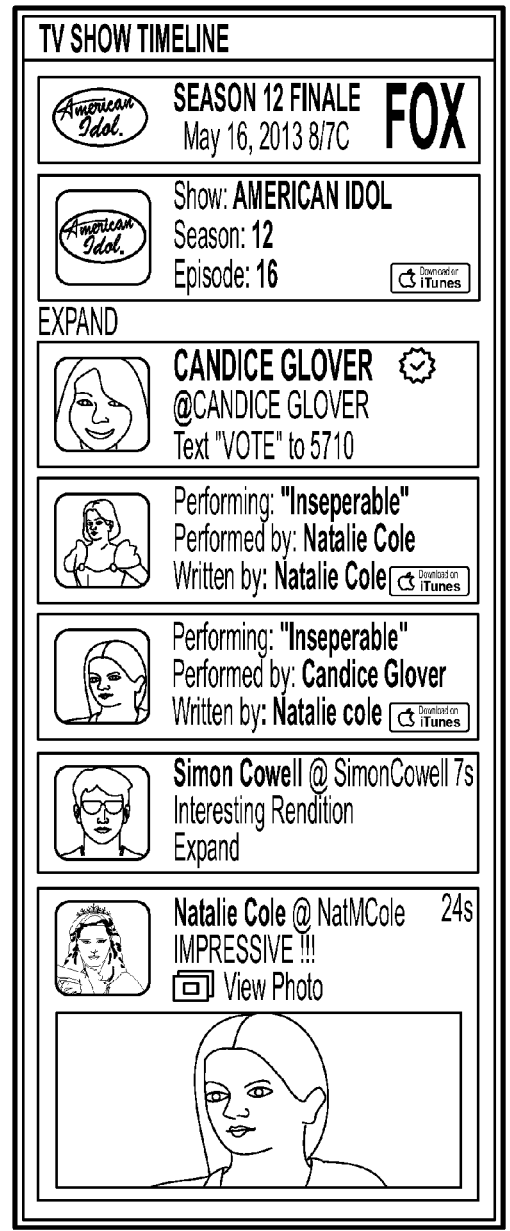
FIG. 62 is a screen shot illustrating another example of a video production timeline.

FIG. 62 is a screen shot illustrating another example of a video production timeline. In this example, the timeline further includes two examples of media content associated with moments in the video production. The first video content item is the text-message from Simon Cowell, and the second is a text-message and photograph provided by Natalie Cole.

Figure 63:
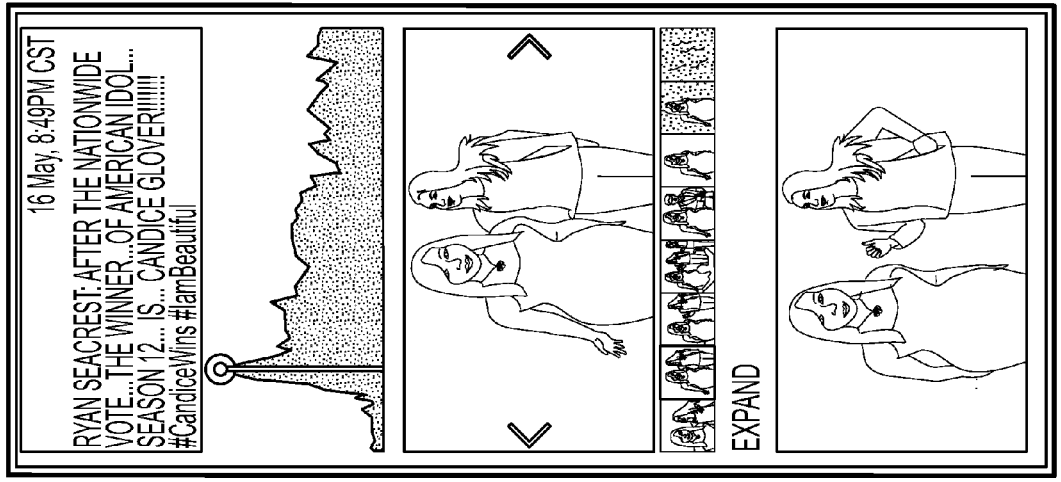
FIG. 63 is a screen shot illustrating another example of a video production timeline.

FIG. 63 is a screen shot illustrating another example of a video production timeline. In this example transcript data is shown. The display includes the content volume graph, and a particular moment during the video production is selected (7:11 PM). It can be seen that there was a huge spike in content provided at that moment, and the transcript data indicates shows that it was at that moment that the winner of the American Idol competition was announced by Ryan Seacrest. The transcript data associated with that moment states: "After the nationwide vode . . . the winner . . . of American idol . . . season 12 . . . is . . . Candice Glover!!!!!!!."

The timeline also displays media content provided by users that are tagged to that moment of the event.

Figure 64:
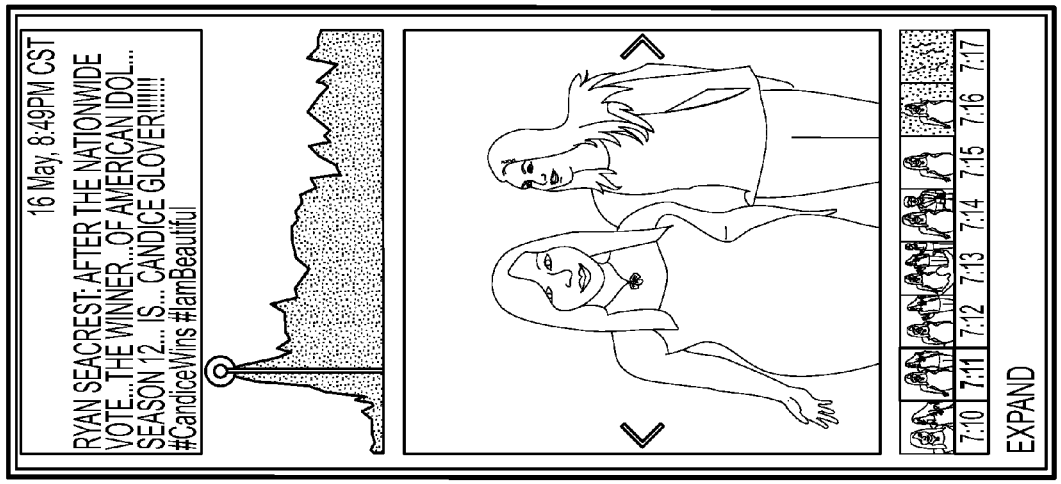
FIG. 64 is a screen shot illustrating another example of a video production timeline.
Figure 65:
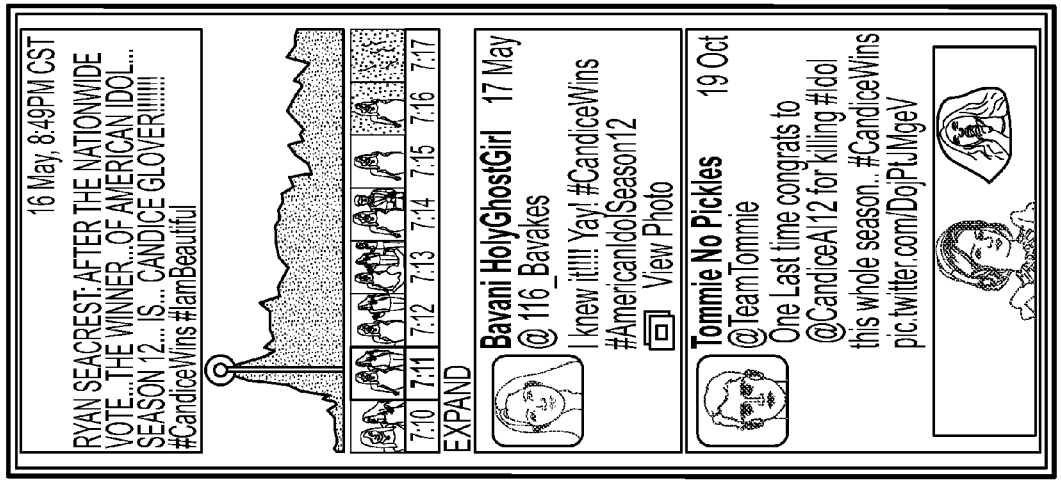
FIG. 65 is a screen shot illustrating another example of a video production timeline.

FIGS. 64 and 65 illustrate two additional examples of the video production timeline shown in FIG. 63.

The links, buttons, and other selectable graphical elements described herein are examples of selectable controls. Other embodiments can include or utilize other selectable controls.

Some embodiments of the event-related media management system 100, such as shown in FIG. 1, include or interface with an advertising engine. The advertising engine interacts with the event-related media management system to present ad content to users.

In some embodiments the event-related media management server 102, shown in FIG. 4, includes an advertising engine. The advertising engine presents ad content to the user, such as through the content supply engine 208.

In some embodiments ad content is received from an external source, such as through a third-party ad provider. In another embodiment the ad content is provided into the server 102 by an administrator, for example. Other embodiments receive ad content from other sources.

The ad content can include images and graphics, text-based messages, audio recordings, videos, or combinations of these, for example. Ad content includes static content or dynamic content. Dynamic content includes changing content, such as periodically changing content or video content.

In some embodiments ad content is embedded into another component of a user interface. In some embodiments the ad content is native advertising. In some embodiments, ad content is included in or as part of a scoreboard display, such as within the scoreboard display window 626, shown in FIG. 17. In another embodiment, ad content is included in or as part of a content volume display, such as the content volume display 1002 shown in FIG. 51. In some embodiments, ad content is included in an event segment display, such as the event segment display 1016 shown in FIG. 54.

In another embodiment, at least some of the media content is ad content. For example, the ad content can be included as a media content card 802 or a media content display 1030, and can be included in any one or the various timeline displays described herein, including a general timeline or an event timeline.

Additionally, in some embodiments ad content is displayed adjacent to media content in one of the displays described herein. As one example, a portion of a display (e.g., the CNN Anderson Cooper display block) includes ad content in some embodiments.

In some embodiments a display includes advertising space that is usable by the advertising engine to insert ad content therein. In some embodiments an advertiser pays for ad content displayed through the event-related media management system 100. In some embodiments an advertiser purchases ad space to be displayed on a display associated with the advertiser. For example, referring to FIG. 58, the advertiser (e.g., CNN) pays a fee to have a graphic displayed at the top of the display associated with that advertiser's television program (e.g., Anderson Cooper). Another example is the CNN logo shown in the ticker at the bottom of the display in FIG. 58. In another possible embodiment, an advertiser purchases ad space to be displayed on a display that is not associated with the advertiser. For example, a third party (e.g., Ford) not affiliated with CNN or the Anderson Cooper show can choose to sponsor the page associated with the Anderson Cooper show.

In some embodiments the advertising engine provides targeted ad content. The targeted ad content can include displaying a particular item of ad content on a particular display so it is viewed by users when that selected display is viewed. In another embodiment, the targeted ad content is displayed to particular users, or users having particular characteristics. In typical embodiments the collection and evaluation of any such user characteristics is done anonymously without any personally identifying information to identify the particular user. Additionally, the event-related media management system operates according to a clearly defined privacy policy to protect user privacy and operates to obtain appropriate permission from the user before using or collecting such data about the user or user's characteristics.

In some embodiments ad content is displayed in a pop up or pop out window that appears to be in front of other content.

In some embodiments the ad content is a banner ad. In some embodiments ad content is displayed between other media displays, such as in between media items in a timeline display.

In some embodiments ad content is displayed on or adjacent to a scoreboard display, a content volume graph, a timeline display, or any other graphical element or display described herein.

The present disclosure refers to event-related data. In some embodiments the event-related data is metadata. In some embodiments the metadata is stored in one or more databases and provides contextual information about media content items. In some embodiments at least some of the event-related data is stored as metadata of the media content, such as in metadata fields of a photograph or other media content item. In some embodiments at least some of the event-related data is stored according to a standard metadata format. Several examples of metadata formats include Dublin Core, Qualified Dublin Core, and ISO/IEC 11179.

Additional Clauses

The following are additional clauses relative to the present disclosure, which could be combined and/or otherwise integrated with any of the embodiments described above or listed in the claims below.

Clause 1. A method of generating intelligent media content for contextual search, discovery, and advertising, the method comprising:

storing event-related data associated with a plurality of events including a first event;

receiving media content items, the media content items including a first media content item;

identifying contextual information associated with the first media content item using a computing device;

identifying one of the events to which the media content item relates using the contextual information;

tagging the event to the first media content item;

comparing the contextual information to the event-related data for the identified event; and tagging at least some of the event-related data to the first media content item based at least in part on the comparison of the contextual information to the event-related data.

Clause 2. The method of Clause 1, wherein the event-related data includes event segment data identifying segments of the event, the method further comprising:

identifying event segment data associated with a segment of the event to which the first media content relates, by comparing the contextual information with the event-related data; and tagging the first media content with the event segment based at least in part on the comparison.

Clause 3. The method of Clause 2, wherein the event segment is a scored segment.

Clause 4. The method of Clause 2, wherein the event segment is a discrete action.

Clause 5. The method of Clause 1, wherein the event is a television show.

Clause 6. The method of Clause 1, further comprising:

receiving second media content item;

identifying contextual information associated with the second media content item;

identifying the one of the events to which the media content item relates using the contextual information;

tagging the event to the second media content item;

comparing the contextual information associated with the second media item to the event-related data for the identified event;

tagging at least some of the event-related data to the second media content item based at least in part on the comparison of the contextual information to the event-related data; wherein the at least some of the event-related data tagged to the second media content item is also tagged to the first media content item indicating a relationship between the first media content item and the second media content item.

Clause 7. The method of Clause 6, further comprising:

providing the first media content item and the second media content item in response to a single query received from a user due to the relationship between the first media content item and the second media content item.

Clause 8. The method of Clause 7, wherein the query is a search query.

Clause 9. The method of Clause 7, wherein the query is a request to access a chronological timeline display of media content items.

Clause 10. The method of Clause 9, wherein the chronological timeline display is a chronological timeline display associated with the event.

Clause 11. The method of Clause 7, wherein the query is an input provided to a display of the first media content item.

Clause 12. The method of Clause 1, further comprising providing relevant search results to a search query based at least in part on the tagging of the at least some of the event-related data to the first media content item.

Clause 13. The method of Clause 1, further comprising displaying the first media content item in a chronological display associated with the event based at least in part on the tagging of the at least some of the event-related data to the first media content item.

Clause 14. The method of Clause 1, further comprising displaying an advertisement to a user when the first media content item is displayed to the user based at least in part on the tagging of the at least some of the event-related data to the first media content item.

Clause 15. The method of Clause 1, wherein the contextual information comprises a time stamp.

Clause 16. The method of Clause 15, wherein the time stamp comprises a date and time.

Clause 17. The method of Clause 15, wherein the time stamp comprises an elapsed time from a start of the event.

Clause 18. The method of Clause 15, further comprising computing an adjusted time based on a time zone.

Clause 19. The method of Clause 1, wherein the contextual information comprises one or more keywords contained in the first media content item.

Clause 20. The method of Clause 1, wherein the contextual information comprises a location.

Clause 21. The method of Clause 1, wherein the identifying contextual information comprises one or more of: sound recognition, facial recognition, determining a direction of a recording device, and object recognition.

Clause 22. A system for generating intelligent media content for contextual search, discover, and advertising, the system comprising:
  at least one processing device; and
  at least one computer readable storage device, the at least one computer readable storage device storing data instructions, which when executed by the processing device, cause the processing device to:
    store event-related data associated with a plurality of events including a first event;
    receive media content items, the media content items including a first media content item;
    identify contextual information associated with the first media content item;
    identify one of the events to which the media content item relates using the contextual information;
    tag the event to the first media content item;
    compare the contextual information to the event-related data for the identified event; and
    tag at least some of the event-related data to the first media content item based at least in part on the comparison of the contextual information to the event-related data.

Clause 23. A method of documenting an event, the method comprising:
  generating general event information including general information about the event;
  identifying discrete actions that occur during the event;
  generating, using a computing device, discrete action data items for the discrete actions that occur during the event; and
  storing time stamps for the discrete action data.

Clause 24. The method of Clause 23, wherein the general event information comprises:
  group data identifying one or more groups of people participating in the event;
  event venue information including a location of the event; and
  a scheduled date and time for the event.

Clause 25. The method of Clause 23, wherein the discrete action data comprises:
  action data items describing each of the discrete actions that occur, including at least a type of an action; and
  at least one time stamp associated with each action data item, the at least one time stamp identifying the time at which the discrete action occurred.

Clause 26. The method of Clause 25, wherein the at least one time stamp includes a start time and an end time.

Clause 27. The method of Clause 25, further comprising sending the discrete action data across a data communication network as an event data feed, wherein at least some of the discrete action data is sent while the event is occurring.

Clause 28. The method of Clause 25, further comprising:
  generating event segment data items identifying a plurality of event segments for the event, the event segment data items including at least a description of the event segments, and a start time and an end time for each event segment; and
  associating one or more of the action data items with a respective one of the event segments during which the actions occurred.

Clause 29. The method of Clause 28, further comprising:
  generating scored segment data items identifying a plurality of scored segments for the event, the scored segment data items including at least a description of the scored segment and a start time and an end time for each of the scored segments; and
  associating one or more of the event segments with a respective one of the scored segments during which the event segment occurred.

Clause 30. The method of Clause 28, further comprising sending at least some of the discrete action data, the event segment data items, and the scored segment data items across a data communication network as an event data feed.

Clause 31. The method of Clause 30, wherein the event data feed is a real-time, near real-time, or historic data feed.

Clause 32. The method of Clause 23, wherein identifying discrete actions that occur during the event comprises observing the event by at least one person, and coding the discrete actions by the at least one person using a computing device.

Clause 33. The method of Clause 23, wherein identifying discrete actions that occur during the event includes processing a text-based transcription of the event.

Clause 34. The method of Clause 33, wherein the text-based transcription comprises closed captioning subtitles.

Clause 35. The method of Clause 23, wherein identifying discrete actions that occur during the event comprises audio recognition of sounds associated with the event.

Clause 36. The method of Clause 35, wherein the audio recognition is voice recognition, and wherein the voice recognition processes sounds from an announcer.

Clause 37. A system for documenting an event, the system comprising:
  at least one processing device; and at least one computer readable storage device, the at least one computer readable storage device storing data instructions, which when executed by the processing device, cause the processing device to:
  generate general event information including general information about the event;
  identify discrete actions that occur during the event;
  generate discrete action data items for the discrete actions that occur during the event; and
  store time stamps for the discrete action data.

Clause 38. A method of navigating through media content items associated with an event, the method comprising:
  storing a plurality of media content items associated with an event;
  generating a volume graph display using a computing device, the volume graph display graphically depicting a magnitude of one or more aspects of an event over time;
  receiving an input from a user, the input identifying at least one point in the volume graph display associated with at least one range of times; and
  generating a display including media content items associated with the at least one range of times.

Clause 39. The method of Clause 38, wherein the at least one aspect of the event is a quantity of media items that are associated with each respective range of time during the event.

Clause 40. The method of Clause 38, wherein the at least one aspect of the event comprises a noise level.

Clause 41. The method of Clause 38, wherein the at least one aspect of the event provides a measure of how interesting the event is over time, such that a moment that is more interesting is graphically displayed at a higher level in the display than a moment that is less interesting based on the measured level of interest.

Clause 42. A system for navigation through media content items associated with an event, the system comprising:
  at least one processing device; and
  at least one computer readable storage device, the at least one computer readable storage device storing data instructions, which when executed by the processing device, cause the processing device to:
    store a plurality of media content items associated with an event;
    generate a volume graph display the volume graph display graphically depicting a magnitude of one or more aspects of an event over time;
    receive an input from a user, the input identifying at least one point in the volume graph display associated with at least one range of times; and
    generate a display including media content items associated with the at least one range of times.

Clause 43. A method of displaying event information for an event having a plurality of scored segments, the method comprising:
  generating a graphical representation of a scoreboard with a computing device, the scoreboard including multiple scored segment displays associated with the scored segments of the event;
  receiving an input into the graphical representation of the scoreboard, the input selecting one of the scored segment displays; and
  displaying information associated with the scored segment of the event.

Clause 44. The method of Clause 44, wherein the information comprises a media content card provided by an attendee of the event.

Clause 45. A method of filtering information associated with an event, the method comprising:
  prompting a user to enter one or more filter criteria associated with an event and receiving the filter criteria using a computing device;
  generating a timeline display of the information filtered according to the filter criteria;
  generating an alternate view of the timeline display, while continuing to filter the information according to the filter criteria.

Clause 46. A method of segmenting an event, the method comprising:
  receiving an event feed identifying a plurality of discrete action data items using a computing device;
  identifying a set of the discrete action items;
  defining event segments including a first event segment, the first event segment being defined based on the set of discrete action items; and
  identifying a set of the event segments associated with a scored segment of the event.

Clause 47. A method of filtering information associated with a sports game, the method comprising:
  receiving one or more filter criteria associated with a sports game;
  displaying sports game information in a chronological order in a user interface using a computing device;
  displaying a time indicator in the user interface, the time indicator displaying the chronological time of the information presently displayed in the user interface;
  receiving an input into the time indicator; and
  filtering the sports game information according to the filter criteria.

Clause 48. A method of automatically tagging sport-related content, the method comprising:
  generating a media content card including media content using a computing device;
  time stamping the media content card with a time;
  identifying an event segment occurring at the time identified by the time stamp; and
  tagging the media content card with a plurality of tags associated with the event segment.

Clause 49. The method of Clause 48, wherein the time stamp is one of:
  a time at which the creation of the media content was initiated;
  a moment that the media content was captured;
  a moment that the media content was published;
  a time identified in metadata of the media content; and
  a time provided by a user.

Clause 50. A system configured to perform any one of the methods of Clauses 43-49.

Clause 51. Any one or more of the systems or methods illustrated or described herein.

Clause 52. An event-related media management system as described herein.

Clause 53. An event-related user interaction system operating on a computing device as described herein.

Clause 54. An event-related media management system server computing device as described herein.

Clause 55. A method of certifying media content cards as illustrated in FIG. 21.

Clause 56. A method of contextualizing media content, the method comprising:
  receiving media content;
  processing the media content using a computing device to associate the media content with contextual event-related data; and providing access to the media content using the contextual event-related data.

Clause 57. The method of Clause 56, wherein processing the media content comprises:
identifying one or more data items of the media content;
identifying one or more matches between the event-related data and the data items;
identifying an event associated with the media content based on the one or more matches; and
associating the media content with the event.

Clause 58. The method of Clause 57, further comprising:
identifying an event segment of the event associated with the media content based on the one or more matches; and
associating the media content with the event segment.

Clause 59. A method of retroactively converting a media content database to contextualize the media content contained therein, the method comprising:
obtaining data associated with the media content;
processing the media content using a computing device to associate the media content with contextual event-related data using the data; and
associating the media items with contextual event-related data.

Clause 60. An event data feed comprising:
action data items identifying discrete actions occurring during the event; and
time stamps contained in the event data and associated with the discrete actions.

Clause 61. An event data feed comprising:
action data items identifying discrete actions occurring during a video production;
transcript data associated with the discrete actions; and
time stamps contained in the event data and associated with the discrete actions.

Clause 62. A computing device comprising:
a processing device;
a data communication device configured to communicate across a data communication network; and
a computer readable storage device, the computer readable storage device storing data instructions, which when executed by the processing device, cause the processing device to generate and send an event data feed across the data communication network using the communication device, the event data feed comprising:
action data items identifying discrete actions occurring during the event; and
time stamps contained in the event data and associated with the discrete actions.

Clause 63. A computing device comprising:
a processing device;
a data communication device configured to communicate across a data communication network; and
a computer readable storage device, the computer readable storage device storing data instructions, which when executed by the processing device, cause the processing device to generate and send an event data feed across the data communication network using the communication device, the event data feed comprising:
action data items identifying discrete actions occurring during a video production;
transcript data associated with the discrete actions; and
time stamps contained in the event data and associated with the discrete actions.

Clause 64. A method of contextualizing media content, the method comprising:
storing event-related data associated with an event;
receiving a media content item relating to the event;
identifying contextual information associated with the media content;
comparing, using a computing device, the contextual information to the event-related data to identify a relationship between the event-related data and the media content item;
associating the media content item with the event according to the identified relationship; and
associating the media content item with at least some of the event-related data according to the identified relationship.

Clause 65. The method of Clause 64, wherein the event-related data includes:
a first event-related data item;
additional event-related data items; and
known relationships between the first event-related data item and the additional event-related data items.

Clause 66. A system comprising:
at least one processing device; and
at least one computer readable storage device, the at least one computer readable storage device storing data instructions, which when executed by the processing device, cause the processing device to:
generate a graphical representation of a scoreboard, the scoreboard including multiple scored segment displays associated with the scored segments of the event;
receive an input into the graphical representation of the scoreboard, the input selecting one of the scored segment displays; and
display information associated with the scored segment of the event.

Clause 67. A system comprising:
at least one processing device; and
at least one computer readable storage device, the at least one computer readable storage device storing data instructions, which when executed by the processing device, cause the processing device to:
prompt a user to enter one or more filter criteria associated with an event and receiving the filter criteria;
generate a timeline display of the information filtered according to the filter criteria;
generate an alternate view of the timeline display, while continuing to filter the information according to the filter criteria.

Clause 68. A system comprising:
at least one processing device; and
at least one computer readable storage device, the at least one computer readable storage device storing data instructions, which when executed by the processing device, cause the processing device to:
receive an event feed identifying a plurality of discrete action data items;
identify a set of the discrete action items;
define event segments including a first event segment, the first event segment being defined based on the set of discrete action items; and
identify a set of the event segments associated with a scored segment of the event.

Clause 69. A system comprising:
at least one processing device; and
at least one computer readable storage device, the at least one computer readable storage device storing data instructions, which when executed by the processing device, cause the processing device to:
receive one or more filter criteria associated with a sports game;

display sports game information in a chronological order in a user interface;
display a time indicator in the user interface, the time indicator displaying the chronological time of the information presently displayed in the user interface;
receive an input into the time indicator; and
filter the sports game information according to the filter criteria.

Clause 70. A system comprising:
at least one processing device; and
at least one computer readable storage device, the at least one computer readable storage device storing data instructions, which when executed by the processing device, cause the processing device to:
generate a media content card including media content;
time stamp the media content card with a time;
identify an event segment occurring at the time identified by the time stamp; and
tag the media content card with a plurality of tags associated with the event segment.

Clause 71. A system comprising:
at least one processing device; and
at least one computer readable storage device, the at least one computer readable storage device storing data instructions, which when executed by the processing device, cause the processing device to:
receiving media content;
processing the media content to associate the media content with contextual event-related data; and
providing access to the media content using the contextual event-related data.

Clause 72. A system comprising:
at least one processing device; and
at least one computer readable storage device, the at least one computer readable storage device storing data instructions, which when executed by the processing device, cause the processing device to:
obtain data associated with media content of a media content database;
process the media content to retroactively associate the media content with contextual event-related data using the data; and
associate the media items with contextual event-related data.

Clause 73. A system for contextualizing media content, the system comprising:
at least one processing device; and
at least one computer readable storage device, the at least one computer readable storage device storing data instructions, which when executed by the processing device, cause the processing device to:
store event-related data associated with an event;
receive a media content item relating to the event;
identify contextual information associated with the media content;
compare the contextual information to the event-related data to identify a relationship between the event-related data and the media content item;
associate the media content item with the event according to the identified relationship; and
associate the media content item with at least some of the event-related data according to the identified relationship.

Clause 74. A system for contextualizing media content, the method comprising:
means for receiving media content;
means for processing the media content to associate the media content with contextual event-related data; and
means for providing access to the media content using the contextual event-related data.

Clause 75. A system for media content navigation, the system comprising:
means for storing media content associated with an event;
means for displaying a volume graph display;
means for receiving an input into the volume graph display; and
means for navigating to and displaying relevant media content items of the media content using the input.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:
1. A method of generating intelligent media content, the method comprising:
storing event-related data associated with a plurality of events including a particular event in at least one computer readable storage device, the event-related data including event segment data identifying segments of the events including a particular segment of the event, and discrete action data identifying discrete actions that occur during the events including a particular discrete action;
receiving media content items using at least one computing device, the media content items including a particular media content item;
identifying contextual information associated with the particular media content item using the at least one computing device;
determining that the particular media content item relates to the particular event of the plurality of events based at least in part on the contextual information, using the at least one computing device;
automatically tagging the particular media content item with the particular event using the at least one computing device;
comparing the contextual information to the event segment data for the event to identify a relationship between the particular media content item and the particular segment of the event using the at least one computing device;
automatically tagging the particular media content item with the particular segment of the event as a result of the identified relationship using the at least one computing device;
comparing the contextual information to the discrete action data for the particular event to identify a relationship between the particular media content item and the particular discrete action;
automatically tagging the particular media content item with the particular discrete action of the particular event as a result of the identified relationship between the particular media content item and the particular discrete action;
generating and storing a text-based contextual description for the particular media content item based at least in part on one or more of the particular segment of the event and the particular discrete action;

receiving a second particular media content item of the media content items;
identifying second contextual information associated with the second particular media content item;
determining that the second particular media content item relates to the particular event of the plurality of events based at least in part on the second contextual information;
automatically tagging the second particular media content item with the particular event;
comparing the second contextual information to the event segment data for the event to identify a relationship between the second particular media content item and the particular segment of the event;
automatically tagging the second particular media content item with the particular segment of the event, wherein the tagging of the particular segment of the event to the particular media content item and to the second particular media content item indicates a relationship between the particular media content item and the second particular media content item; and
providing access to the particular media content item and the second particular media content item based at least in part on the relationship between the particular media content item and the second particular media content item.

2. The method of claim 1, wherein:
the event is a sports game;
the segments of the sports game are scored segments; and
automatically tagging the particular media content item with the particular segment comprises automatically tagging the particular media content item with the scored segment of the sports game.

3. The method of claim 1, wherein the segments of the events comprise discrete actions.

4. The method of claim 1, wherein the event-related data is stored in the at least one computer-readable storage device while the particular event is occurring.

5. The method of claim 1, further comprising receiving an event feed including at least some of the event-related data, the event feed including the discrete action data comprising action data items and time stamps associated with the action data items.

6. The method of claim 5, wherein the time stamps include a start time and an end time.

7. The method of claim 1, wherein the contextual information comprises at least one time stamp.

8. The method of claim 7, wherein the contextual information comprises information identifying at least three of the following:
a time at which the creation of the particular media content item was initiated;
a moment that the particular media content item was captured;
a moment that the particular media content item was published;
a time identified in metadata of the particular media content item;
an elapsed time from a start of the particular event;
an adjusted time based on a time zone; and
a time provided by a user.

9. The method of claim 7, wherein identifying contextual information associated with the particular media content item further comprises adjusting the time stamp by shifting the time stamp.

10. The method of claim 1, wherein the contextual information comprises a location.

11. The method of claim 1, wherein the contextual information comprises at least one keyword.

12. The method of claim 11, wherein the keyword comprises a hashtag.

13. The method of claim 1, wherein identifying the contextual information comprises one or more of: sound recognition, facial recognition, determining a direction of a recording device, object recognition, and using data received from an implantable or wearable communication device.

14. The method of claim 1, wherein the event-related data further comprises statistics relating to the particular event, and further comprising generating an alert for an epic, historic, or significant moment of the particular event based on the statistics.

15. The method of claim 1, wherein providing access to the particular media content item and the second particular media comprises providing the particular media content item and the second particular media content item in response to a single query received from a user.

16. The method of claim 1, further comprising automatically tagging the second particular media content item with the particular discrete action, and wherein the tagging of the particular discrete action to the particular media content item and to the second particular media content item also indicates the relationship between the particular media content item and the second particular media content item.

17. At least one non-transitory computer readable storage device storing data instructions, which when executed by at least one computing device, cause the at least one computing device to:
store event-related data associated with a plurality of events including a particular event in the at least one computer readable storage device, the event-related data including event segment data identifying segments of the events including a particular segment of the event, and discrete action data identifying discrete actions that occur during the plurality of events including a particular discrete action;
receive media content items using the at least one computing device, the media content items including a particular media content item;
identify contextual information associated with the particular media content item using the at least one computing device;
determine that the particular media content item relates to the particular event of the plurality of events based at least in part on the contextual information, using the at least one computing device;
automatically tag the particular media content item with the particular event using the at least one computing device;
compare the contextual information to the event segment data for the event to identify a relationship between the particular media content item and the particular segment of the event using the at least one computing device;
automatically tag the particular media content item with the particular segment of the event as a result of the identified relationship using the at least one computing device;
compare the contextual information to the discrete action data for the particular event to identify a relationship between the particular media content item and the particular discrete action;
automatically tag the particular media content item with the particular discrete action of the particular event as a result of the identified relationship between the particular media content item and the particular discrete action;
generate and store a text-based contextual description for the particular media content item based at least in part on one or more of the particular segment of the event and the particular discrete action;
receive a second particular media content item of the media content items;
identify second contextual information associated with the second particular media content item;
determine that the second particular media content item relates to the particular event of the plurality of events based at least in part on the second contextual information;
automatically tag the second particular media content item with the particular event;
compare the second contextual information to the event segment data for the event to identify a relationship between the second particular media content item and the particular segment of the event;
automatically tag the second particular media content item with the particular segment of the event, wherein the tagging of the particular segment of the event to the particular media content item and to the second particular media content item indicates a relationship between the particular media content item and the second particular media content item; and
provide access to the particular media content item and the second particular media content item based at least in part on the relationship between the particular media content item and the second particular media content item.

18. The at least one computer readable storage device of claim 17, wherein:
the event is a sports game;
the segments of the sports game are scored segments; and
automatically tagging the particular media content item with the particular segment comprises automatically tagging the particular media content item with the scored segment of the sports game.

19. A system for generating intelligent media content, the system comprising:
at least one processing device; and
at least one non-transitory computer readable storage device, the at least one computer readable storage device storing data instructions, which when executed by the processing device, cause the processing device to:
store event-related data associated with a plurality of events including a particular event in the at least one computer readable storage device, the event-related data including event segment data identifying segments of the events including a particular segment of the event, and discrete action data identifying discrete actions that occur during the plurality of events including a particular discrete action;
receive media content items including a particular media content item;
identify contextual information associated with the particular media content item;
determine that the particular media content item relates to the particular event of the plurality of events based at least in part on the contextual information;
automatically tag the particular media content item with the particular event;
compare the contextual information to the event segment data for the event to identify a relationship between the particular media content item and the particular segment of the event;
automatically tag the particular media content item with the particular segment of the event as a result of the identified relationship;
compare the contextual information to the discrete action data for the particular event to identify a relationship between the particular media content item and the particular discrete action;
automatically tag the particular media content item with the particular discrete action of the particular event as a result of the identified relationship between the particular media content item and the particular discrete action;
generate and store a text-based contextual description for the particular media content item based at least in part on one or more of the particular segment of the event and the particular discrete action;
receive a second particular media content item of the media content items;
identify second contextual information associated with the second particular media content item;
determine that the second particular media content item relates to the particular event of the plurality of events based at least in part on the second contextual information;
automatically tag the second particular media content item with the particular event;
compare the second contextual information to the event segment data for the event to identify a relationship between the second particular media content item and the particular segment of the event;
automatically tag the second particular media content item with the particular segment of the event, wherein the tagging of the particular segment of the event to the particular media content item and to the second particular media content item indicates a relationship between the particular media content item and the second particular media content item; and
provide access to the particular media content item and the second particular media content item based at least in part on the relationship between the particular media content item and the second particular media content item.

20. The system of claim 19, wherein:
the event is a sports game;
the segments of the sports game are scored segments; and
automatically tagging the particular media content item with the particular segment comprises automatically tagging the particular media content item with the scored segment of the sports game.

* * * * *